US012638690B2

(12) United States Patent
Shimotsu et al.

(10) Patent No.: US 12,638,690 B2
(45) Date of Patent: May 26, 2026

(54) LENS DEVICE, IMAGING APPARATUS, OPERATION METHOD OF LENS DEVICE, OPERATION METHOD OF IMAGING APPARATUS, AND PROGRAM

(71) Applicant: FUJIFILM Corporation, Tokyo (JP)

(72) Inventors: Shinichi Shimotsu, Saitama (JP);
Koichi Tanaka, Saitama (JP);
Toshihiro Aoi, Saitama (JP); Taro Asami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 295 days.

(21) Appl. No.: 18/336,008

(22) Filed: Jun. 15, 2023

(65) Prior Publication Data

US 2023/0333399 A1 Oct. 19, 2023

Related U.S. Application Data

(63) Continuation of application No. PCT/JP2021/039872, filed on Oct. 28, 2021.

(30) Foreign Application Priority Data

Dec. 25, 2020 (JP) ................................. 2020-217842

(51) Int. Cl.
*G02B 27/64* (2006.01)
*G03B 5/02* (2021.01)
(Continued)

(52) U.S. Cl.
CPC ............. *G02B 27/646* (2013.01); *G03B 5/02* (2013.01); *H04N 23/11* (2023.01);
(Continued)

(58) Field of Classification Search
CPC ............................... G02B 27/646; G03B 5/02;
G03B 2205/0007; H04N 23/687; H04N 23/11; H04N 23/6811
See application file for complete search history.

(56) References Cited

U.S. PATENT DOCUMENTS

2002/0163581 A1* 11/2002 Kitazawa ............. H04N 23/687
348/208.6
2006/0132613 A1 6/2006 Shin et al.
(Continued)

FOREIGN PATENT DOCUMENTS

GB 2474557 4/2011
JP 2006126667 5/2006
(Continued)

OTHER PUBLICATIONS

"Office Action of Japan Counterpart Application", issued on May 7, 2025, with English translation thereof, p. 1-p. 5.
(Continued)

*Primary Examiner* — Rowina J Cattungal
(74) *Attorney, Agent, or Firm* — JCIPRNET

(57) ABSTRACT

Provided is a lens device provided in an imaging apparatus body including an image sensor, the lens device including a lens that includes a shake correction lens correcting a shake of an image obtained by imaging light on the image sensor, and images the light, which is incident, on the image sensor, a first drive mechanism that moves the shake correction lens in a direction in which the shake of the image is corrected, by applying power to the shake correction lens along a coordinate plane intersecting an optical axis of the lens, and a second drive mechanism that moves the shake correction lens in a direction in which the image is shifted, by applying power to the shake correction lens along the coordinate plane.

21 Claims, 30 Drawing Sheets

(51) Int. Cl.
　　H04N 23/11 (2023.01)
　　H04N 23/68 (2023.01)

(52) U.S. Cl.
　　CPC ....... H04N 23/6811 (2023.01); H04N 23/687
　　　　(2023.01); G03B 2205/0007 (2013.01)

(56) References Cited

U.S. PATENT DOCUMENTS

| | | | |
|---|---|---|---|
| 2006/0133786 A1 | 6/2006 | Teramoto | |
| 2006/0257129 A1* | 11/2006 | Shibatani | H04N 23/687 |
| | | | 348/E5.046 |
| 2012/0194929 A1 | 8/2012 | Nakahira et al. | |
| 2012/0268642 A1 | 10/2012 | Kawai | |
| 2014/0049849 A1 | 2/2014 | Nakahira et al. | |
| 2014/0125828 A1 | 5/2014 | Takeuchi | |
| 2015/0146024 A1* | 5/2015 | Takeuchi | G02B 27/646 |
| | | | 348/208.4 |
| 2017/0085799 A1* | 3/2017 | Yoshida | H04N 23/60 |
| 2019/0346740 A1 | 11/2019 | Suh et al. | |
| 2021/0136290 A1* | 5/2021 | Ikeda | H04N 23/687 |

FOREIGN PATENT DOCUMENTS

| | | |
|---|---|---|
| JP | 2006171528 | 6/2006 |
| JP | 2006171694 | 6/2006 |
| JP | 2006319528 | 11/2006 |
| JP | 2010271607 A * | 12/2010 |
| JP | 2010282028 | 12/2010 |
| JP | 2011082855 | 4/2011 |
| JP | 2011082855 A * | 4/2011 |
| JP | 2012226205 | 11/2012 |
| JP | 2012249071 | 12/2012 |
| JP | 2014092755 | 5/2014 |
| JP | 2015025870 | 2/2015 |
| JP | 2015191123 | 11/2015 |

OTHER PUBLICATIONS

"International Search Report (Form PCT/ISA/210) of PCT/JP2021/039872", mailed on Feb. 1, 2022, with English translation thereof, pp. 1-5.
"Written Opinion of the International Searching Authority (Form PCT/ISA/237) of PCT/JP2021/039872", mailed on Feb. 1, 2022, with English translation thereof, pp. 1-8.
"The First Office Action of China Counterpart Application", with English translation thereof, issued on Sep. 24, 2025, pp. 1-14.
"The Second Office Action of China Counterpart Application", issued on Jan. 20, 2026, with English translation thereof, p. 1-p. 12.

* cited by examiner

| FRAME PERIOD | PRESENCE OR ABSENCE OF SHIFT OF IMAGE IN +X AXIS DIRECTION | PRESENCE OR ABSENCE OF SHIFT OF IMAGE IN +Y AXIS DIRECTION |
|---|---|---|
| 1 | SHIFT IS ABSENT | SHIFT IS ABSENT |
| 2 | SHIFT IS PRESENT | SHIFT IS ABSENT |
| 3 | SHIFT IS ABSENT | SHIFT IS PRESENT |
| 4 | SHIFT IS PRESENT | SHIFT IS PRESENT |

FIG. 15

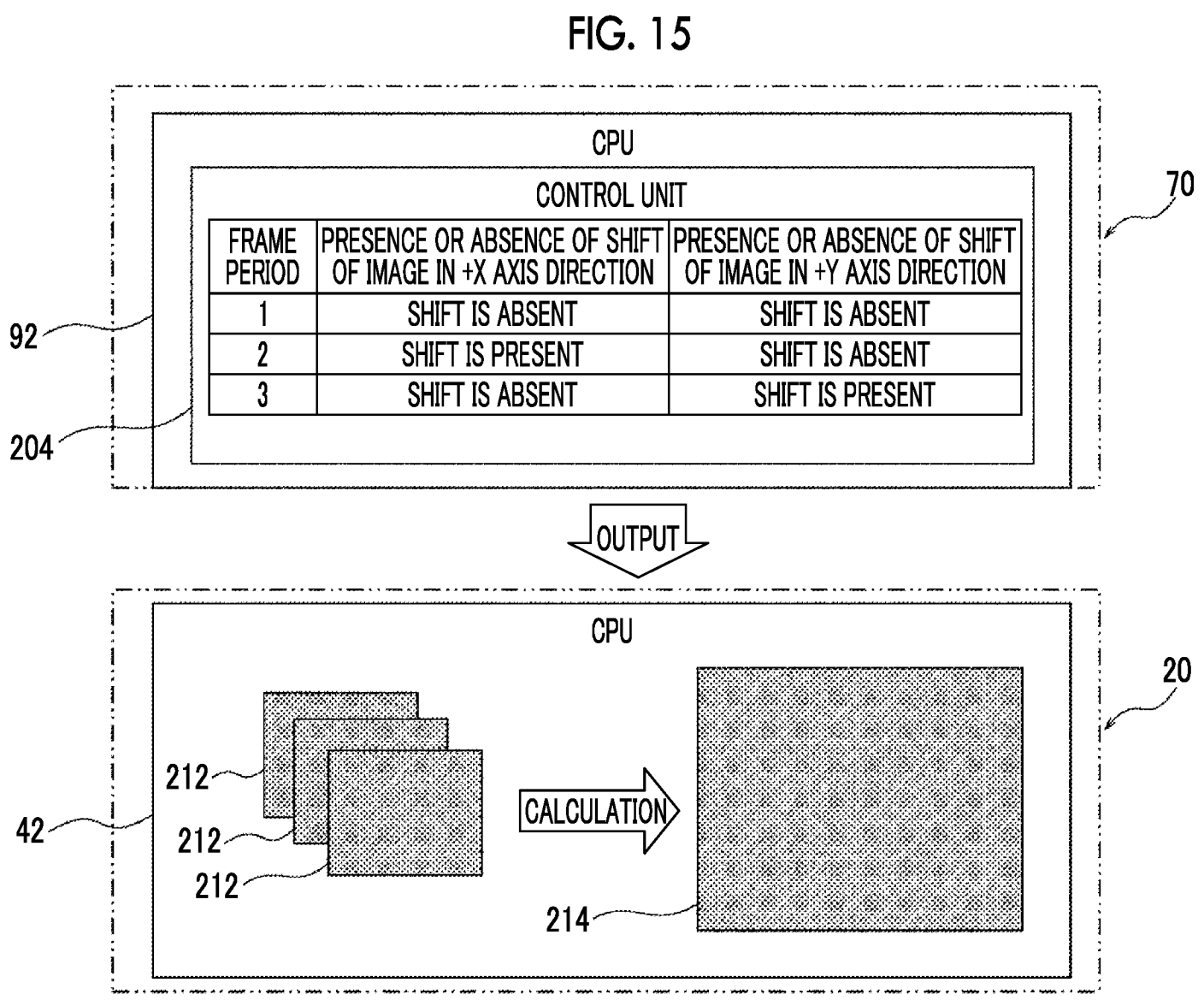

CPU 70

CONTROL UNIT 92

| FRAME PERIOD | PRESENCE OR ABSENCE OF SHIFT OF IMAGE IN +X AXIS DIRECTION | PRESENCE OR ABSENCE OF SHIFT OF IMAGE IN +Y AXIS DIRECTION |
|---|---|---|
| 1 | SHIFT IS ABSENT | SHIFT IS ABSENT |
| 2 | SHIFT IS PRESENT | SHIFT IS ABSENT |
| 3 | SHIFT IS ABSENT | SHIFT IS PRESENT |

204

OUTPUT

CPU 20

CALCULATION 212 212 212

Figure 16:
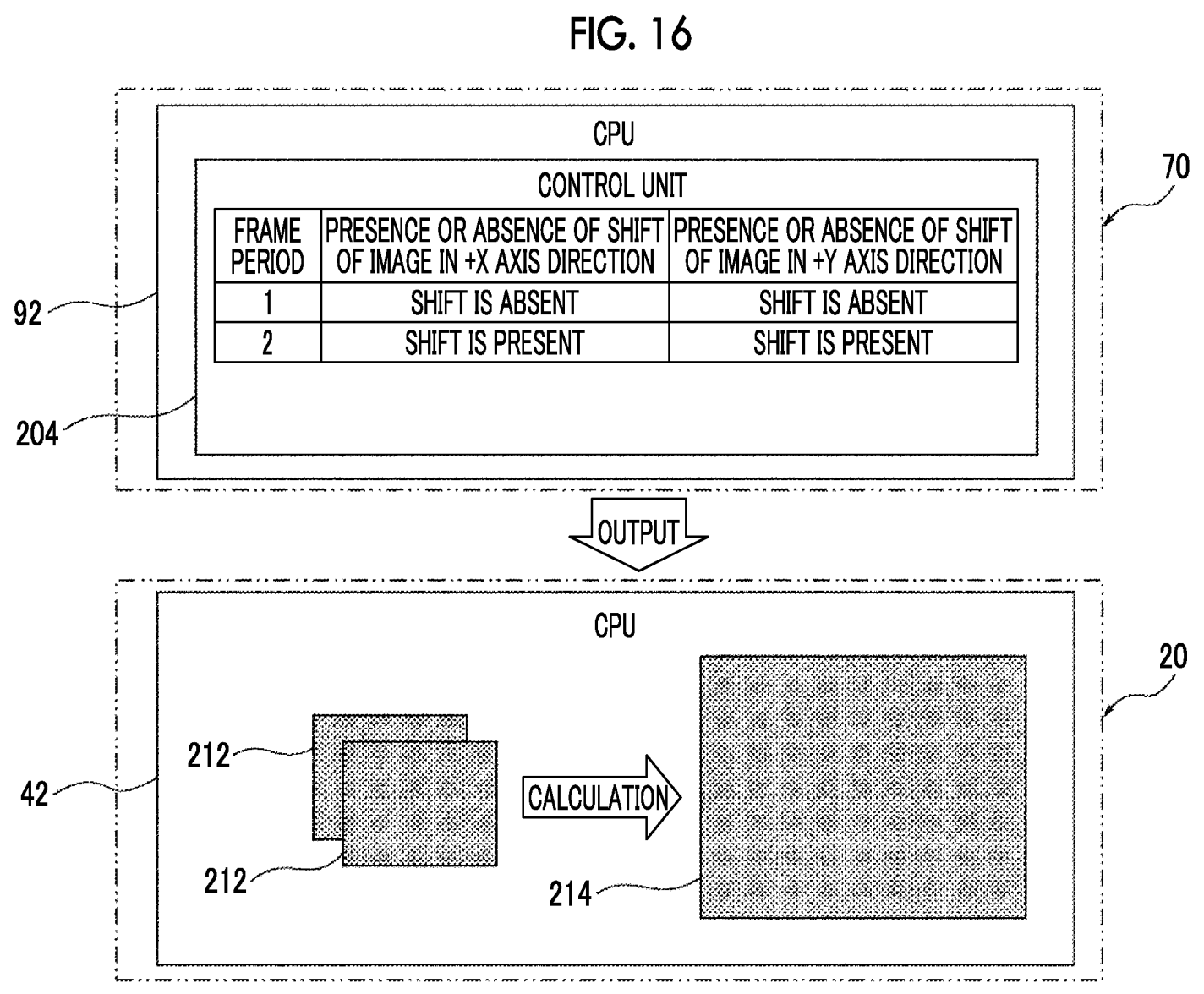

CPU — 70

CONTROL UNIT

| FRAME PERIOD | PRESENCE OR ABSENCE OF SHIFT OF IMAGE IN +X AXIS DIRECTION | PRESENCE OR ABSENCE OF SHIFT OF IMAGE IN +Y AXIS DIRECTION |
|---|---|---|
| 1 | SHIFT IS ABSENT | SHIFT IS ABSENT |
| 2 | SHIFT IS PRESENT | SHIFT IS PRESENT |

92

204

OUTPUT

CPU — 20

CALCULATION

LENS DEVICE, IMAGING APPARATUS, OPERATION METHOD OF LENS DEVICE, OPERATION METHOD OF IMAGING APPARATUS, AND PROGRAM

CROSS-REFERENCE TO RELATED APPLICATIONS

This application is a continuation application of International Application No. PCT/JP2021/039872, filed Oct. 28, 2021, the disclosure of which is incorporated herein by reference in its entirety. Further, this application claims priority under 35 USC 119 from Japanese Patent Application No. 2020-217842 filed Dec. 25, 2020, the disclosure of which is incorporated by reference herein.

BACKGROUND OF THE INVENTION

1. Field of the Invention

The technology of the present disclosure relates to a lens device, an imaging apparatus, an operation method for a lens device, an operation method for an imaging apparatus, and a program.

2. Description of the Related Art

JP2006-171694 discloses a camera shake correction device of a camera lens assembly. The camera shake correction device includes a base frame, a first frame that is provided on the base frame to be movable in a first direction, a second frame that is provided on the first frame to be movable in a second direction perpendicular to the first direction and is provided with an image sensor on one surface thereof, a linear motor that is provided between the base frame and the first frame and moves the first frame in the first direction, and a voice coil motor that moves the second frame in the second direction.

JP2012-226205A discloses a drive device that is applied to an image device, such as a digital camera, and performs camera shake correction. The drive device comprises a first member, a contact portion that is supported by the first member, a second member that is pressed and supported by the contact portion, a first drive mechanism that moves the second member and the first member to be relative to each other in a direction along a support surface configured by the contact portion, and a second drive mechanism that displaces the contact portion with respect to the first member in a pressing direction. By vibrating the contact portion in the pressing direction by the second drive mechanism, a frictional force between the contact portion and the second member is reduced.

JP2010-282028A discloses a lens unit of an imaging apparatus. The lens unit comprises a holding frame that holds a lens, a moving actuator that moves the holding frame connected to a movable element that moves linearly with respect to a stator, a braking unit that brakes the movable element with respect to the stator by pressing the movable element and the stator against each other in a case in which the moving actuator does not generate a driving force, and a braking unit actuator that cancels a pressing force of the movable element and the stator in a case in which the moving actuator generates the driving force.

SUMMARY OF THE INVENTION

One embodiment according to the technology of the present disclosure provides a lens device, an imaging apparatus, an operation method for a lens device, an operation method for an imaging apparatus, and a program capable of performing correction of a shake of an image and a shift of the image with higher accuracy than in a case in which an image is shifted by moving a shake correction lens by a shake correction drive mechanism that corrects an image shake by moving the shake correction lens, for example.

A first aspect according to the technology of the present disclosure relates to a lens device provided in an imaging apparatus body including an image sensor, the lens device comprising a lens that includes a shake correction lens correcting a shake of an image obtained by imaging light on the image sensor, and images the light, which is incident, on the image sensor, a first drive mechanism that moves the shake correction lens in a direction in which the shake of the image is corrected, by applying power to the shake correction lens along a coordinate plane intersecting an optical axis of the lens, and a second drive mechanism that moves the shake correction lens in a direction in which the image is shifted, by applying power to the shake correction lens along the coordinate plane.

A second aspect according to the technology of the present disclosure relates to the lens device according to the first aspect, further comprising a processor, and a memory coupled to or integrated with the processor, in which the processor is configured to perform, with respect to the first drive mechanism, control of moving the shake correction lens in the direction in which the shake of the image is corrected, and perform, with respect to the second drive mechanism, control of moving the shake correction lens in the direction in which the image is shifted.

A third aspect according to the technology of the present disclosure relates to the lens device according to the second aspect, in which the second drive mechanism moves the shake correction lens along a direction in which the first drive mechanism moves the shake correction lens, the shake correction lens is moved by a movement amount in which a movement amount of the shake correction lens by the second drive mechanism is added to a movement amount of the shake correction lens by the first drive mechanism in a case in which the second drive mechanism moves the shake correction lens in the direction in which the first drive mechanism moves the shake correction lens, and the shake correction lens is moved by a movement amount in which the movement amount of the shake correction lens by the second drive mechanism is subtracted from the movement amount of the shake correction lens by the first drive mechanism in a case in which the second drive mechanism moves the shake correction lens in a direction opposite to the direction in which the first drive mechanism moves the shake correction lens.

A fourth aspect according to the technology of the present disclosure relates to the lens device according to the second or third aspect, in which the control with respect to the first drive mechanism is feedback control based on a shake amount of an imaging apparatus including the lens device and the imaging apparatus body, and the control with respect to the second drive mechanism is sequence control based on predetermined shift sequence.

A fifth aspect according to the technology of the present disclosure relates to the lens device according to any one of the second to fourth aspects, in which the processor is configured to perform, with respect to the second drive mechanism, control of moving the shake correction lens in the direction in which the image is shifted, according to imaging in units of frames by the image sensor.

A sixth aspect according to the technology of the present disclosure relates to the lens device according to any one of the second to fifth aspects, in which the processor is configured to perform, with respect to the second drive mechanism, control of moving the shake correction lens to a position at which the image is shifted at a pitch equal to or larger than a pixel pitch of the image sensor or a pitch smaller than the pixel pitch of the image sensor.

A seventh aspect according to the technology of the present disclosure relates to the lens device according to any one of the second to sixth aspects, in which the coordinate plane is defined by a first direction and a second direction intersecting the first direction, the second drive mechanism includes a third actuator and a fourth actuator, the third actuator moves the shake correction lens by applying power to the shake correction lens along the first direction, the fourth actuator moves the shake correction lens by applying power to the shake correction lens along the second direction, and the processor is configured to perform, with respect to the second drive mechanism, control of selectively switching a combination of presence or absence of the power of the third actuator and presence or absence of the power of the fourth actuator.

An eighth aspect according to the technology of the present disclosure relates to the lens device according to any one of the first to seventh aspects, in which the coordinate plane is defined by a first direction and a second direction intersecting the first direction, the second drive mechanism includes a third actuator and a fourth actuator, the third actuator moves the shake correction lens by applying power to the shake correction lens along the first direction, and the fourth actuator moves the shake correction lens by applying power to the shake correction lens along the second direction.

A ninth aspect according to the technology of the present disclosure relates to the lens device according to any one of the first to eighth aspects, further comprising a holding member that holds the shake correction lens, a first support member that supports the holding member to be movable along the coordinate plane, and a second support member that supports the first support member to be movable along the coordinate plane, in which the first drive mechanism is provided between the holding member and the first support member, and the second drive mechanism is provided between the first support member and the second support member.

A tenth aspect according to the technology of the present disclosure relates to the lens device according to any one of the first to ninth aspects, further comprising a holding member that holds the shake correction lens, a first support member that supports the holding member to be movable along the coordinate plane, and a second support member that supports the first support member to be movable along the coordinate plane, in which the first drive mechanism is provided between the first support member and the second support member, and the second drive mechanism is provided between the holding member and the first support member.

An eleventh aspect according to the technology of the present disclosure relates to the lens device according to the tenth aspect, in which the holding member is supported by the first support member to be rotatable about a shaft member that extends along the optical axis.

A twelfth aspect according to the technology of the present disclosure relates to the lens device according to any one of the first to eleventh aspects, in which the first drive mechanism includes a voice coil motor, and the second drive mechanism includes a piezoelectric element.

A thirteenth aspect according to the technology of the present disclosure relates to the lens device according to the twelfth aspect, in which the second drive mechanism includes an elastic member disposed at a position facing the piezoelectric element.

A fourteenth aspect according to the technology of the present disclosure relates to the lens device according to ninth aspect, in which the coordinate plane is defined by a first direction and a second direction intersecting the first direction, the first drive mechanism includes a first actuator that is provided between the holding member and the first support member and generates power in the first direction, and a second actuator that is provided between the holding member and the first support member and generates power in the second direction, and the second drive mechanism includes a third actuator that is provided between the first support member and the second support member and generates power in the first direction, and a fourth actuator that is provided between the first support member and the second support member and generates power in the second direction.

A fifteenth aspect according to the technology of the present disclosure relates to the lens device according to the tenth aspect, in which the coordinate plane is defined by a first direction and a second direction intersecting the first direction, the first drive mechanism includes a first actuator that is provided between the first support member and the second support member and generates power in the first direction, and a second actuator that is provided between the first support member and the second support member and generates power in the second direction, and the second drive mechanism includes a third actuator that is provided between the holding member and the first support member and generates power in the first direction, and a fourth actuator that is provided between the holding member and the first support member and generates power in the second direction.

A sixteenth aspect according to the technology of the present disclosure relates to the lens device according to the tenth aspect, in which the coordinate plane is defined by a first direction and a second direction intersecting the first direction, the first drive mechanism includes a first actuator that is provided between the first support member and the second support member and generates power in the first direction, and a second actuator that is provided between the first support member and the second support member and generates power in the second direction, and the second drive mechanism includes a third actuator that is provided between the holding member and the first support member and generates power in a combination direction of the first direction and the second direction.

A seventeenth aspect according to the technology of the present disclosure relates to the lens device according to any one of the first to sixteenth aspects, further comprising an optical filter that is disposed on a subject side with respect to the image sensor and transmits near-infrared light included in the light.

An eighteenth aspect according to the technology of the present disclosure relates to an imaging apparatus comprising a processor, a memory coupled to or integrated with the processor, an image sensor, a lens that includes a shake correction lens correcting a shake of an image obtained by imaging light on the image sensor, and images the light, which is incident, on the image sensor, a first drive mechanism that moves the shake correction lens in a direction in which the shake of the image is corrected, by applying power to the shake correction lens along a coordinate plane intersecting an optical axis of the lens, and a second drive mechanism that moves the shake correction lens in a direction in which the image is shifted, by applying power to the shake correction lens along the coordinate plane.

A nineteenth aspect according to the technology of the present disclosure relates to the imaging apparatus according to the eighteenth aspect, in which the processor is configured to perform, with respect to the second drive mechanism, control of moving the shake correction lens to a position at which the image is shifted at a pitch equal to or larger than a pixel pitch of the image sensor or a pitch smaller than the pixel pitch of the image sensor, cause the image sensor to perform imaging according to the shift of the image, and combine images of a plurality of frames obtained by the imaging.

A twentieth aspect according to the technology of the present disclosure relates to an operation method for a lens device including a lens that includes a shake correction lens correcting a shake of an image obtained by imaging light on an image sensor, and images the light, which is incident, on the image sensor, a first drive mechanism that moves the shake correction lens in a direction in which the shake of the image is corrected, by applying power to the shake correction lens along a coordinate plane intersecting an optical axis of the lens, and a second drive mechanism that moves the shake correction lens in a direction in which the image is shifted, by applying power to the shake correction lens along the coordinate plane, the operation method comprising performing, with respect to the first drive mechanism, control of moving the shake correction lens in the direction in which the shake of the image is corrected, and performing, with respect to the second drive mechanism, control of moving the shake correction lens in the direction in which the image is shifted.

A twenty-first aspect according to the technology of the present disclosure relates to an operation method for an imaging apparatus including an image sensor, a lens that includes a shake correction lens correcting a shake of an image obtained by imaging light on the image sensor, and images the light, which is incident, on the image sensor, a first drive mechanism that moves the shake correction lens in a direction in which the shake of the image is corrected, by applying power to the shake correction lens along a coordinate plane intersecting an optical axis of the lens, and a second drive mechanism that moves the shake correction lens in a direction in which the image is shifted, by applying power to the shake correction lens along the coordinate plane, the operation method comprising performing, with respect to the first drive mechanism, control of moving the shake correction lens in the direction in which the shake of the image is corrected, and performing, with respect to the second drive mechanism, control of moving the shake correction lens in the direction in which the image is shifted.

A twenty-second aspect according to the technology of the present disclosure relates to a non-transitory computer-readable storage medium storing a program executable by a computer applied to a lens device including a lens that includes a shake correction lens correcting a shake of an image obtained by imaging light on an image sensor, and images the light, which is incident, on the image sensor, a first drive mechanism that moves the shake correction lens in a direction in which the shake of the image is corrected, by applying power to the shake correction lens along a coordinate plane intersecting an optical axis of the lens, and a second drive mechanism that moves the shake correction lens in a direction in which the image is shifted, by applying power to the shake correction lens along the coordinate plane, the program causing the computer to execute a process comprising performing, with respect to the first drive mechanism, control of moving the shake correction lens in the direction in which the shake of the image is corrected, and performing, with respect to the second drive mechanism, control of moving the shake correction lens in the direction in which the image is shifted.

A twenty-third aspect according to the technology of the present disclosure relates to a non-transitory computer-readable storage medium storing a program executable by a computer applied to an imaging apparatus including an image sensor, a lens that includes a shake correction lens correcting a shake of an image obtained by imaging light on the image sensor, and images the light, which is incident, on the image sensor, a first drive mechanism that moves the shake correction lens in a direction in which the shake of the image is corrected, by applying power to the shake correction lens along a coordinate plane intersecting an optical axis of the lens, and a second drive mechanism that moves the shake correction lens in a direction in which the image is shifted, by applying power to the shake correction lens along the coordinate plane, the program causing the computer to execute a process comprising performing, with respect to the first drive mechanism, control of moving the shake correction lens in the direction in which the shake of the image is corrected, and performing, with respect to the second drive mechanism, control of moving the shake correction lens in the direction in which the image is shifted.

BRIEF DESCRIPTION OF THE DRAWINGS

FIG. 2 is a side view showing an example of a configuration of an optical system of a surveillance camera according to the first embodiment.

FIG. 4 is a front view showing an example of a configuration of a main part of the image sensor according to the first embodiment.

FIG. 6 is a block diagram showing an example of a configuration of a lens device according to the first embodiment.

FIG. 10 is a block diagram showing an example of a front part of a configuration for performing shake correction of an image in the surveillance camera according to the first embodiment.

FIG. 11 is a block diagram showing an example of a rear part of the configuration for performing the shake correction of the image in the surveillance camera according to the first embodiment.

FIG. 12 is a block diagram showing an example of a front part of a configuration for shifting the image in the surveillance camera according to the first embodiment.

FIG. 13 is a block diagram showing an example of a rear part of the configuration for shifting the image in the surveillance camera according to the first embodiment.

FIG. 14 is a block diagram showing a first example of a configuration for obtaining a composite image in the surveillance camera according to the first embodiment.

FIG. 15 is a block diagram showing a second example of the configuration for obtaining the composite image in the surveillance camera according to the first embodiment.

FIG. 16 is a block diagram showing a third example of the configuration for obtaining the composite image in the surveillance camera according to the first embodiment.

FIG. 18 is a block diagram showing a second operation example in which the correction of the shake of the image and the shift of the image are executed in the lens device according to the first embodiment.

FIG. 19 is a block diagram showing a third operation example in which the correction of the shake of the image and the shift of the image are executed in the lens device according to the first embodiment.

FIG. 20 is a block diagram showing a fourth operation example in which the correction of the shake of the image and the shift of the image are executed in the lens device according to the first embodiment.

FIG. 30 is a side view showing an example of a configuration of an optical system of a surveillance camera according to a modification example.

DESCRIPTION OF THE PREFERRED EMBODIMENTS

Figure 1:
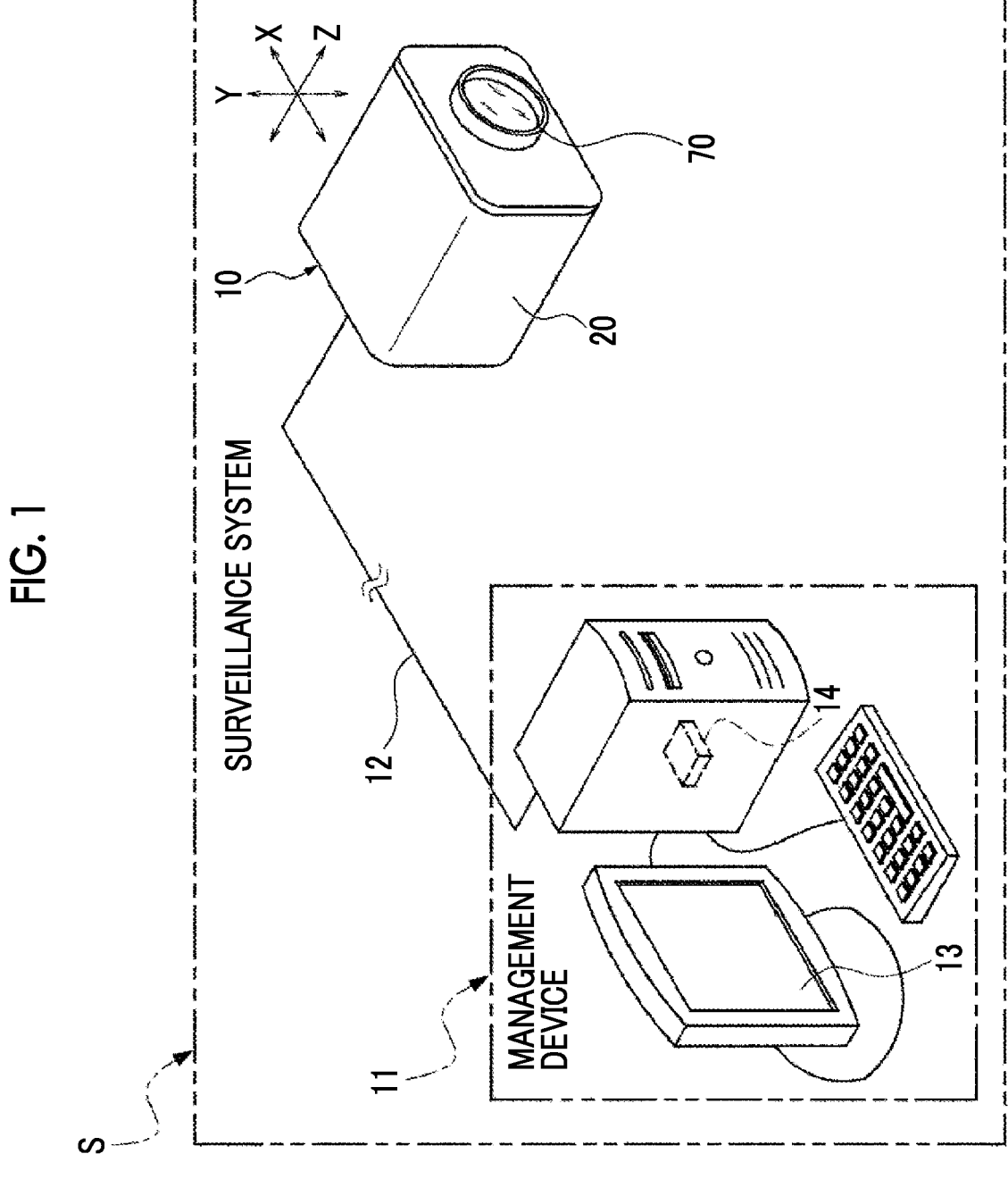
FIG. 1 is a perspective view showing an example of a configuration of a surveillance system according to the first embodiment.

Hereinafter, examples of embodiments of a lens device, an imaging apparatus, an operation method for a lens device, an operation method for an imaging apparatus, and a program according to the technology of the present disclosure will be described with reference to the accompanying drawings.

The terms used in the following description will be described first.

The CPU refers to an abbreviation of "Central Processing Unit". GPU refers to an abbreviation of "Graphics Processing Unit". NVM refers to an abbreviation of "Non-Volatile Memory". RAM refers to an abbreviation of "Random Access Memory". IC refers to an abbreviation of "Integrated Circuit". ASIC refers to an abbreviation of "Application Specific Integrated Circuit". PLD refers to an abbreviation of "Programmable Logic Device". FPGA refers to an abbreviation of "Field-Programmable Gate Array". SoC refers to an abbreviation of "System-on-a-Chip". SSD refers to an abbreviation of "Solid State Drive". HDD refers to an abbreviation of "Hard Disk Drive". EEPROM refers to an abbreviation of "Electrically Erasable and Programmable Read Only Memory". SRAM refers to an abbreviation of "Static Random Access Memory". VCM refers to an abbreviation of "Voice Coil Motor". I/F refers to an abbreviation of "Interface". The UI refers to an abbreviation of "User Interface". USB refers to an abbreviation of "Universal Serial Bus". CMOS refers to an abbreviation of "Complementary Metal Oxide Semiconductor". CCD refers to an abbreviation of "Charge Coupled Device". LAN refers to an abbreviation of "Local Area Network". WAN refers to an abbreviation of "Wide Area Network". BPF refers to an abbreviation of "Band Pass Filter". Ir refers to an abbreviation of "Infrared Rays".

In the description of the present specification, "vertical/perpendicular" refers to the verticality/perpendicularity in the sense of including an error generally allowed in the technical field to which the technology of the present disclosure belongs, that is, an error to the extent that it does not contradict the gist of the technology of the present disclosure, in addition to the exact verticality/perpendicularity. In the description of the present specification, "horizontal" refers to the horizontality in the sense of including an error generally allowed in the technical field to which the technology of the present disclosure belongs, that is, an error to the extent that it does not contradict the gist of the technology of the present disclosure, in addition to the exact horizontality. In the description of the present specification, "parallel" refers to the parallelism in the sense of including an error generally allowed in the technical field to which the technology of the present disclosure belongs, that is, an error to the extent that it does not contradict the gist of the technology of the present disclosure, in addition to the exact parallelism. In the description of the present specification, "orthogonal" refers to the orthogonality in the sense of including an error generally allowed in the technical field to which the technology of the present disclosure belongs, that is, an error to the extent that it does not contradict the gist of the technology of the present disclosure, in addition to the exact orthogonality. In the description of the present specification, "match" refers to the match in the sense of including an error generally allowed in the technical field to which the technology of the present disclosure belongs, that is, an error to the extent that it does not contradict the gist of the technology of the present disclosure, in addition to the exact match. In the description of the present specification, "equal interval" refers to the equal interval in the sense of including an error generally allowed in the technical field to which the technology of the present disclosure belongs, that is, an error to the extent that it does not contradict the gist of the technology of the present disclosure, in addition to the exact equal interval.

First Embodiment

A first embodiment will be described first.
(Surveillance System)

As an example, as shown in FIG. 1, a surveillance system S comprises a surveillance camera 10 and a management device 11. The surveillance camera 10 is an example of an "imaging apparatus" according to the technology of the present disclosure.

The surveillance camera 10 is installed on a pillar, a wall, or the like indoors or outdoors, images a surveillance target which is a subject, and generates a moving image by the imaging. The moving image includes images of a plurality of frames obtained by the imaging. The surveillance camera 10 transmits the moving image obtained by the imaging to the management device 11 via a communication line 12. The management device 11 receives the moving image transmitted by the surveillance camera 10, and displays the received moving image on a display 13 or stores the received moving image in a storage device 14.

It should be noted that an X axis shown in FIG. 1 corresponds to a pitch axis of the surveillance camera 10, a Y axis corresponds to a yaw axis of the surveillance camera 10, and a Z axis corresponds to a roll axis of the surveillance camera 10. Hereinafter, a direction along the X axis will be referred to as an X axis direction, a direction along the Y axis will be referred to as a Y axis direction, and a direction along the Z axis will be referred to as a Z axis direction. The X axis direction, the Y axis direction, and the Z axis direction are orthogonal to each other.
(Surveillance Camera)

Figure 2:
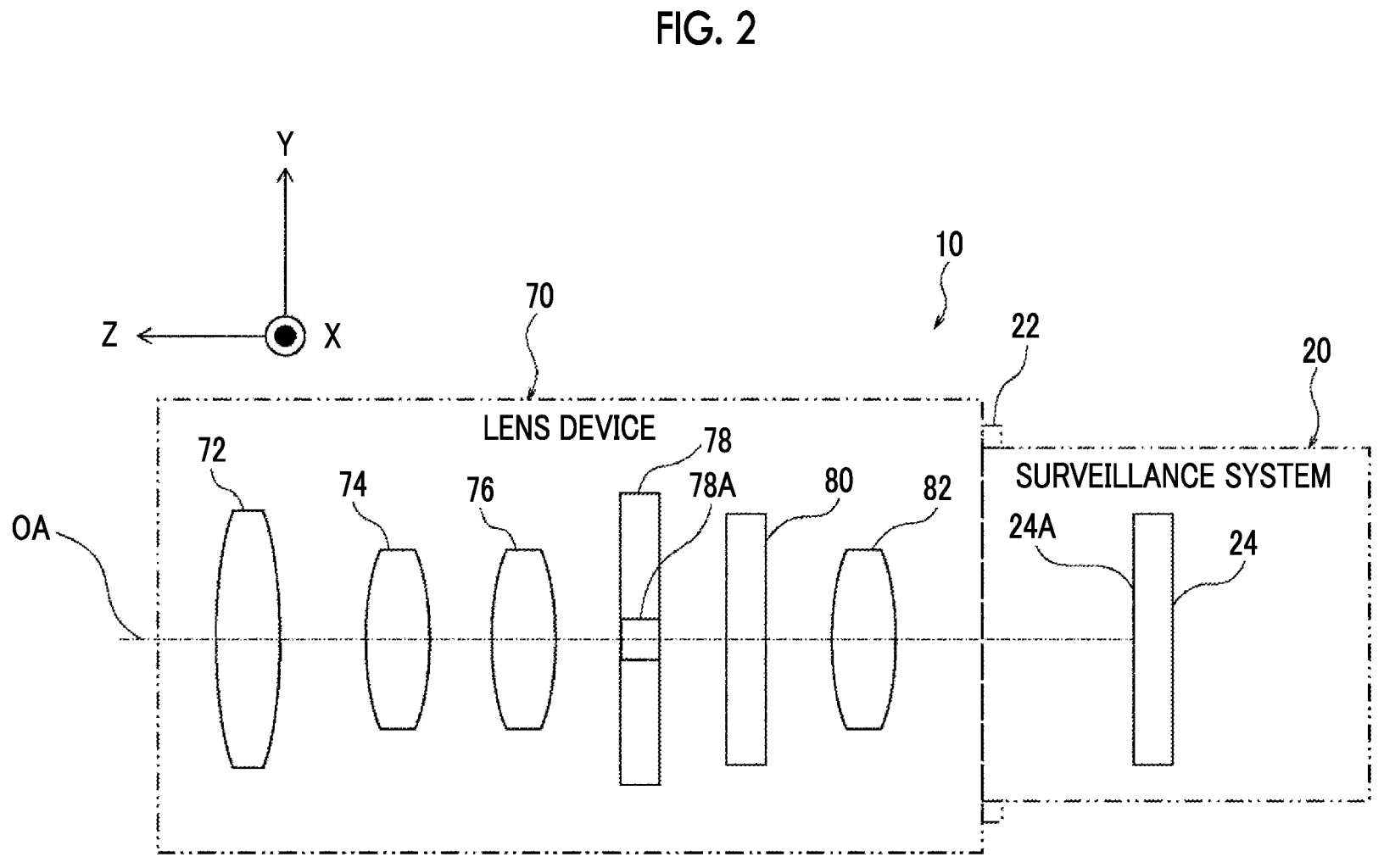

As an example, as shown in FIG. 2, the surveillance camera 10 comprises a surveillance camera body 20 and a lens device 70. The surveillance camera body 20 is an example of an "imaging apparatus body" according to the technology of the present disclosure. The surveillance camera body 20 comprises a lens mount 22. The lens device 70 is a separate body from the surveillance camera body 20, and is attachably and detachably mounted on the lens mount 22. The lens device 70 is provided in the surveillance camera body 20 by being mounted on the lens mount 22.

The surveillance camera body 20 comprises an image sensor 24. The image sensor 24 is, for example, a CMOS image sensor, which performs photoelectric conversion of received light and outputs an electrical signal corresponding to the received light. The CMOS image sensor is merely an example, and the image sensor 24 may be an image sensor having an operation system different from the CMOS image sensor, such as a CCD image sensor.

The image sensor 24 has a light-receiving surface 24A. Imaging region light incident on the lens device 70 is imaged on the light-receiving surface 24A by the lens device 70. An image is obtained by imaging the imaging region light on the light-receiving surface 24A. A plurality of photodiodes are disposed in a matrix on the light-receiving surface 24A. Each photodiode receives the imaging region light. The image sensor 24 images the imaging region by receiving an imaging region light. As an example, the plurality of photodiodes include a silicon photodiode having sensitivity to visible light and an indium gallium arsenide photodiode having sensitivity to near-infrared light. The image sensor 24 performs the imaging on each of the visible light and the near-infrared light included in the imaging region light imaged on the light-receiving surface 24A.

The lens device 70 has an optical axis OA. As an example, the optical axis OA is an axis that passes through the center of the light-receiving surface 24A and is perpendicular to the light-receiving surface 24A. The optical axis OA is parallel to the Z axis. As an example, the lens device 70 comprises an objective lens 72, a zoom lens 74, a shake correction lens 76, a stop 78, a filter unit 80, and a master lens 82. The objective lens 72, the zoom lens 74, the shake correction lens 76, the stop 78, the filter unit 80, and the master lens 82 are disposed in order along the optical axis OA from a subject side to an image side. The optical axis OA is an axis that passes through the center of each lens of the objective lens 72, the zoom lens 74, the shake correction lens 76, and the master lens 82. The optical axis OA is also an optical axis of each lens of the objective lens 72, the zoom lens 74, the shake correction lens 76, and the master lens 82, and is an example of a "lens optical axis" according to the technology of the present disclosure.

The imaging region light is incident on the objective lens 72. The incident imaging region light is guided by the objective lens 72 to the zoom lens 74. The zoom lens 74 consists of a lens group including the plurality of lenses that are movable along the optical axis OA, and is used for zooming of the imaging region.

As described below, the shake correction lens 76 is a lens for correcting the shake of the image obtained by imaging the imaging region light on the image sensor 24, and is a lens for shifting the image along the light-receiving surface 24A of the image sensor 24.

The stop 78 has an aperture 78A. The imaging region light guided by the zoom lens 74 passes through the aperture 78A. The stop 78 is a movable stop in which a diameter of the aperture 78A can be changed. That is, an amount of light in the imaging region light is changed by the stop 78.

The filter unit 80 is disposed on the subject side with respect to the image sensor 24. For example, the filter unit 80 is disposed between the stop 78 and the master lens 82. The imaging region light transmitted through the stop 78 is incident on the filter unit 80. Although the details will be described below, the filter unit 80 includes a plurality of optical filters having translucency, and selectively transmits light in a plurality of wavelength ranges included in the imaging region light (for example, the visible light in different wavelength ranges and the near-infrared light) by switching the optical filter that transmits the light among the plurality of optical filters.

The imaging region light transmitted through the filter unit 80 is incident on the master lens 82, and the imaging region light incident on the master lens 82 is imaged on the light-receiving surface 24A. In this way, the imaging region light incident on the lens device 70 is guided to the image sensor 24 by the plurality of lenses provided in the lens device 70, and is imaged on the light-receiving surface 24A of the image sensor 24. The shake correction lens 76 included in the plurality of lenses provided in the lens device 70 is an example of a "shake correction lens" according to the technology of the present disclosure. In addition, the plurality of lenses including the objective lens 72, the zoom lens 74, the shake correction lens 76, the stop 78, the filter unit 80, and the master lens 82 are examples of a "lens" according to the technology of the present disclosure. It should be noted that the arrangement order of the objective lens 72, the zoom lens 74, the shake correction lens 76, the stop 78, the filter unit 80, and the master lens 82 may be the arrangement order other than the above. In addition, each of the objective lens 72, the zoom lens 74, the shake correction lens 76, and the master lens 82 may be a single lens or may be a lens group including the plurality of lenses. In addition, the lens device 70 may comprise other lenses in addition to the objective lens 72, the zoom lens 74, the shake correction lens 76, and the master lens 82.

(Filter Unit)

Figure 3:
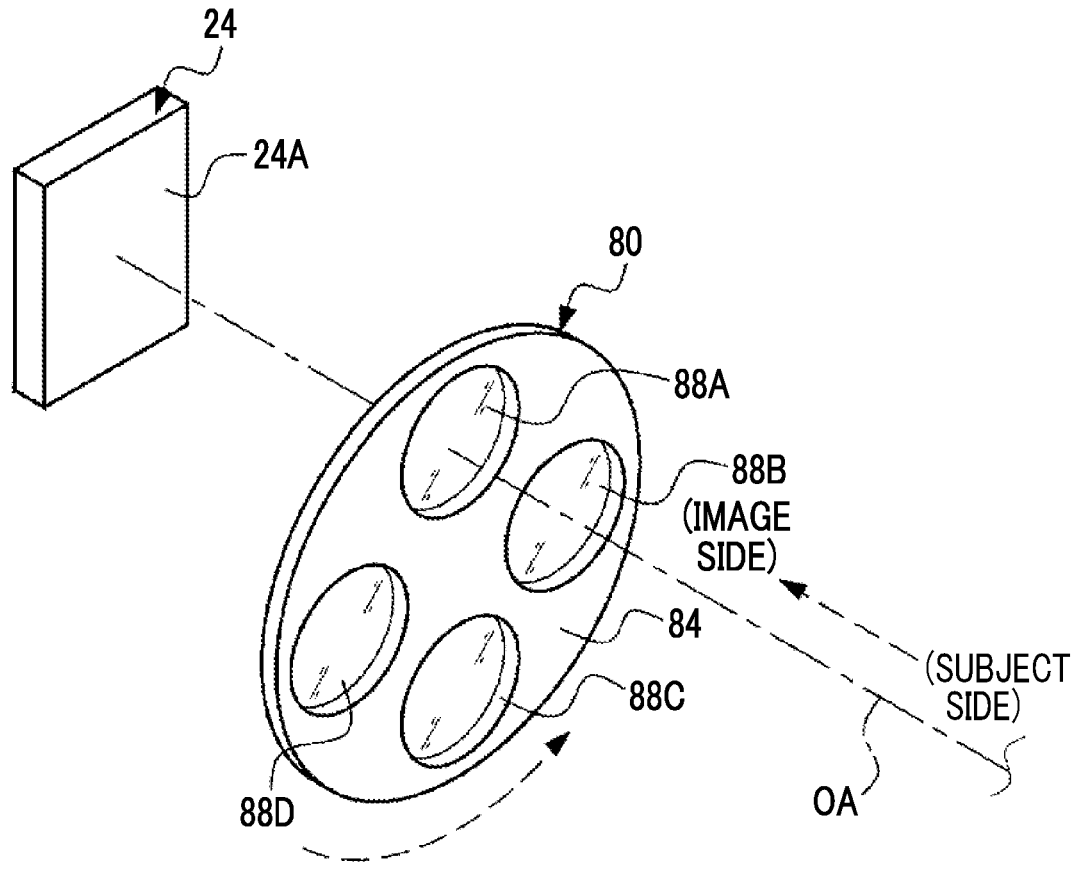
FIG. 3 is a perspective view showing an example of a configuration of a filter unit and an image sensor according to the first embodiment.

As shown in FIG. 3 as an example, the filter unit 80 comprises a disk 84. As an example, the disk 84 is provided with a first BPF 88A, a second BPF 88B, a third BPF 88C, and a fourth BPF 88D as the plurality of optical filters at equal intervals along a circumferential direction. In the following description, in a case in which the distinction is not necessary, the first BPF 88A, the second BPF 88B, the third BPF 88C, and the fourth BPF 88D will be referred to as the optical filter. In addition, in the following description, in a case in which the distinction is not necessary, the first BPF 88A, the second BPF 88B, the third BPF 88C, and the fourth BPF 88D will be referred to as the BPF 88.

The filter unit 80 selectively inserts and removes the plurality of optical filters by a turret system into and from an optical path of the imaging region light in the lens device 70 (hereinafter, simply referred to as the "optical path"). Specifically, by rotating the disk 84 along the circumferential direction (for example, a direction of an arc broken line arrow shown in FIG. 3), the first BPF 88A, the second BPF 88B, the third BPF 88C, and the fourth BPF 88D are selectively inserted into and removed from the optical path (in the example shown in FIG. 3, the optical axis OA). As a result, the first BPF 88A, the second BPF 88B, the third BPF 88C, and the fourth BPF 88D transmit the light in different wavelength ranges, respectively.

In a case in which the optical filter is inserted into the optical path, the optical axis OA penetrates the center of the optical filter, and the center of the optical filter inserted into the optical path matches the center of the light-receiving surface 24A. In the example shown in FIG. 3, since the first BPF 88A is inserted into the optical path, the optical axis OA penetrates the center of the first BPF 88A, and the center of the first BPF 88A matches the center of the light-receiving surface 24A.

The first BPF 88A, the second BPF 88B, and the third BPF 88C are optical filters that transmit the visible light, and the fourth BPF 88D is an optical filter that transmits the near-infrared light.

The first BPF 88A is an optical filter that transmits only light in a blue wavelength range, that is, the visible light in a range of, for example, 400 nm to 490 nm. The second BPF 88B is an optical filter that transmits only light in a green wavelength range, that is, the visible light in a range of, for example, 490 nm to 550 nm. The third BPF 88C is an optical filter that transmits only light in a red wavelength range, that is, the visible light in a range of, for example, 640 nm to 770 nm. The fourth BPF 88D is, for example, an optical filter that transmits only the near-infrared light in a range of 1450 nm to 1650 nm. It should be noted that each of the ranges described herein includes an error that is generally allowed in the technical field to which the technology of the present disclosure belongs, that is, an error in a range that does not contradict the gist of the technology of the present disclosure. In addition, each of the wavelength ranges described herein is merely an example, and the wavelength ranges need only be different from each other.

(Image Sensor)

Figure 4:
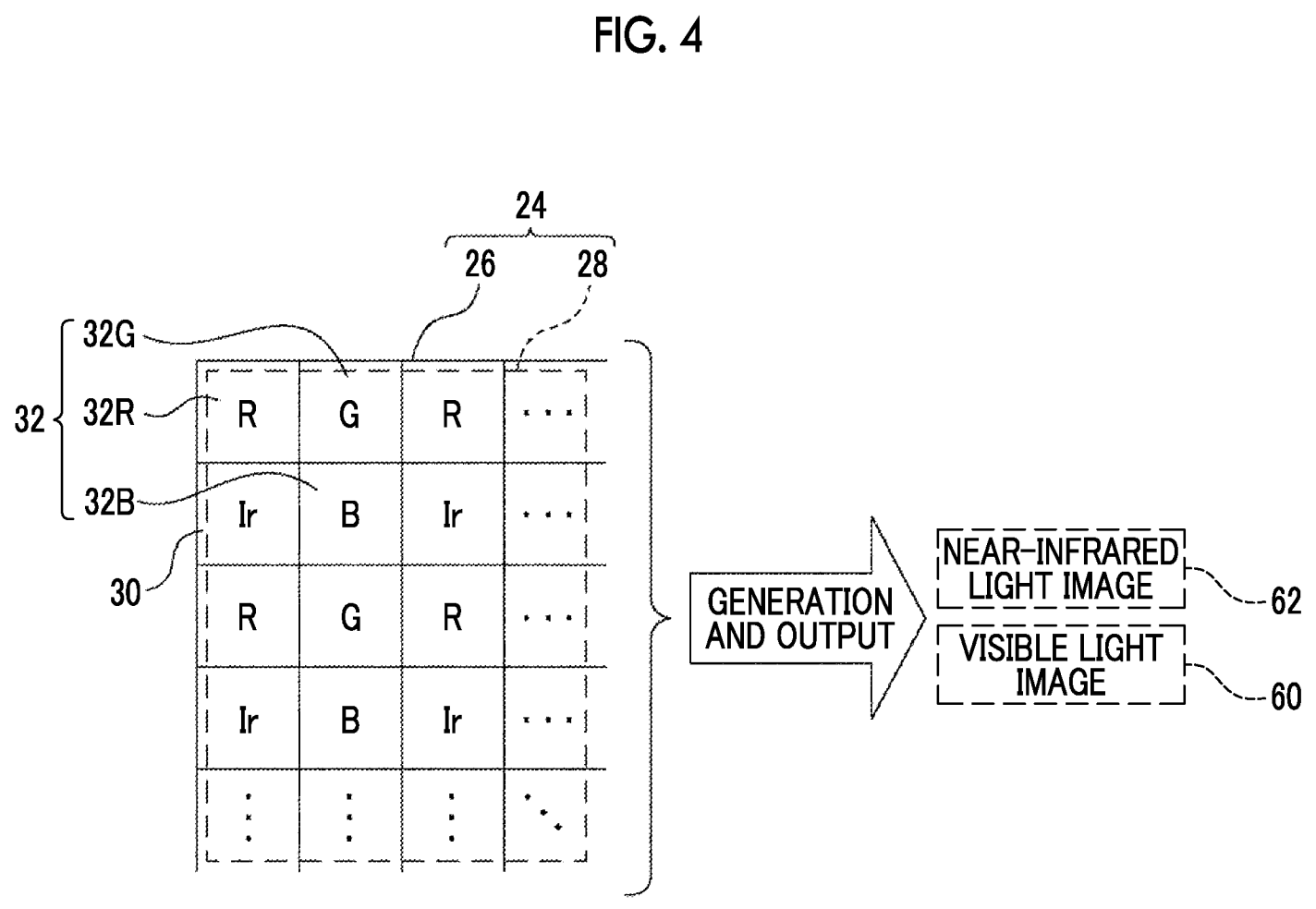

As shown in FIG. 4 as an example, the image sensor 24 includes a light reception unit 26 and a color filter unit 28. The light reception unit 26 includes a plurality of first light-receiving elements 30 and a plurality of second light-receiving elements 32. Examples of the first light-receiving element 30 include an indium gallium arsenide photodiode. Examples of the second light-receiving element 32 include a silicon photodiode.

The color filter unit 28 is disposed on the plurality of first light-receiving elements 30 and the plurality of second light-receiving elements 32. The color filter unit 28 includes an Ir filter, an R filter, a G filter, and a B filter. The Ir filter is a filter that transmits light having a near-infrared (Ir) component. The R filter is a filter that transmits light having a red (R) component. The G filter is a filter that transmits light having a green (G) component. The B filter is a filter that transmits light having a blue (B) component.

The first light-receiving element 30 is a light-receiving element having sensitivity to the light having the Ir component. The second light-receiving element 32 is roughly classified into a light-receiving element 32R having sensitivity to the light having the R component, a light-receiving element 32G having sensitivity to the light having the G component, and a light-receiving element 32B having sensitivity to the light having the B component.

The Ir filter is disposed on the first light-receiving element 30. The R filter is disposed on the light-receiving element 32R. The G filter is disposed on the light-receiving element 32G The B filter is disposed on the light-receiving element 32B. It should be noted that a filter that blocks the near-infrared light is further disposed in each of the light-receiving elements 32R, 36G, and 36B.

In the image sensor 24 configured as described above, the plurality of second light-receiving elements 32 receive the visible light transmitted through any of the first BPF 88A, the second BPF 88B, or the third BPF 88C, generate a visible light image 60 based on the received visible light, and output the generated visible light image 60, the plurality of first light-receiving elements 30 receive the near-infrared light transmitted through the fourth BPF 88D, generate a near-infrared light image 62 based on the received near-infrared light, and output the generated near-infrared light image 62.

(Surveillance Camera Body)

Figure 5:
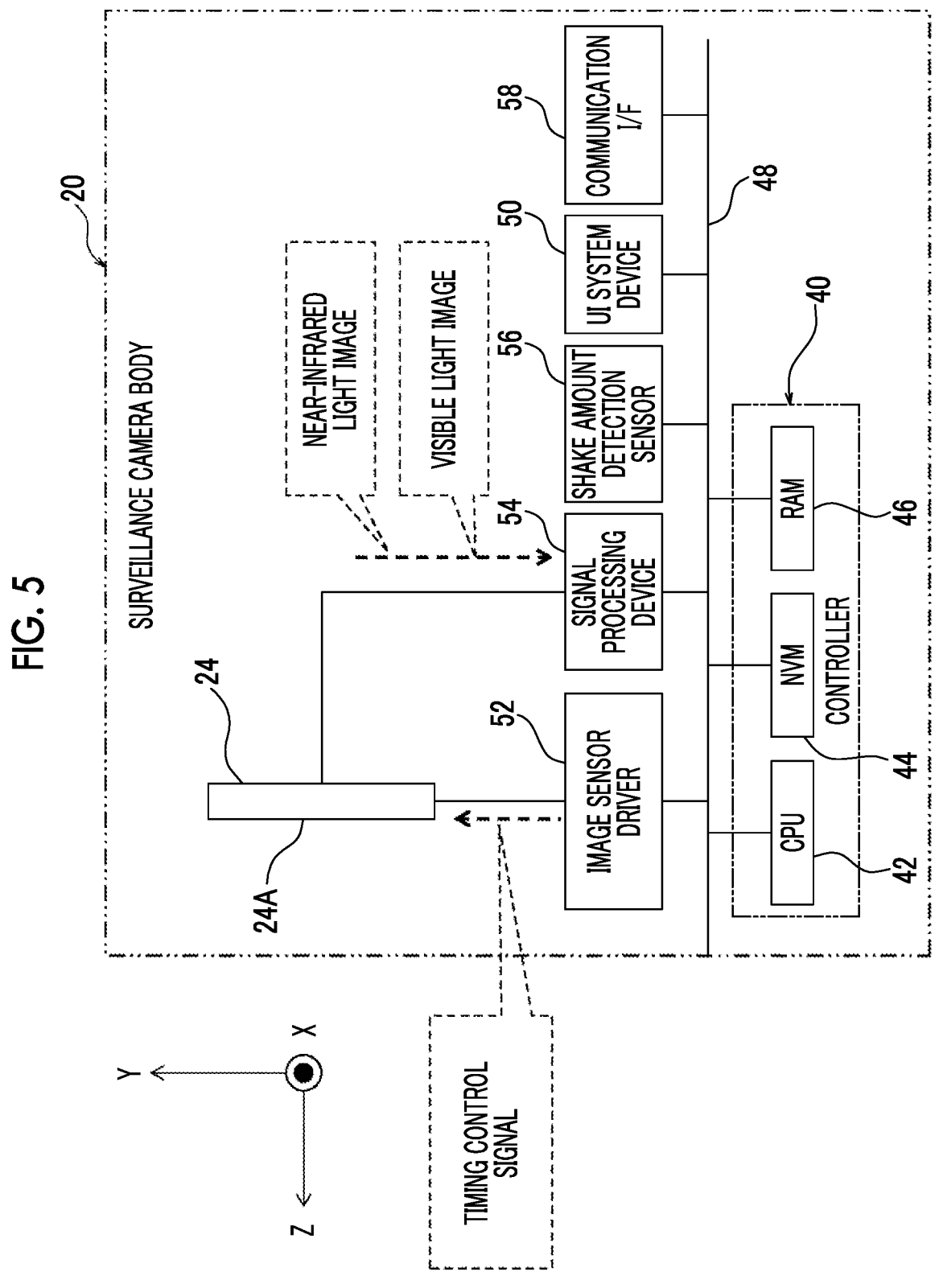
FIG. 5 is a block diagram showing an example of a configuration of a surveillance camera body according to the first embodiment.

As an example, as shown in FIG. 5, the surveillance camera body 20 comprises a controller 40 and a UI system device 50.

The controller 40 controls an operation of the surveillance camera body 20. The controller 40 comprises a CPU 42, an NVM 44, and a RAM 46. The CPU 42, the NVM 44, and the RAM 46 are connected to a bus 48.

Various parameters and various programs are stored in the NVM 44. Examples of the NVM 44 include an EEPROM (for example, a flash type EEPROM). The EEPROM is merely an example of the NVM 44. The NVM 44 need only be various non-volatile storage devices, such as an SSD and/or an HDD. The RAM 46 transitorily stores various types of information and is used as a work memory. Examples of the RAM 46 include a DRAM. The DRAM is merely an example of the RAM 46. The RAM 46 may be an SRAM, and need only be various volatile storage devices.

The NVM 44 stores various programs. The CPU 42 reads out a necessary program from the NVM 44 and executes the read out program on the RAM 46. The CPU 42 executes various types of processing according to the program executed on the RAM 46.

The UI system device 50 is also connected to the bus 48. Under the control of the CPU 42, the UI system device 50 receives an instruction given by a user, or presents various types of information obtained by being processed by the surveillance camera 10 to the user.

In addition, the surveillance camera body 20 comprises an image sensor driver 52, a signal processing device 54, a shake amount detection sensor 56, and a communication I/F 58. The image sensor driver 52, the signal processing device 54, the shake amount detection sensor 56, and the communication I/F 58 are connected to the bus 48.

As an example, as shown in FIG. 2, the image sensor 24 is positioned on the optical axis OA in the rear part of the master lens 82, that is, on the image side with respect to the master lens 82. In a state in which the optical filter of any of the first BPF 88A, the second BPF 88B, or the third BPF 88C shown in FIG. 3 is disposed on the optical axis OA, the image sensor 24 images the imaging region based on the visible light imaged on the light-receiving surface 24A by the master lens 82 to generate the visible light image 60 shown in FIG. 4, and outputs the generated visible light image 60 to the rear part. The visible light image 60 is an image showing the imaging region by the visible light.

In addition, in a state in which the fourth BPF 88D shown in FIG. 3 is disposed on the optical axis OA, the image sensor 24 images the imaging region based on the near-infrared light imaged on the light-receiving surface 24A by the master lens 82 to generate the near-infrared light image 62 shown in FIG. 4, and outputs the generated near-infrared light image 62 to the rear part. The near-infrared light image 62 is an image showing the imaging region by the near-infrared light. It should be noted that, in the following description, in a case in which the distinction is not necessary, the near-infrared light image 62 and the visible light image 60 will be referred to as a "captured image" without reference numerals.

As an example, as shown in FIG. 5, the image sensor driver 52 and the signal processing device 54 are connected to the image sensor 24. Under the control of the CPU 42, the image sensor driver 52 outputs a timing control signal to the image sensor 24. The timing control signal is a signal for controlling the imaging by the image sensor 24. A frame rate of imaging by the image sensor 24 is defined by the timing control signal.

The timing control signal includes a vertical synchronizing signal and a horizontal synchronizing signal. The vertical synchronizing signal is a signal for defining a timing at which transmission of an analog image for one frame is started. The horizontal synchronizing signal is a signal for defining a timing at which output of the analog image for one horizontal line is started. The image sensor 24 starts the output of the captured image in units of frames to the signal processing device 54 in response to the vertical synchronizing signal input from the image sensor driver 52. In addition, the image sensor 24 starts the output of the captured image in units of horizontal lines to the signal processing device 54 in response to the horizontal synchronizing signal input from the image sensor driver 52.

Under the control of the CPU 42, the signal processing device 54 performs signal processing, such as demosaicing processing, noise removal processing, gradation correction processing, and color correction processing, on the captured image input from the image sensor 24. The captured image that has been subjected to the signal processing is output to the CPU 42 by the signal processing device 54. The CPU 42 stores the captured image input from the signal processing device 54 in a predetermined storage region (for example, the NVM 44 and/or the RAM 46).

The shake amount detection sensor 56 detects, for example, an amount of the shake of the surveillance camera 10 shown in FIG. 2 (hereinafter, also simply referred to as the "shake amount"). The shake of the surveillance camera 10 refers to a phenomenon in which a positional relationship between the optical axis OA and the light-receiving surface 24A is changed in the surveillance camera 10. In a case in which the shake of the surveillance camera 10 occurs, the shake of the image occurs. Examples of the image include an image obtained by being captured using the image sensor and/or an optical image obtained by being imaged on the light-receiving surface 24A (hereinafter, also simply referred to as an "image" or a "subject image"). In the first embodiment, the "shake of the image" means a phenomenon in which the subject image deviates from a reference position due to the inclination of the optical axis OA due to a vibration phenomenon, that is, a phenomenon in which the subject image deviates from the reference position due to the relative movement of the optical axis OA with respect to the subject. The vibration phenomenon refers to a phenomenon in which vibration generated from the outside of the surveillance camera 10 (for example, a hand, a wind, and/or a vehicle) and/or the inside of the surveillance camera 10 (for example, a motor mounted on the surveillance camera 10) is transmitted to the lens device 70 to cause the lens device 70 to vibrate. In addition, "inclination of the optical axis OA" means that, for example, the optical axis OA is inclined with respect to a reference axis (for example, the optical axis OA before the vibration phenomenon occurs (that is, the optical axis OA in a case in which the surveillance camera 10 is stationary)). In addition, the "reference position" refers to, for example, a position of the subject image obtained in a state in which the vibration is not applied to the lens device 70 (for example, a position of the subject image in the light-receiving surface 24A).

The shake amount detection sensor 56 shown in FIG. 5 is a gyro sensor, for example. The gyro sensor detects an amount of rotational shake about each of the X axis, the Y axis, and the Z axis. The shake amount detection sensor 56 transforms the amount of rotational shake about the X axis and the amount of rotational shake about the Y axis detected by the gyro sensor into the shake amount in a two-dimensional plane parallel to the X axis and the Y axis to detect the shake amount of the surveillance camera 10. It should be noted that the meaning of parallelism in the present embodiment includes the meaning of substantially parallelism including an error allowed in design and manufacturing, in addition to the meaning of the exact parallelism.

Here, the gyro sensor is shown as an example of the shake amount detection sensor 56, but this is merely an example, and the shake amount detection sensor 56 may be an acceleration sensor. The acceleration sensor detects the shake amount in a two-dimensional plane parallel to the X axis and the Y axis. The shake amount detection sensor 56 outputs the detected shake amount to the CPU 42.

In addition, although the form example is shown in which the shake amount is detected by a physical sensor called the shake amount detection sensor 56, the technology of the present disclosure is not limited to this. For example, a movement vector obtained by comparing the captured images before and after in time series, which are stored in the NVM 44 or the RAM 46, may be used as the shake amount. In addition, the shake amount to be finally used may be derived based on the shake amount detected by the physical sensor and the movement vector obtained by the image processing.

The communication I/F 58 is, for example, a network interface and controls transmission of various types of information to and from the management device 11 via a network. Examples of the network include a WAN, such as the Internet or a public communication network. The communication I/F 58 controls the communication between the surveillance camera 10 shown in FIG. 1 and the management device 11.

(Lens Device)

Figure 6:
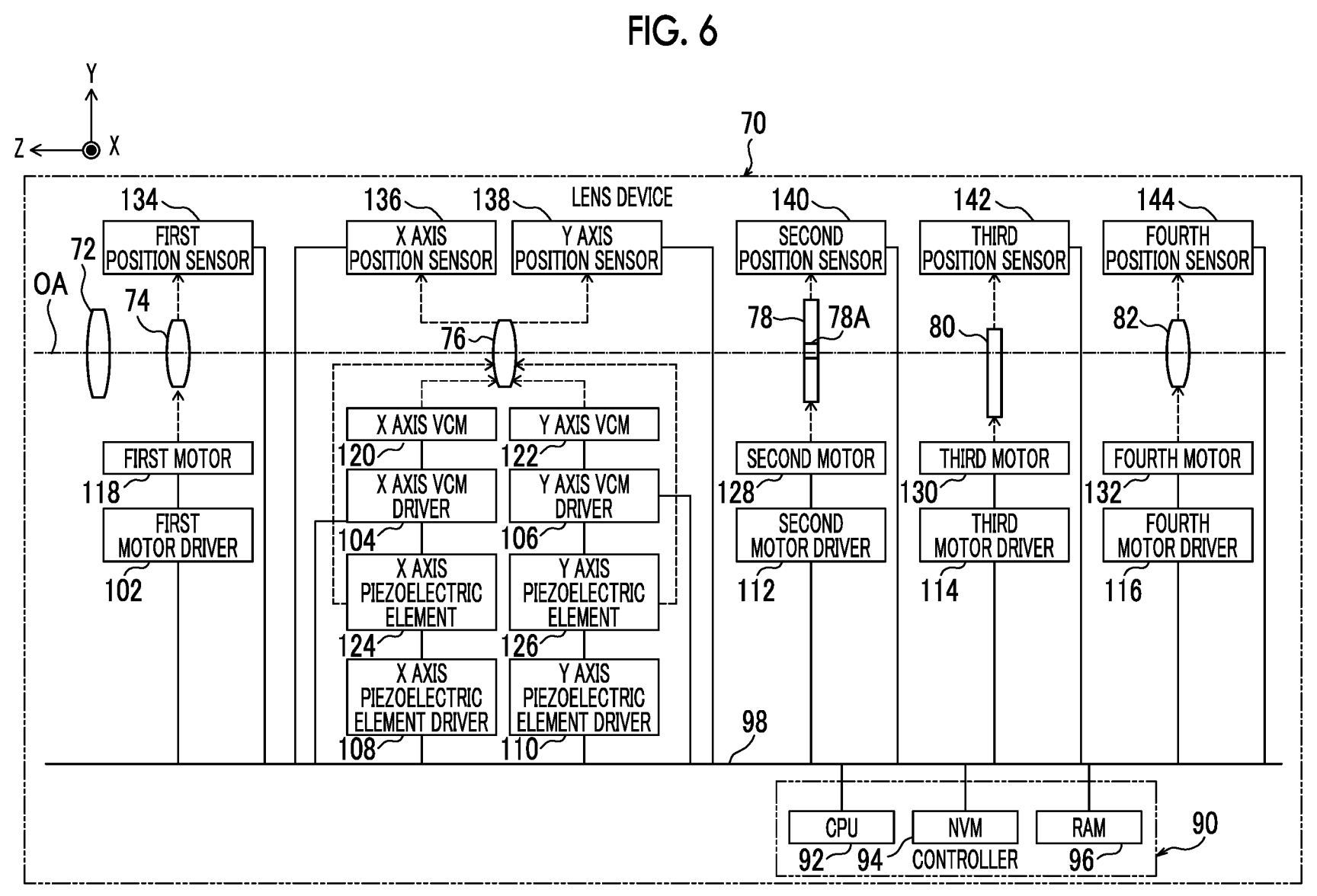

As shown in FIG. 6 as an example, the lens device 70 comprises a controller 90. The controller 90 controls an operation of the lens device 70. The controller 90 comprises a CPU 92, an NVM 94, and a RAM 96. The controller 90 is an example of a "computer applied to a lens device", the CPU 92 is an example of a "processor" according to the technology of the present disclosure, and the RAM 96 is an example of a "memory" according to the technology of the present disclosure. The CPU 92, the NVM 94, and the RAM 96 are connected to a bus 98.

As an example, as shown in FIG. 2, in a state in which the lens device 70 is mounted on the lens mount 22 of the surveillance camera body 20, a connector (not shown) provided in the surveillance camera body 20 and a connector (not shown) provided in the lens device 70 are connected to each other. Then, the CPU 42 of the surveillance camera body 20 shown in FIG. 5 and the CPU 92 of the lens device 70 shown in FIG. 6 are connected to each other in a communicable manner via a connection path including the connector of the surveillance camera body 20 and the connector of the lens device 70. The CPU 92 of the lens device 70 controls the operation of the lens device 70 in response to an instruction given from the CPU 42 of the surveillance camera body 20.

Various parameters and various programs are stored in the NVM 94. Examples of the NVM 94 include an EEPROM (for example, a flash type EEPROM). The EEPROM is merely an example of the NVM 94. The NVM 94 need only be various non-volatile storage devices, such as an SSD and/or an HDD. The RAM 96 transitorily stores various types of information and is used as a work memory. Examples of the RAM 96 include a DRAM. The DRAM is merely an example of the RAM 96. The RAM 96 may be an SRAM, and need only be various volatile storage devices.

The NVM 94 stores various programs. The CPU 92 reads out a necessary program from the NVM 94 and executes the read out program on the RAM 96. The CPU 92 executes various types of processing according to the program executed on the RAM 96. In addition, the "various programs" described herein also include a shake correction/shift processing program 100 (see FIG. 9), which will be described below.

In the lens device 70, the three-axes directions orthogonal to each other are defined by the X axis direction, the Y axis direction, and the Z axis direction. As an example, as shown in FIG. 2, in a state in which the lens device 70 is mounted on the lens mount 22 of the surveillance camera body 20, there is a possibility that the X axis direction, the Y axis direction, and the Z axis direction of the lens device 70 deviate from the X axis direction, the Y axis direction, and the Z axis direction of the surveillance camera 10, respectively, due to the influence of rattling or the like. However, in the following description, for convenience, the X axis direction, the Y axis direction, and the Z axis direction of the lens device 70 match the X axis direction, the Y axis direction, and the Z axis direction of the surveillance camera 10, respectively. The X axis direction and the Y axis direction are directions orthogonal to the optical axis OA of the lens device 70, respectively, and the Z axis direction is a direction parallel to the optical axis OA.

As an example, as shown in FIG. 6, the lens device 70 comprises a first motor driver 102, an X axis VCM driver 104, a Y axis VCM driver 106, an X axis piezoelectric element driver 108, a Y axis piezoelectric element driver 110, a second motor driver 112, a third motor driver 114, and a fourth motor driver 116. In addition, the lens device 70 comprises a first motor 118, an X axis VCM 120, a Y axis VCM 122, an X axis piezoelectric element 124, a Y axis piezoelectric element 126, a second motor 128, a third motor 130, and a fourth motor 132. Further, the lens device 70 comprises a first position sensor 134, an X axis position sensor 136, a Y axis position sensor 138, a second position sensor 140, a third position sensor 142, and a fourth position sensor 144.

The first motor driver 102, the X axis VCM driver 104, the Y axis VCM driver 106, the X axis piezoelectric element driver 108, the Y axis piezoelectric element driver 110, the second motor driver 112, the third motor driver 114, the fourth motor driver 116, the first position sensor 134, the X axis position sensor 136, the Y axis position sensor 138, the second position sensor 140, the third position sensor 142, and the fourth position sensor 144 are connected to a bus 98.

Examples of each of the first position sensor 134, the X axis position sensor 136, the Y axis position sensor 138, the second position sensor 140, the third position sensor 142, and the fourth position sensor 144 include a potentiometer.

The first position sensor 134 detects a position of the zoom lens 74 in the Z axis direction. The X axis position sensor 136 detects a position of the shake correction lens 76 in the X axis direction. The Y axis position sensor 138 detects a position of the shake correction lens 76 in the Y axis direction. The second position sensor 140 detects a diameter of the aperture 78A formed in the stop 78. The third position sensor 142 detects a rotational position of the filter unit 80 with respect to the optical axis OA. The fourth position sensor 144 detects a position of the master lens 82 in the Z axis direction.

A detection result by the first position sensor 134 is output to the CPU 92 by the first position sensor 134. A detection result by the X axis position sensor 136 is output to the CPU 92 by the X axis position sensor 136. A detection result by the Y axis position sensor 138 is output to the CPU 92 by the Y axis position sensor 138. A detection result by the second position sensor 140 is output to the CPU 92 by the second position sensor 140. A detection result by the third position sensor 142 is output to the CPU 92 by the third position sensor 142. A detection result by the fourth position sensor 144 is output to the CPU 92 by the fourth position sensor 144.

The zoom lens 74 is attached to a first sliding mechanism (not shown). The first sliding mechanism is mechanically connected to a drive shaft of the first motor 118, and receives the power of the first motor 118 to move the zoom lens 74 along the Z axis direction. The first motor driver 102 is connected to the first motor 118, and controls the first motor 118 in response to an instruction from the CPU 92. By controlling the first motor 118 via the first motor driver 102 based on the detection result by the first position sensor 134, the CPU 92 controls the position of the zoom lens 74 in the Z axis direction.

The shake correction lens 76 is attached to a shake correction/shift drive mechanism 150 (see FIGS. 7 and 8) of which a mechanical structure will be described in detail below. The shake correction/shift drive mechanism 150 (see FIGS. 7 and 8) comprises the X axis VCM 120 and the Y axis VCM 122. The X axis VCM 120 moves the shake correction lens 76 along the X axis direction by applying the power to the shake correction lens 76 along the X axis direction. The Y axis VCM 122 moves the shake correction lens 76 along the Y axis direction by applying the power to the shake correction lens 76 along the Y axis direction.

The X axis VCM driver 104 is connected to the X axis VCM 120, and controls the X axis VCM 120 in response to an instruction from the CPU 92. The CPU 92 controls the position of the shake correction lens 76 in the X axis direction by controlling the X axis VCM 120 via the X axis VCM driver 104 based on a shake amount detection result by the shake amount detection sensor 56 output from the CPU 42 shown in FIG. 5 and the detection result by the X axis position sensor 136 shown in FIG. 6. The Y axis VCM driver 106 is connected to the Y axis VCM 122, and controls the Y axis VCM 122 in response to an instruction from the CPU 92. The CPU 92 controls the position of the shake correction lens 76 in the Y axis direction by controlling the Y axis VCM 122 via the Y axis VCM driver 106 based on the shake amount detection result by the shake amount detection sensor 56 output from the CPU 42 shown in FIG. 5 and the detection result by the Y axis position sensor 138 shown in FIG. 6.

In addition, the shake correction/shift drive mechanism 150 (see FIGS. 7 and 8) comprises the X axis piezoelectric element 124 and the Y axis piezoelectric element 126. The X axis piezoelectric element 124 moves the shake correction lens 76 along the X axis direction by applying the power to the shake correction lens 76 along the X axis direction. The Y axis piezoelectric element 126 moves the shake correction lens 76 along the Y axis direction by applying the power to the shake correction lens 76 along the Y axis direction.

The X axis piezoelectric element driver 108 is connected to the X axis piezoelectric element 124, and controls the X axis piezoelectric element 124 in response to an instruction from the CPU 92. The CPU 92 controls the position of the shake correction lens 76 in the X axis direction by controlling the X axis piezoelectric element 124 via the X axis piezoelectric element driver 108 based on an image shift command output from the CPU 42 shown in FIG. 5 and the detection result by the X axis position sensor 136 shown in FIG. 6. The Y axis piezoelectric element driver 110 is connected to the Y axis piezoelectric element 126, and controls the Y axis piezoelectric element 126 in response to an instruction from the CPU 92. The CPU 92 controls the position of the shake correction lens 76 in the Y axis direction by controlling the Y axis piezoelectric element 126 via the Y axis piezoelectric element driver 110 based on an image shift command output from the CPU 42 shown in FIG. 5 and the detection result by the Y axis position sensor 138 shown in FIG. 6.

The stop 78 has a plurality of blades (not shown) capable of opening and closing the aperture 78A. The plurality of blades are mechanically connected to a drive shaft of the second motor 128, and receive the power of the second motor 128 to open and close the aperture 78A. The second motor driver 112 is connected to the second motor 128, and controls the second motor 128 in response to an instruction from the CPU 92. By controlling the second motor 128 via the second motor driver 112 shown in FIG. 6 based on the detection result by the second position sensor 140 and the amount of received light on the light-receiving surface 24A shown in FIG. 5, the CPU 92 adjusts an opening degree of the aperture 78A.

The filter unit 80 is attached to a rotation mechanism (not shown). The rotation mechanism is mechanically connected to a drive shaft of the third motor 130, and receives the power of the third motor 130 to rotate the disk 84 (see FIG. 3) in the circumferential direction, so that the plurality of optical filters are inserted into and removed from the optical path. The third motor driver 114 is connected to the third motor 130, and controls the third motor 130 in response to an instruction from the CPU 92. By controlling the third motor 130 via the third motor driver 114 based on the detection result by the third position sensor 142, the CPU 92 controls the rotational position of the filter unit 80 with respect to the optical axis OA.

The master lens 82 is attached to a second sliding mechanism (not shown). The second sliding mechanism is mechanically connected to a drive shaft of the fourth motor 132, and receives the power of the fourth motor 132 to move the master lens 82 along the Z axis direction. The fourth motor driver 116 is connected to the fourth motor 132, and controls the fourth motor 132 in response to an instruction from the CPU 92. By controlling the fourth motor 132 via the fourth motor driver 116 based on the detection result by the fourth position sensor 144, the CPU 92 controls the position of the master lens 82 in the Z axis direction.
(Shake Correction/Shift Drive Mechanism)

Figure 7:
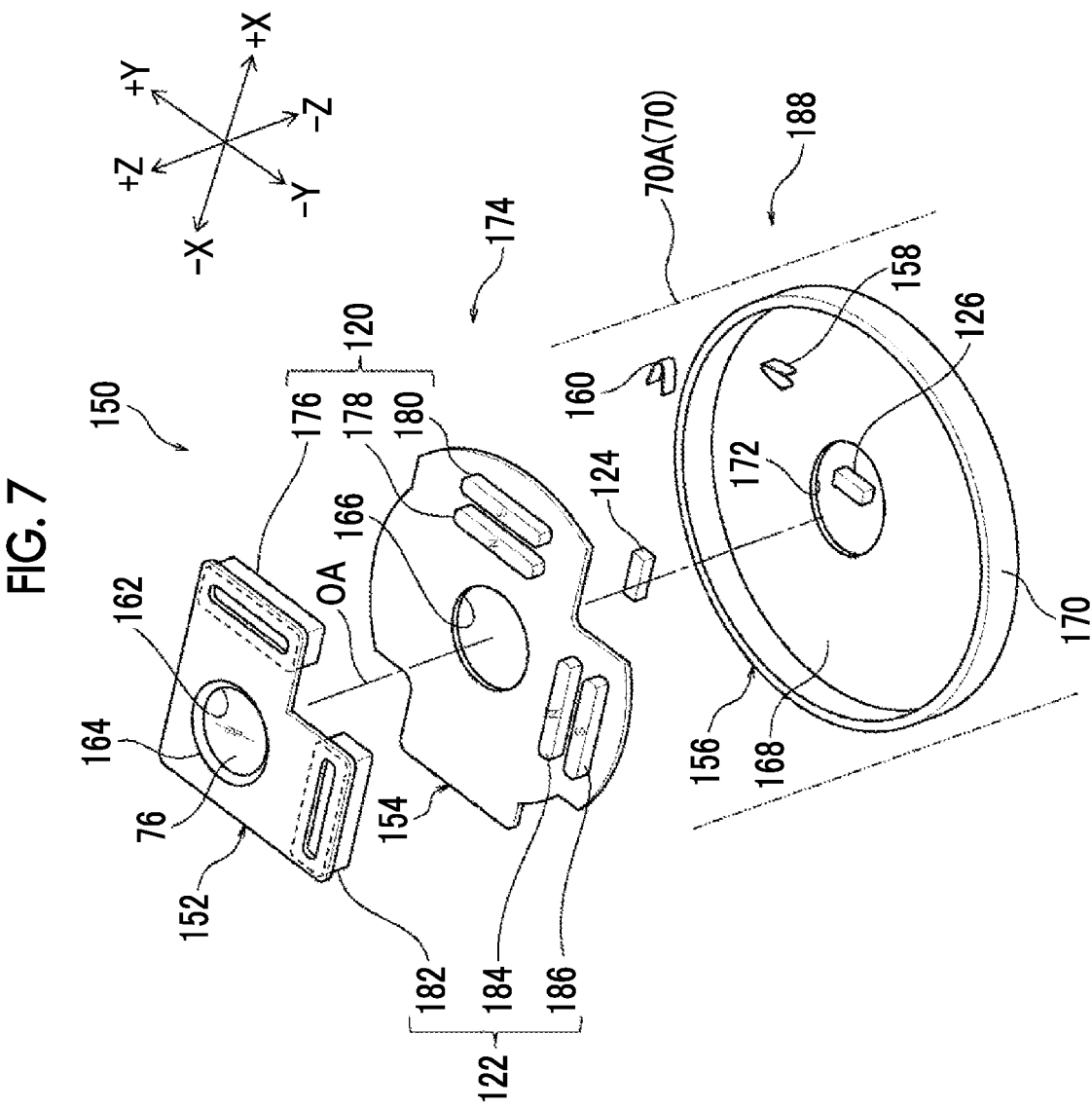
FIG. 7 is an exploded perspective view showing an example of a configuration of a shake correction/shift drive mechanism according to the first embodiment.
Figure 8:
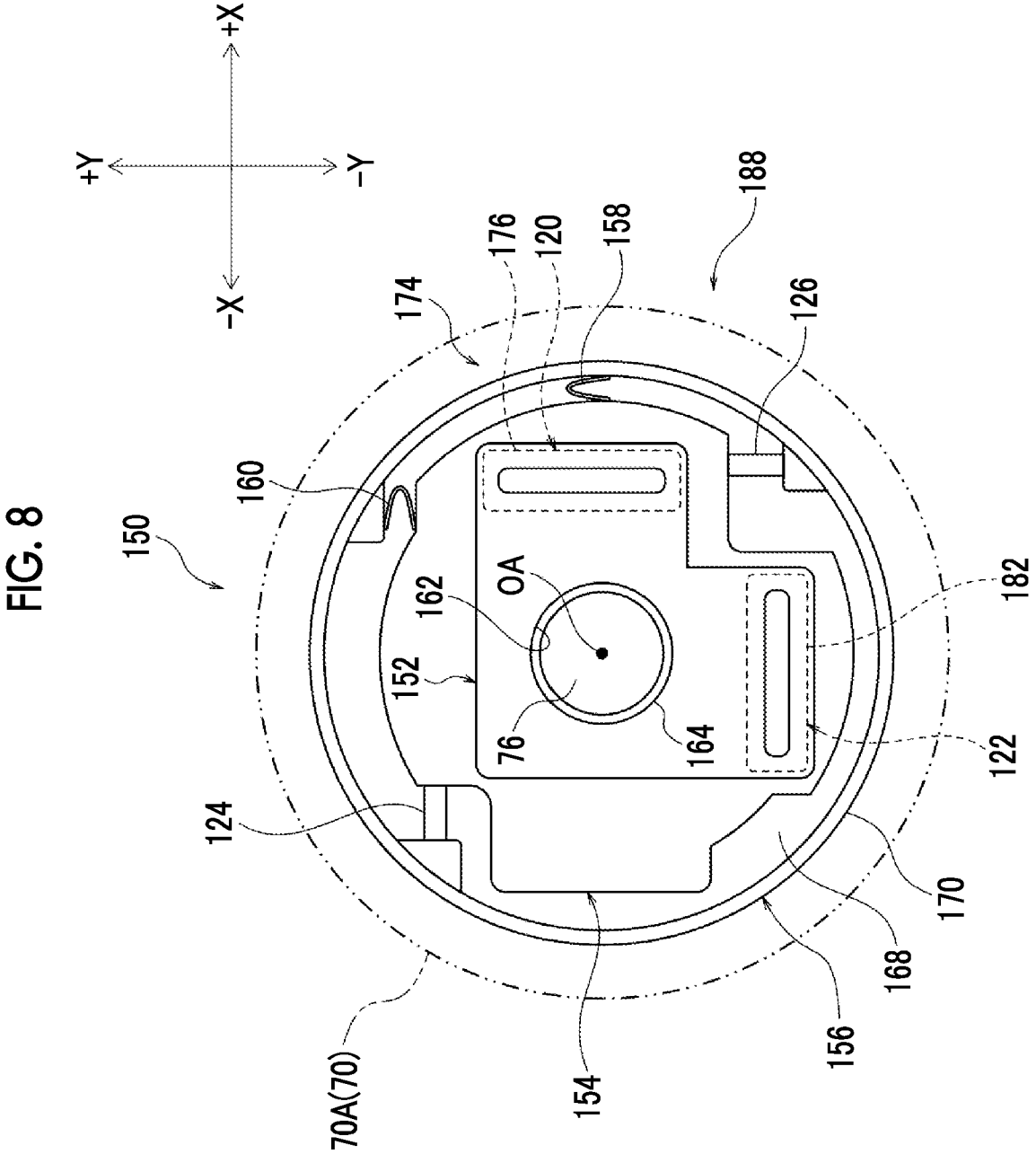
FIG. 8 is a front view showing an example of a configuration of the shake correction/shift drive mechanism according to the first embodiment.

As an example, as shown in FIGS. 7 and 8, the shake correction/shift drive mechanism 150 comprises a holding member 152, a first support member 154, a second support member 156, the X axis VCM 120, the Y axis VCM 122, the X axis piezoelectric element 124, the Y axis piezoelectric element 126, an X axis leaf spring 158, and a Y axis leaf spring 160.

A +X axis direction indicates a direction toward a first side in the X axis direction, and a −X axis direction indicates a direction toward a second side opposite to the first side in the X axis direction. A +Y axis direction indicates a direction toward a first side in the Y axis direction, and a −Y axis direction indicates a direction toward a second side opposite to the first side in the Y axis direction. A +Z axis direction indicates a direction toward a first side in the Z axis direction, and a −Z axis direction indicates a direction toward a second side opposite to the first side in the Z axis direction. It should be noted that, in a case in which the +X axis direction and the −X axis direction are not distinguished from each other, the +X axis direction and the −X axis direction are collectively referred to as the X axis direction. Similarly, in a case in which the +Y axis direction and the −Y axis direction are not distinguished from each other, the +Y axis direction and the −Y axis direction are collectively referred to as the Y axis direction. Similarly, in a case in which the +Z axis direction and the −Z axis direction are not distinguished from each other, the +Z axis direction and the −Z axis direction are collectively referred to as the Z axis direction. The Z axis direction is parallel to the optical axis OA of the lens device 70. For example, the +Z axis direction corresponds to the subject side, and the −Z axis direction corresponds to the image side.

The X-Y coordinate plane used in the following description is defined by the X axis direction and the Y axis direction. The X-Y coordinate plane is an example of a "coordinate plane intersecting the optical axis of the lens" according to the technology of the present disclosure, the X axis direction is an example of a "first direction" according to the technology of the present disclosure, and the Y axis direction is an example of a "second direction intersecting the first direction" according to the technology of the present disclosure.

The holding member 152 is formed in a substantially plate shape. The holding member 152 is disposed using the Z axis direction as a plate thickness direction. A hole 162 that penetrates in the Z axis direction is formed in the holding member 152. A cross-sectional shape of the hole 162 as viewed from the axial direction is circular. The shake correction lens 76 is disposed inside the hole 162. A circular fixing member 164 is provided on an outer peripheral portion of the shake correction lens 76, and the outer peripheral portion of the shake correction lens 76 is fixed to an inner peripheral surface of the hole 162 via the fixing member 164 or the like. The shake correction lens 76 is held by the holding member 152 by fixing the outer peripheral portion to the inner peripheral surface of the hole 162 via the fixing member 164 or the like. In a state in which the X axis VCM 120, the Y axis VCM 122, the X axis piezoelectric element 124, and the Y axis piezoelectric element 126, which will be described below, are not operated and the shake of the surveillance camera 10 does not occur, the center of the shake correction lens 76 is positioned on the optical axis OA.

The first support member 154 is formed in a substantially plate shape. The first support member 154 is disposed using the Z axis direction as a plate thickness direction. The first support member 154 is disposed to face the holding member 152 in the Z axis direction. A hole 166 that penetrates in the Z axis direction is formed in the first support member 154. A cross-sectional shape of the hole 166 as viewed from the axial direction is circular. The hole 166 is formed in a size having a diameter equal to or larger than a diameter of the shake correction lens 76. In the examples shown in FIGS. 7 and 8, for example, the first support member 154 is disposed with respect to the holding member 152 in the −Z axis direction. It should be noted that the first support member 154 may be disposed with respect to the holding member 152 in the +Z axis direction. By disposing a sliding member (not shown), such as a ball, between the holding member 152 and the first support member 154, the holding member 152 is supported by the first support member 154 to be movable along the X-Y coordinate plane. In a state in which the X axis VCM 120, the Y axis VCM 122, the X axis piezoelectric element 124, and the Y axis piezoelectric element 126, which will be described below, are not operated and the shake of the surveillance camera 10 does not occur, the center of the hole 166 is positioned on the optical axis OA.

The second support member 156 is fixed to a housing 70A of the lens device 70. The housing 70A of the lens device 70 is a member that supports the objective lens 72, the zoom lens 74, the stop 78, the filter unit 80, and the master lens 82 (see FIG. 2) in addition to the shake correction lens 76 and the shake correction/shift drive mechanism 150, and the second support member 156 is fixed to the housing 70A of the lens device 70.

As an example, the second support member 156 is formed in a substantially disk shape having a plate-shaped portion 168 and an annular-shaped portion 170 formed along an outer peripheral portion of the plate-shaped portion 168. The annular-shaped portion 170 extends from the outer peripheral portion of the plate-shaped portion 168 in the +Z axis direction. The second support member 156 is disposed in a state in which a plate thickness direction of the plate-shaped portion 168 matches the Z axis direction. The first support member 154 is disposed inside the annular-shaped portion

170 formed in the second support member 156, and the first support member 154 is disposed to face the plate-shaped portion 168 in the Z axis direction. A hole 172 that penetrates in the Z axis direction is formed in the plate-shaped portion 168. A cross-sectional shape of the hole 172 as viewed from the axial direction is circular. The hole 172 is formed in a size having a diameter equal to or larger than the diameter of the shake correction lens 76. The center of the hole 172 is positioned on the optical axis OA. By disposing a sliding member (not shown), such as a ball, between the first support member 154 and the plate-shaped portion 168, the first support member 154 is supported by the second support member 156 to be movable along the X-Y coordinate plane.

A shake correction drive mechanism 174 is formed by the X axis VCM 120 and the Y axis VCM 122. The X axis VCM 120 is an example of a "voice coil motor" and a "first actuator" according to the technology of the present disclosure, the Y axis VCM 122 is an example of the "voice coil motor" and a "second actuator" according to the technology of the present disclosure, and the shake correction drive mechanism 174 is an example of a "first drive mechanism" according to the technology of the present disclosure.

The shake correction drive mechanism 174 is provided between the holding member 152 and the first support member 154. The shake correction drive mechanism 174 moves the shake correction lens 76 along the X-Y coordinate plane in a direction in which the shake of the image is corrected, by applying the power to the shake correction lens 76 along the X-Y coordinate plane. That is, the X axis VCM 120 moves the shake correction lens 76 along the X axis direction in a direction in which the shake of the image in the X axis direction is corrected, by applying the power to the shake correction lens 76 along the X axis direction, and the Y axis VCM 122 moves the shake correction lens 76 along the Y axis direction in a direction in which the shake of the image in the Y axis direction is corrected, by applying the power to the shake correction lens 76 along the Y axis direction.

For example, the X axis VCM 120 is disposed with respect to the shake correction lens 76 in the +X axis direction. It should be noted that the X axis VCM 120 may be disposed in the −X axis direction with respect to the shake correction lens 76. The X axis VCM 120 is provided between the holding member 152 and the first support member 154 in the Z axis direction. For example, the X axis VCM 120 is a flat coil type voice coil motor, and includes a coil 176 and a pair of magnets 178 and 180.

As an example, the coil 176 is fixed to the holding member 152, and the pair of magnets 178 and 180 is fixed to the first support member 154. It should be noted that the coil 176 may be fixed to the first support member 154, and the pair of magnets 178 and 180 may be fixed to the holding member 152. The coil 176 is disposed using the Z axis direction as the axial direction, and the pair of magnets 178 and 180 is disposed side by side in the X axis direction. An N pole of the magnet 178 faces the coil 176, and an S pole of the magnet 180 faces the coil 176.

The X axis VCM 120 generates the power in the X axis direction. A direction of a current flowing through the coil 176 is switched by the X axis VCM driver 104 (see FIG. 6). By switching the direction of the current flowing through the coil 176, a direction of a force received by the coil 176 from the pair of magnets 178 and 180 is switched. In a case in which the coil 176 receives the force from the pair of magnets 178 and 180 in the +X axis direction, the power is applied to the holding member 152 and the shake correction lens 76 in the +X axis direction, and the holding member 152 and the shake correction lens 76 are moved in the +X axis direction. In a case in which the coil 176 receives the force from the pair of magnets 178 and 180 in the −X axis direction, the power is applied to the holding member 152 and the shake correction lens 76 in the −X axis direction, and the holding member 152 and the shake correction lens 76 are moved in the −X axis direction. By applying the power by the X axis VCM 120 in this way, the shake correction lens 76 is moved in the X axis direction, the shake of the image in the X axis direction is corrected.

For example, the Y axis VCM 122 is disposed with respect to the shake correction lens 76 in the −Y axis direction. It should be noted that the Y axis VCM 122 may be disposed in the +Y axis direction with respect to the shake correction lens 76. The Y axis VCM 122 is provided between the holding member 152 and the first support member 154 in the Z axis direction. For example, the Y axis VCM 122 is a flat coil type voice coil motor, and includes a coil 182 and a pair of magnets 184 and 186.

As an example, the coil 182 is fixed to the holding member 152, and the pair of magnets 184 and 186 is fixed to the first support member 154. It should be noted that the coil 182 may be fixed to the first support member 154, and the pair of magnets 184 and 186 may be fixed to the holding member 152. The coil 182 is disposed using the Z axis direction as the axial direction, and the pair of magnets 184 and 186 is disposed side by side in the Y axis direction. An N pole of the magnet 184 faces the coil 182, and an S pole of the magnet 186 faces the coil 182.

The Y axis VCM 122 generates the power in the Y axis direction. A direction of a current flowing through the coil 182 is switched by the Y axis VCM driver 106 (see FIG. 6). By switching the direction of the current flowing through the coil 182, a direction of a force received by the coil 182 from the pair of magnets 184 and 186 is switched. In a case in which the coil 182 receives the force from the pair of magnets 184 and 186 in the +Y axis direction, the power is applied to the holding member 152 and the shake correction lens 76 in the +Y axis direction, and the holding member 152 and the shake correction lens 76 are moved in the +Y axis direction. In a case in which the coil 182 receives the force from the pair of magnets 184 and 186 in the −Y axis direction, the power is applied to the holding member 152 and the shake correction lens 76 in the −Y axis direction, and the holding member 152 and the shake correction lens 76 are moved in the −Y axis direction. By applying the power by the Y axis VCM 122 in this way, the shake correction lens 76 is moved in the Y axis direction, the shake of the image in the Y axis direction is corrected.

It should be noted that, as an example, the X axis VCM 120 is the flat coil type voice coil motor in which the coil 176 and the pair of magnets 178 and 180 face each other in the axial direction of the coil 176, but the X axis VCM 120 may be a square coil type voice coil motor in which the coil 176 is disposed between the pair of magnets 178 and 180 facing each other in the radial direction of the coil 176. Similarly, as an example, the Y axis VCM 122 is the flat coil type voice coil motor in which the coil 182 and the pair of magnets 184 and 186 face each other in the axial direction of the coil 182, but the Y axis VCM 122 may be a square coil type voice coil motor in which the coil 182 is disposed between the pair of magnets 184 and 186 facing each other in the radial direction of the coil 182.

A shift drive mechanism 188 is formed by the X axis piezoelectric element 124, the Y axis piezoelectric element 126, the X axis leaf spring 158, and the Y axis leaf spring 160. The X axis piezoelectric element 124 is an example of an "actuator" and a "third actuator" according to the technology of the present disclosure, and the Y axis piezoelectric element 126 is an example of the "actuator" and a "fourth actuator" according to the technology of the present disclosure. The X axis leaf spring 158 is an example of a "elastic member" according to the technology of the present disclosure, the Y axis leaf spring 160 is an example of a "elastic member" according to the technology of the present disclosure, and the shift drive mechanism 188 is an example of a "second drive mechanism" according to the technology of the present disclosure.

The shift drive mechanism 188 is provided between the first support member 154 and the second support member 156. The shift drive mechanism 188 moves the shake correction lens 76 along the X-Y coordinate plane in a direction in which the image is shifted, by applying the power to the shake correction lens 76 along the X-Y coordinate plane. That is, the X axis piezoelectric element 124 moves the shake correction lens 76 along the X axis direction in a direction for shifting the image along the X axis direction by applying the power to the shake correction lens 76 along the X axis direction, and the Y axis piezoelectric element 126 moves the shake correction lens 76 along the Y axis direction in a direction for shifting image along the Y axis direction by applying the power to the shake correction lens 76 along the Y axis direction.

For example, the X axis piezoelectric element 124 is disposed with respect to the first support member 154 in the −X axis direction. The X axis piezoelectric element 124 is provided between the first support member 154 and the second support member 156 in the X axis direction. It should be noted that, instead of the X axis piezoelectric element 124, for example, an actuator, such as a direct current motor, that generates the same power as the piezoelectric element may be used.

The X axis leaf spring 158 is disposed at a position facing the X axis piezoelectric element 124. That is, the X axis leaf spring 158 is disposed with respect to the first support member 154 in the +X axis direction. The X axis piezoelectric element 124 is provided between the first support member 154 and the second support member 156 in the X axis direction. For example, the X axis leaf spring 158 is a U-shaped or V-shaped leaf spring. It should be noted that the X axis piezoelectric element 124 may be disposed with respect to the first support member 154 in the +X axis direction, and the X axis leaf spring 158 may be disposed with respect to the first support member 154 in the −X axis direction. In addition, the X axis leaf spring 158 may be a leaf spring having a shape other than a U-shape or a V-shape. In addition, instead of the X axis leaf spring 158, an elastic member having elasticity, such as a coil spring, a torsion spring, rubber, or a sponge, may be used.

The X axis piezoelectric element 124 generates the power in the X axis direction. The X axis piezoelectric element 124 is disposed in a direction in which the power is generated in the +X axis direction. The presence or absence of the electric power supply to the X axis piezoelectric element 124 is switched by the X axis piezoelectric element driver 108 (see FIG. 6). In a case in which the electric power is supplied to the X axis piezoelectric element 124, the X axis piezoelectric element 124 is operated, and in a case in which the electric power supply to the X axis piezoelectric element 124 is stopped, the X axis piezoelectric element 124 is stopped. In a case in which the X axis piezoelectric element 124 is operated, the power is applied to the holding member 152 and the shake correction lens 76 by the X axis piezoelectric element 124 via the second support member 156 in the +X axis direction, and the holding member 152, the shake correction lens 76, and the second support member 156 are moved in the +X axis direction against the elastic force of the X axis leaf spring 158. By applying the power by the X axis piezoelectric element 124 in this way, the shake correction lens 76 is moved, the image in the +X axis direction is shifted. In a case in which the X axis piezoelectric element 124 is stopped from the state in which the X axis piezoelectric element 124 is operated, the elastic force in the −X axis direction due to the X axis leaf spring 158 acts on the holding member 152 and the shake correction lens 76 via the second support member 156, and the holding member 152, the shake correction lens 76, and the second support member 156 are moved in the −X axis direction and restored to the original positions.

For example, the Y axis piezoelectric element 126 is disposed with respect to the first support member 154 in the −Y axis direction. The Y axis piezoelectric element 126 is provided between the first support member 154 and the second support member 156 in the Y axis direction. It should be noted that, instead of the Y axis piezoelectric element 126, for example, an actuator, such as a direct current motor, that generates the same power as the piezoelectric element may be used.

The Y axis leaf spring 160 is disposed at a position facing the Y axis piezoelectric element 126. That is, the Y axis leaf spring 160 is disposed with respect to the first support member 154 in the +Y axis direction. The Y axis piezoelectric element 126 is provided between the first support member 154 and the second support member 156 in the Y axis direction. For example, the Y axis leaf spring 160 is a U-shaped or V-shaped leaf spring. It should be noted that the Y axis piezoelectric element 126 may be disposed with respect to the first support member 154 in the +Y axis direction, and the Y axis leaf spring 160 may be disposed with respect to the first support member 154 in the −Y axis direction. In addition, the Y axis leaf spring 160 may be a leaf spring having a shape other than a U-shape or a V-shape. In addition, instead of the Y axis leaf spring 160, an elastic member having elasticity, such as a coil spring, a torsion spring, rubber, or a sponge, may be used.

The Y axis piezoelectric element 126 generates the power in the Y axis direction. The Y axis piezoelectric element 126 is disposed in a direction in which the power is generated in the +Y axis direction. The presence or absence of the electric power supply to the Y axis piezoelectric element 126 is switched by the Y axis piezoelectric element driver 110 (see FIG. 6). In a case in which the electric power is supplied to the Y axis piezoelectric element 126, the Y axis piezoelectric element 126 is operated, and in a case in which the electric power supply to the Y axis piezoelectric element 126 is stopped, the Y axis piezoelectric element 126 is stopped. In a case in which the Y axis piezoelectric element 126 is operated, the power is applied to the holding member 152 and the shake correction lens 76 by the Y axis piezoelectric element 126 via the second support member 156 in the +Y axis direction, and the holding member 152, the shake correction lens 76, and the second support member 156 are moved in the +Y axis direction against the elastic force of the Y axis leaf spring 160. By applying the power by the Y axis piezoelectric element 126 in this way, the shake correction lens 76 is moved, the image in the +Y axis direction is shifted. In a case in which the Y axis piezoelectric element 126 is stopped from the state in which the Y axis piezoelectric element 126 is operated, the elastic force in the −Y axis direction due to the Y axis leaf spring 160 acts on the holding member 152 and the shake correction lens 76 via the second support member 156, and the holding member 152, the shake correction lens 76, and the second support member 156 are moved in the −Y axis direction and restored to the original positions.

(Functional Configuration of CPU of Lens Device)

Figure 9:
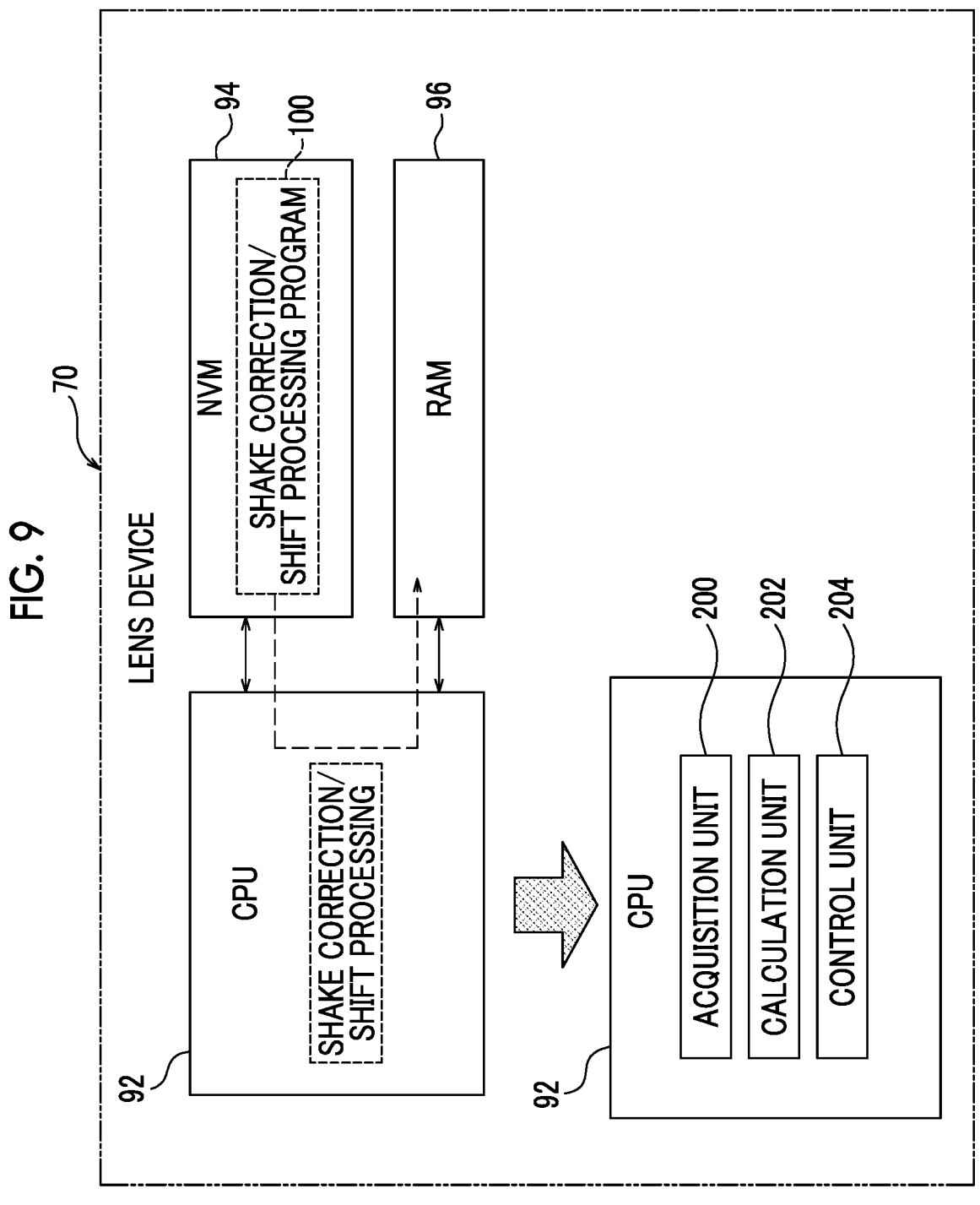
FIG. 9 is a block diagram showing an example of a functional configuration of a CPU of the lens device according to the first embodiment.

As shown in FIG. 9 as an example, shake correction/shift processing is realized by the CPU 92 of the lens device 70 executing the shake correction/shift processing program 100. The shake correction/shift processing program 100 is an example of a "program" according to the technology of the present disclosure. In the example shown in FIG. 9, the shake correction/shift processing program 100 is stored in the NVM 94, and the CPU 92 reads out the shake correction/shift processing program 100 from the NVM 94 and executes the read out shake correction/shift processing program 100 on the RAM 96.

The CPU 92 performs the shake correction/shift processing according to the shake correction/shift processing program 100 executed on the RAM 96. By executing the shake correction/shift processing program 100 on the RAM 96, the CPU 92 is operated as an acquisition unit 200, a calculation unit 202, and a control unit 204. It should be noted that, although the details will be described below, the shake correction/shift processing is processing including shake correction processing (see FIG. 24) and shift processing (see FIG. 25).

Figure 10:
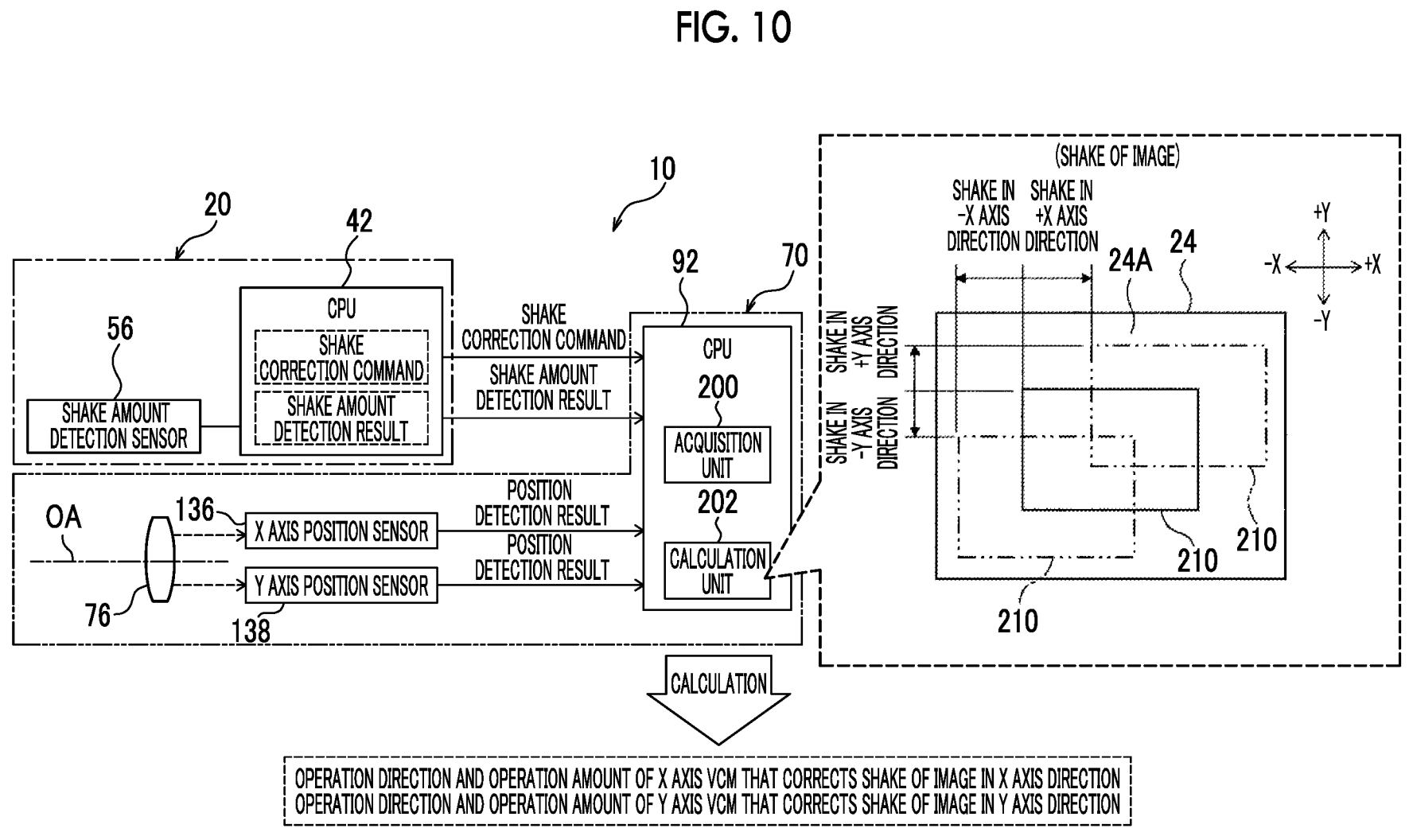

As shown in FIG. 10 as an example, the acquisition unit 200 acquires a shake correction command and a shake amount detection result by the shake amount detection sensor 56 as the information transmitted from the CPU 42 of the surveillance camera body 20. The shake correction command is command information for requesting the shake correction, and the shake amount detection result by the shake amount detection sensor 56 is information indicating a result of the detection of the shake amount of the surveillance camera 10. Moreover, the acquisition unit 200 acquires the position detection result by the X axis position sensor 136 and the position detection result by the Y axis position sensor 138. The position detection result by the X axis position sensor 136 is information indicating a result of the detection of the position of the shake correction lens 76 in the X axis direction, and the position detection result by the Y axis position sensor 138 is information indicating a result of the detection of the position of the shake correction lens 76 in the Y axis direction.

In a case in which the shake correction command is acquired by the acquisition unit 200, the calculation unit 202 calculates an operation direction and an operation amount of the X axis VCM 120 (see FIG. 11) for correcting a shake of an image 210 in the X axis direction based on the shake amount detection result by the shake amount detection sensor 56. The shake of the image 210 in the X axis direction includes a shake of the image 210 in the +X axis direction and a shake of the image 210 in the −X axis direction. Specifically, the calculation unit 202 calculates the operation direction and the operation amount of the X axis VCM 120 for restoring the position in the X axis direction of the image 210 (displayed by a two-point chain line) shaken due to the shake of the surveillance camera 10 to the position in the X axis direction of the image 210 (displayed by a solid line) before the shake of the surveillance camera 10 occurs. The operation direction and the operation amount for correcting the shake of the image 210 in the X axis direction may be determined in advance according to the shake amount detection result of the shake amount detection sensor 56, or may be calculated using various calculation expressions.

Similarly, in a case in which the shake correction command is acquired by the acquisition unit 200, the calculation unit 202 calculates an operation direction and an operation amount of the Y axis VCM 122 (see FIG. 11) for correcting a shake of an image 210 in the Y axis direction based on the shake amount detection result by the shake amount detection sensor 56. The shake of the image 210 in the Y axis direction includes a shake of the image 210 in the +Y axis direction and a shake of the image 210 in the −Y axis direction. Specifically, the calculation unit 202 calculates the operation direction and the operation amount of the Y axis VCM 122 for restoring the position in the Y axis direction of the image 210 (displayed by a two-point chain line) shaken due to the shake of the surveillance camera 10 to the position in the Y axis direction of the image 210 (displayed by a solid line) before the shake of the surveillance camera 10 occurs. The operation direction and the operation amount for correcting the shake of the image 210 in the X axis direction may be determined in advance according to the shake amount detection result of the shake amount detection sensor 56, or may be calculated using various calculation expressions. It should be noted that correcting the shake of the image 210 includes bringing the position of the image 210 shaken due to the shake of the surveillance camera 10 closer to the position of the image 210 before the shake of the surveillance camera 10 occurs, in addition to causing the position of the image 210 shaken due to the shake of the surveillance camera 10 to match the position of the image 210 before the shake of the surveillance camera 10 occurs.

Figure 11:
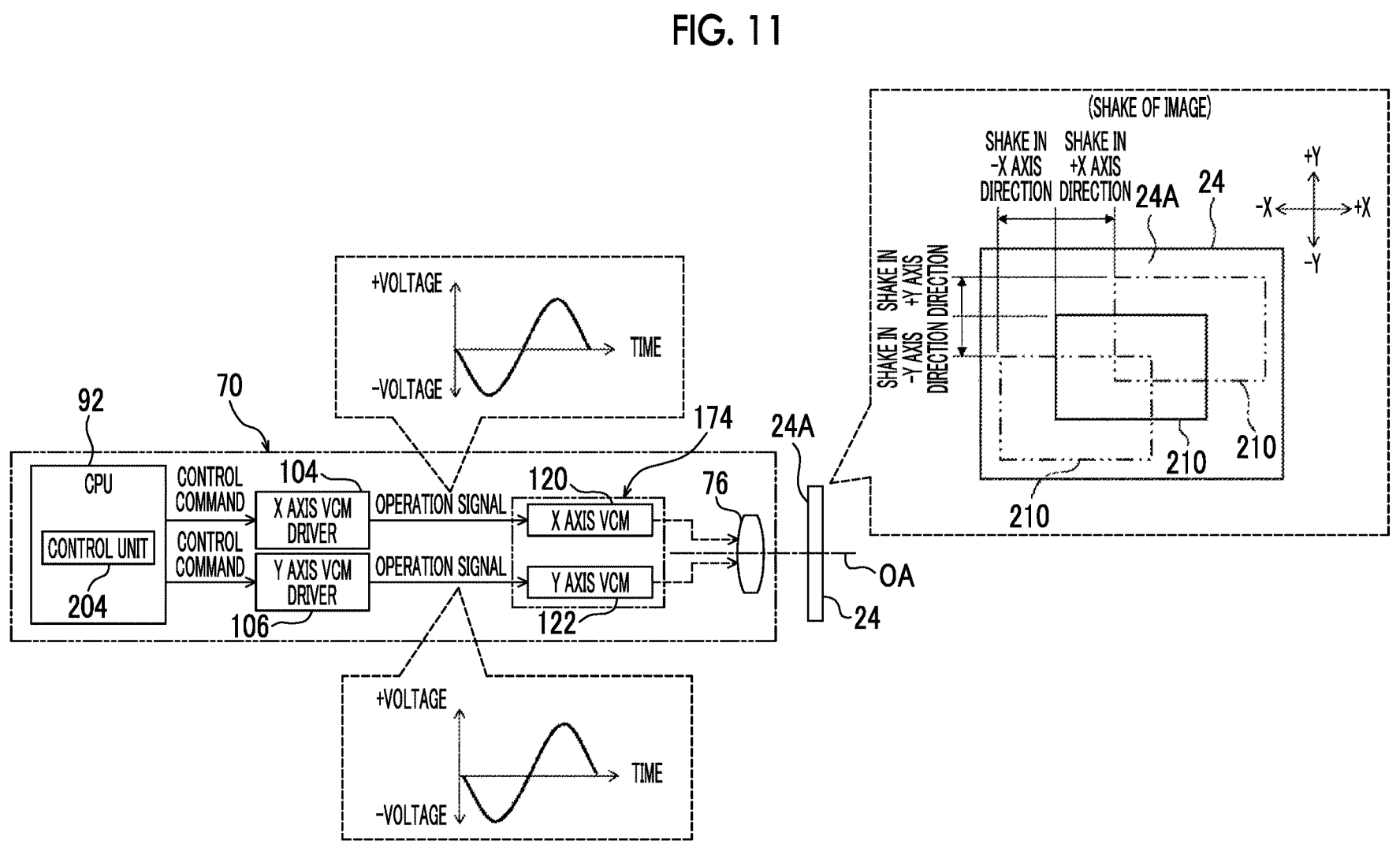

FIG. 11 shows an example in which the control unit 204 outputs a control command to the X axis VCM driver 104 and a control command to the Y axis VCM driver 106 based on the calculation result of the calculation unit 202. The control unit 204 sets the operation direction and the operation amount of the X axis VCM 120 calculated by the calculation unit 202 as target values, and generates the control command based on the position detection result by the X axis position sensor 136 (see FIG. 10). The control command is output to the X axis VCM driver 104. In addition, the control unit 204 sets the operation direction and the operation amount of the Y axis VCM 122 calculated by the calculation unit 202 as target values, and generates the control command based on the position detection result by the Y axis position sensor 138 (see FIG. 10). The control command is output to the Y axis VCM driver 106.

The X axis VCM driver 104 generates an operation signal based on the control command generated by the control unit 204. The operation signal is a continuous wave, for example. The X axis VCM 120 is operated in an operation direction and by an operation amount according to the operation signal. A voltage value of the operation signal is proportional to the operation amount of the X axis VCM 120. In a case in which the voltage of the operation signal is a +voltage, the X axis VCM 120 is operated in a direction for moving the image 210 in the +X axis direction, and in a case in which the voltage of the operation signal is a −voltage, the X axis VCM 120 is operated in a direction for moving the image 210 in −X axis direction. In a case in which the image 210 is shaken in the −X axis direction, the X axis VCM 120 is operated in the direction for moving the image 210 in the +X axis direction, and in a case in which the image 210 is shaken in the +X axis direction, the X axis VCM 120 is operated in the direction for moving the image 210 in the −X axis direction. As a result, the shake correction lens 76 is moved in a direction in which the shake of the image 210 in the X axis direction is corrected, and the shake of the image 210 in the X axis direction is corrected. In the example shown in FIG. 11, the operation signal applied to the X axis VCM 120 is shown as a sine wave as an example, but the operation signal applied to the X axis VCM 120 is a signal generated according to the shake of the image 210 and is not limited to the sine wave.

Similarly, the Y axis VCM driver 106 generates an operation signal based on the control command generated by the control unit 204. The operation signal is a continuous wave, for example. The Y axis VCM 122 is operated in an operation direction and by an operation amount according to the operation signal. A voltage value of the operation signal is proportional to the operation amount of the Y axis VCM 122. In a case in which the voltage of the operation signal is a +voltage, the Y axis VCM 122 is operated in a direction for moving the image 210 in the +Y axis direction, and in a case in which the voltage of the operation signal is a −voltage, the Y axis VCM 122 is operated in a direction for moving the image 210 in −Y axis direction. In a case in which the image 210 is shaken in the −Y axis direction, the Y axis VCM 122 is operated in the direction for moving the image 210 in the +Y axis direction, and in a case in which the image 210 is shaken in the +Y axis direction, the Y axis VCM 122 is operated in the direction for moving the image 210 in the −Y axis direction. As a result, the shake correction lens 76 is moved in a direction in which the shake of the image 210 in the Y axis direction is corrected, and the shake of the image 210 in the Y axis direction is corrected. In the example shown in FIG. 11, the operation signal applied to the Y axis VCM 122 is shown as a sine wave as an example, but the operation signal applied to the Y axis VCM 122 is a signal generated according to the shake of the image 210 and is not limited to the sine wave.

The control with respect to the shake correction drive mechanism 174 by the control unit 204 is feedback control based on the shake amount detection result (shake amount of the surveillance camera 10) by the shake amount detection sensor 56.

Figure 12:
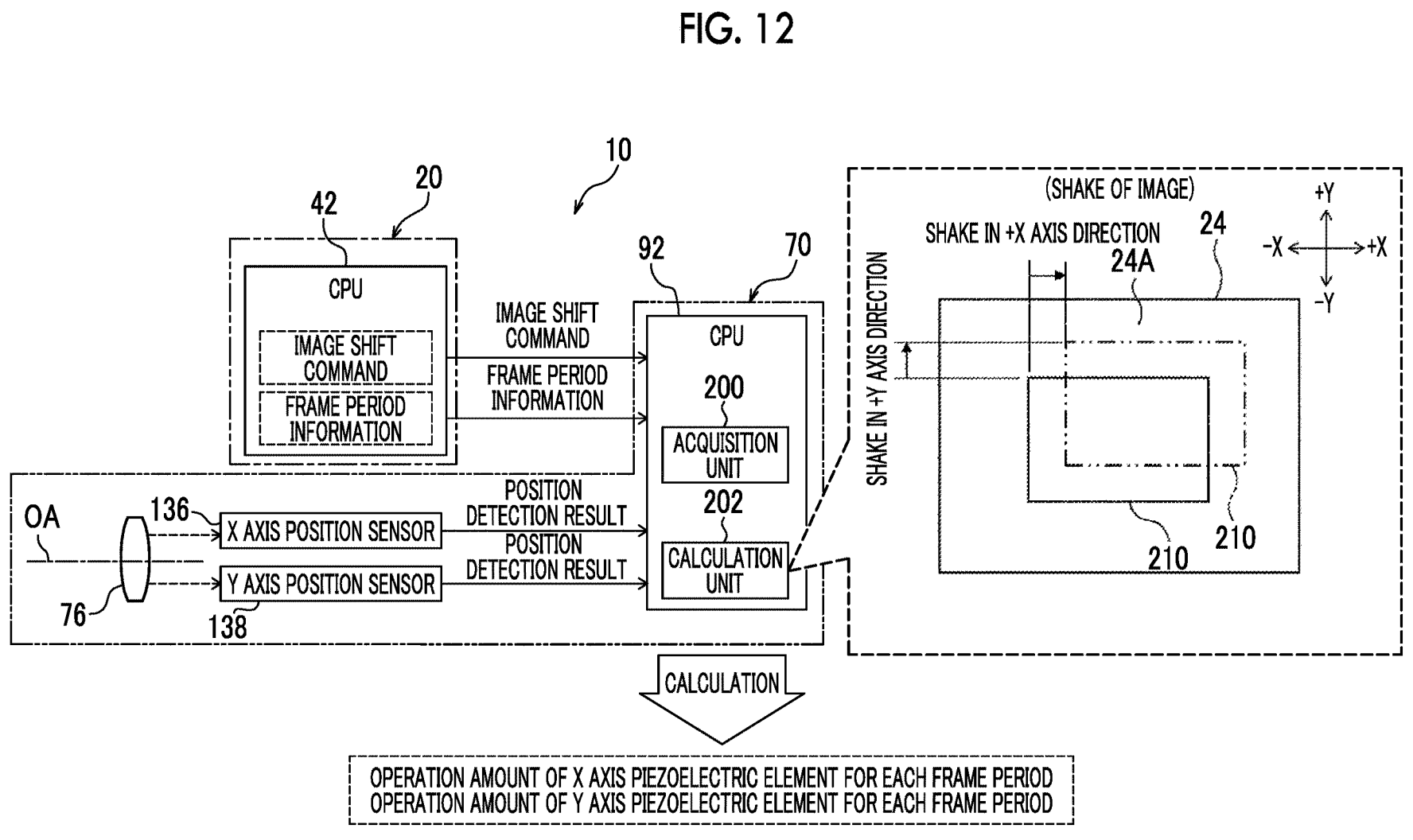

In addition, as shown in FIG. 12 as an example, the acquisition unit 200 acquires an image shift command and frame period information as the information transmitted from the CPU 42 of the surveillance camera body 20. Moreover, the acquisition unit 200 acquires the position detection result by the X axis position sensor 136 and the position detection result by the Y axis position sensor 138. The image shift command is command information for requesting the shift of the image. The image shift command is classified into an X axis image shift command indicating the shift and the shift amount of the image 210 in the +X axis direction, a Y axis image shift command indicating the shift and the shift amount of the image 210 in the +Y axis direction, and an XY axis image shift command indicating the shift and the shift amount of the image 210 in the +X axis direction and the +Y axis direction.

The shift amount of the image 210 is defined, for example, by a pitch equal to or larger than a pixel pitch of the image sensor 24 or a pitch smaller than the pixel pitch of the image sensor 24. The pitch equal to or larger than the pixel pitch of the image sensor 24 is, for example, 1 pitch, 1.5 pitches, 2.5 pitches, or 3.5 pitches. In a case in which the pixel pitch of the image sensor 24 is denoted by p, the natural number is denoted by n, and the pure decimal is denoted by d, the pitch larger than the pixel pitch of the image sensor 24 is defined by $(n+d) \times p$. The pitch smaller than the pixel pitch of the image sensor 24 is, for example, 0.25 pitches, 0.5 pitches, or 0.75 pitches. In a case in which the pixel pitch of the image sensor 24 is denoted by p and the decimal smaller than 1 is denoted by D, the pitch smaller than the pixel pitch of the image sensor 24 is defined by D×p.

The frame period information is information defining a frame period synchronized with the timing control signal output from the CPU 42 to the image sensor driver 52 (see FIG. 5). The frame period is a period in which the imaging is performed in units of frames.

In a case in which the X axis image shift command is acquired by the acquisition unit 200, the calculation unit 202 calculates an operation amount of the X axis piezoelectric element 124 for each frame period based on the shift amount of the image 210 indicated by the X axis image shift command, the frame period indicated by the frame period information, and the position detection result by the X axis position sensor 136. For example, in a case in which the shift amount of the image 210 indicated by the X axis image shift command is the same pitch as the pixel pitch of the image sensor 24, the calculation unit 202 calculates the operation amount of the X axis piezoelectric element 124 that shifts the image 210 by the same pitch as the pixel pitch of the image sensor 24. In addition, in a case in which the shift amount of the image 210 indicated by the X axis image shift command is the pitch larger than the pixel pitch of the image sensor 24, the calculation unit 202 calculates the operation amount of the X axis piezoelectric element 124 that shifts the image 210 in the +X axis direction by (n+d)×p. In addition, in a case in which the shift amount of the image 210 indicated by the X axis image shift command is the pitch smaller than the pixel pitch of the image sensor 24, the calculation unit 202 calculates the operation amount of the X axis piezoelectric element 124 that shifts the image 210 in the +X axis direction by D×p.

Similarly, in a case in which the Y axis image shift command is acquired by the acquisition unit 200, the calculation unit 202 calculates an operation amount of the Y axis piezoelectric element 126 for each frame period based on the shift amount of the image 210 indicated by the Y axis image shift command, the frame period indicated by the frame period information, and the position detection result by the Y axis position sensor 138. For example, in a case in which the shift amount of the image 210 indicated by the Y axis image shift command is the same pitch as the pixel pitch of the image sensor 24, the calculation unit 202 calculates the operation amount of the Y axis piezoelectric element 126 that shifts the image 210 by the same pitch as the pixel pitch of the image sensor 24. In addition, in a case in which the shift amount of the image 210 indicated by the Y axis image shift command is the pitch larger than the pixel pitch of the image sensor 24, the calculation unit 202 calculates the operation amount of the Y axis piezoelectric element 126 that shifts the image 210 in the +Y axis direction by (n+d)×p. In addition, in a case in which the shift amount of the image 210 indicated by the Y axis image shift command is the pitch smaller than the pixel pitch of the image sensor 24, the calculation unit 202 calculates the operation amount of the X axis piezoelectric element 124 that shifts the image 210 in the +Y axis direction by D×p.

In addition, in a case in which the XY axis image shift command is acquired by the acquisition unit 200, the calculation unit 202 calculates the operation amount of the X axis piezoelectric element 124 in the same manner as in a case in which the X axis image shift command is acquired by the acquisition unit 200, and calculates the operation amount of the Y axis piezoelectric element 126 in the same manner as in a case in which the Y axis image shift command is acquired by the acquisition unit 200.

Figure 13:
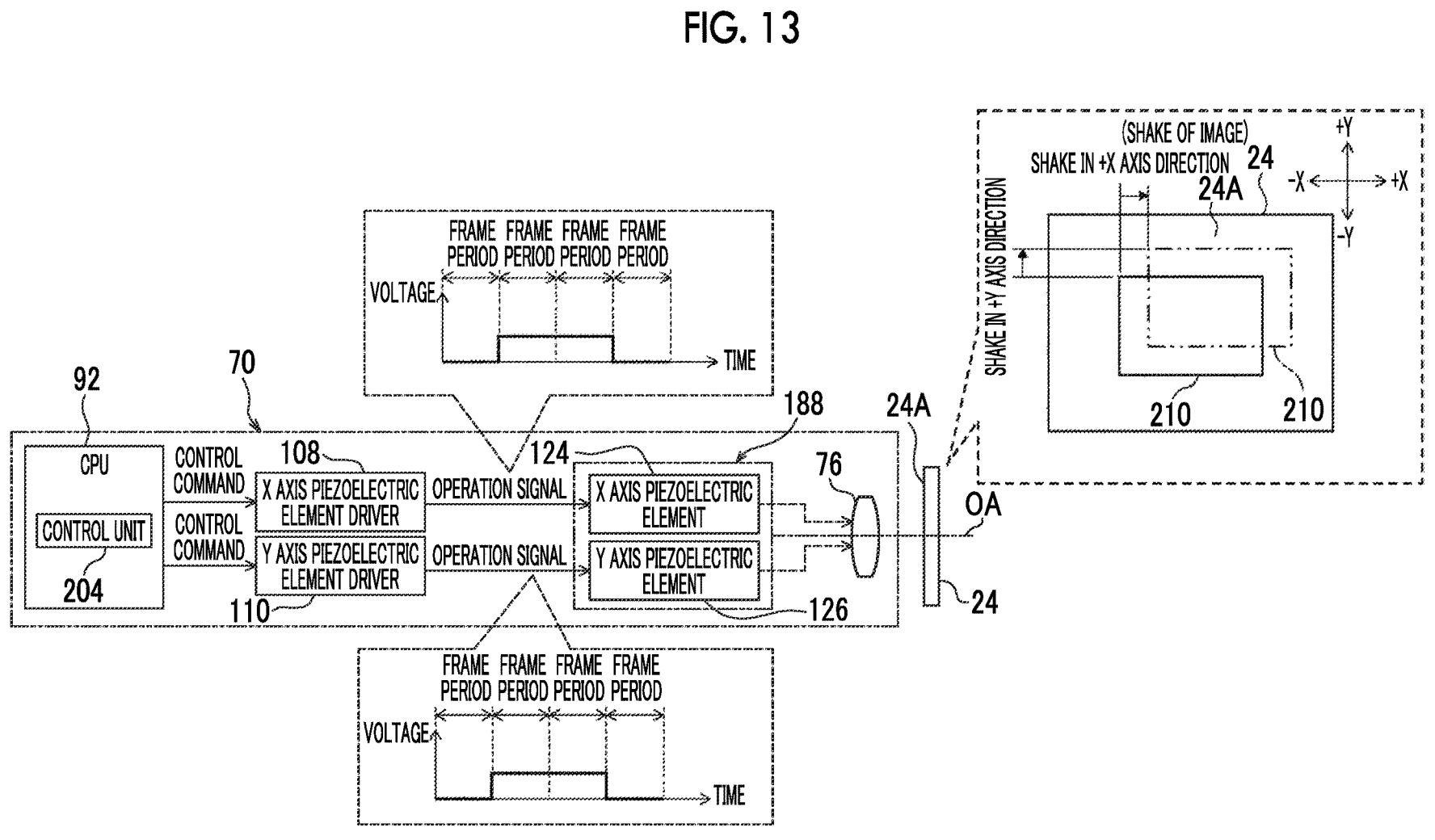

As shown in FIG. 13 as an example, the control unit 204 generates the control command for each frame period according to the operation amount of the X axis piezoelectric element 124 calculated by the calculation unit 202. The control command is output to the X axis piezoelectric element driver 108. In addition, the control unit 204 generates the control command for each frame period according to the operation amount of the Y axis piezoelectric element 126 calculated by the calculation unit 202. The control command is output to the Y axis piezoelectric element driver 110 in synchronization with the frame period information.

The X axis piezoelectric element driver 108 generates an operation signal based on the control command generated by the control unit 204. The operation signal is a pulse wave, for example. A voltage value of the operation signal is proportional to the operation amount of the X axis piezoelectric element 124. A period of the operation signal is synchronized with the frame period defined by the frame period information. The X axis piezoelectric element 124 is operated by an operation amount according to the operation signal. As a result, the shake correction lens 76 is moved in a direction for shifting the image 210 in the +X axis direction for each frame period, and the image 210 is shifted in the +X axis direction.

Similarly, the Y axis piezoelectric element driver 110 generates an operation signal based on the control command generated by the control unit 204. The operation signal is a pulse wave, for example. A voltage value of the operation signal is proportional to the operation amount of the Y axis piezoelectric element 126. A period of the operation signal is synchronized with the frame period defined by the frame period information. The Y axis piezoelectric element 126 is operated by an operation amount according to the operation signal. As a result, the shake correction lens 76 is moved in a direction for shifting the image 210 in the +Y axis direction for each frame period, and the image 210 is shifted in the +Y axis direction.

As an example, as shown in FIG. 14, the control unit 204 may set frame periods 1 to 4 for four periods as one set, and repeatedly execute control of selectively switching a combination of the presence or absence of the shift of the image in the +X axis direction and the presence or absence of the shift of the image in the +Y axis direction. The presence or absence of the shift of the image in the +X axis direction corresponds to the presence or absence of the power of the X axis piezoelectric element 124 (see FIG. 13), and the presence or absence of the shift of the image in the +Y axis direction corresponds to the presence or absence of the power of the Y axis piezoelectric element 126 (see FIG. 13). By performing the control of selectively switching the combination of the presence or absence of the power of the X axis piezoelectric element 124 and the presence or absence of the power of the Y axis piezoelectric element 126, the control of selectively switching the combination of the presence or absence of the shift of the image in the +X axis direction and the presence or absence of the shift of the image in the +Y axis direction is realized.

In the example shown in FIG. 14, as an example, a combination in which the shift of the image in the +X axis direction is absent and the shift of the image in the +Y axis direction is absent is applied in the frame period 1, a combination in which the shift of the image in the +X axis direction is present and the shift of the image in the +Y axis direction is absent is applied in the frame period 2, a combination in which the shift of the image in the +X axis direction is present and the shift of the image in the +Y axis direction is present is applied in the frame period 3, and a combination in which the shift of the image in the +X axis direction is absent and the shift of the image in the +Y axis direction is present is applied in the frame period 4. In this way, by shifting the image for each of the frame periods 1 to 4 and causing the image sensor 24 (see FIG. 13) to perform the imaging according to the shift of the image, images 212 of a plurality of frames corresponding to the frame periods 1 to 4, respectively, is obtained. Then, a composite image 214 is obtained by combining the images 212 of the plurality of frames by the CPU 42 of the surveillance camera body 20.

The composite image 214 is obtained, for example, as follows. That is, in a case in which the shift amount of the image is the same pitch as the pixel pitch of the image sensor 24, the composite image 214 is obtained from the images 212 of the plurality of frames by superimposing a plurality of image pixels forming one image and a plurality of image pixels forming the other image among the images 212 of the plurality of frames. In addition, in a case in which the shift amount of the image is the pitch (pitch represented by the expression (n+d)×p) larger than the pixel pitch of the image sensor 24 or in a case in which the shift amount of the image is the pitch smaller than the pixel pitch of the image sensor 24, a high-resolution image as the composite image 214 is obtained from the images 212 of the plurality of frames by allocating a plurality of image pixels forming one image between a plurality of image pixels forming the other image among the images 212 of the plurality of frames.

It should be noted that, as an example, as shown in FIG. 15, the control unit 204 may set frame periods 1 to 3 for three periods as one set, and repeatedly execute control of selectively switching a combination of the presence or absence of the shift of the image in the +X axis direction and the presence or absence of the shift of the image in the +Y axis direction.

In the example shown in FIG. 15, as an example, a combination in which the shift of the image in the +X axis direction is absent and the shift of the image in the +Y axis direction is absent is applied in the frame period 1, a combination in which the shift of the image in the +X axis direction is present and the shift of the image in the +Y axis direction is absent is applied in the frame period 2, a combination in which the shift of the image in the +X axis direction is absent and the shift of the image in the +Y axis direction is present is applied in the frame period 3. In this way, by shifting the image for each of the frame periods 1 to 3 and causing the image sensor 24 (see FIG. 13) to perform the imaging according to the shift of the image, images 212 of the plurality of frames corresponding to the frame periods 1 to 3, respectively, is obtained. Then, the composite image 214 is obtained by combining the images 212 of the plurality of frames by the CPU 42 of the surveillance camera body 20.

In addition, as an example, as shown in FIG. 16, the control unit 204 may set frame periods 1 and 2 for two periods as one set, and repeatedly execute control of selectively switching a combination of the presence or absence of the shift of the image in the +X axis direction and the presence or absence of the shift of the image in the +Y axis direction.

In the example shown in FIG. 16, as an example, a combination in which the shift of the image in the +X axis direction is absent and the shift of the image in the +Y axis direction is absent is applied in the frame period 1, and a combination in which the shift of the image in the +X axis direction is present and the shift of the image in the +Y axis direction is present is applied in the frame period 2. In this way, by shifting the image for each of the frame periods 1 and 2 and causing the image sensor 24 (see FIG. 13) to perform the imaging according to the shift of the image, images 212 of the plurality of frames corresponding to the frame periods 1 and 2, respectively, is obtained. Then, the composite image 214 is obtained by combining the images 212 of the plurality of frames by the CPU 42 of the surveillance camera body 20.

The control with respect to the shift drive mechanism 188 by the control unit 204 sequence control that is not based on the shake amount detection result (shake amount of the surveillance camera 10) by the shake amount detection sensor 56 and is based on predetermined shift sequence (see FIGS. 14 to 16).

By the way, in a case in which the shake of the surveillance camera 10 (see FIG. 1 or the like) occurs, control of shifting the image 210 may be performed as shown in FIG. 13. In this case, the shake correction lens 76 is moved as follows.

Figure 17:
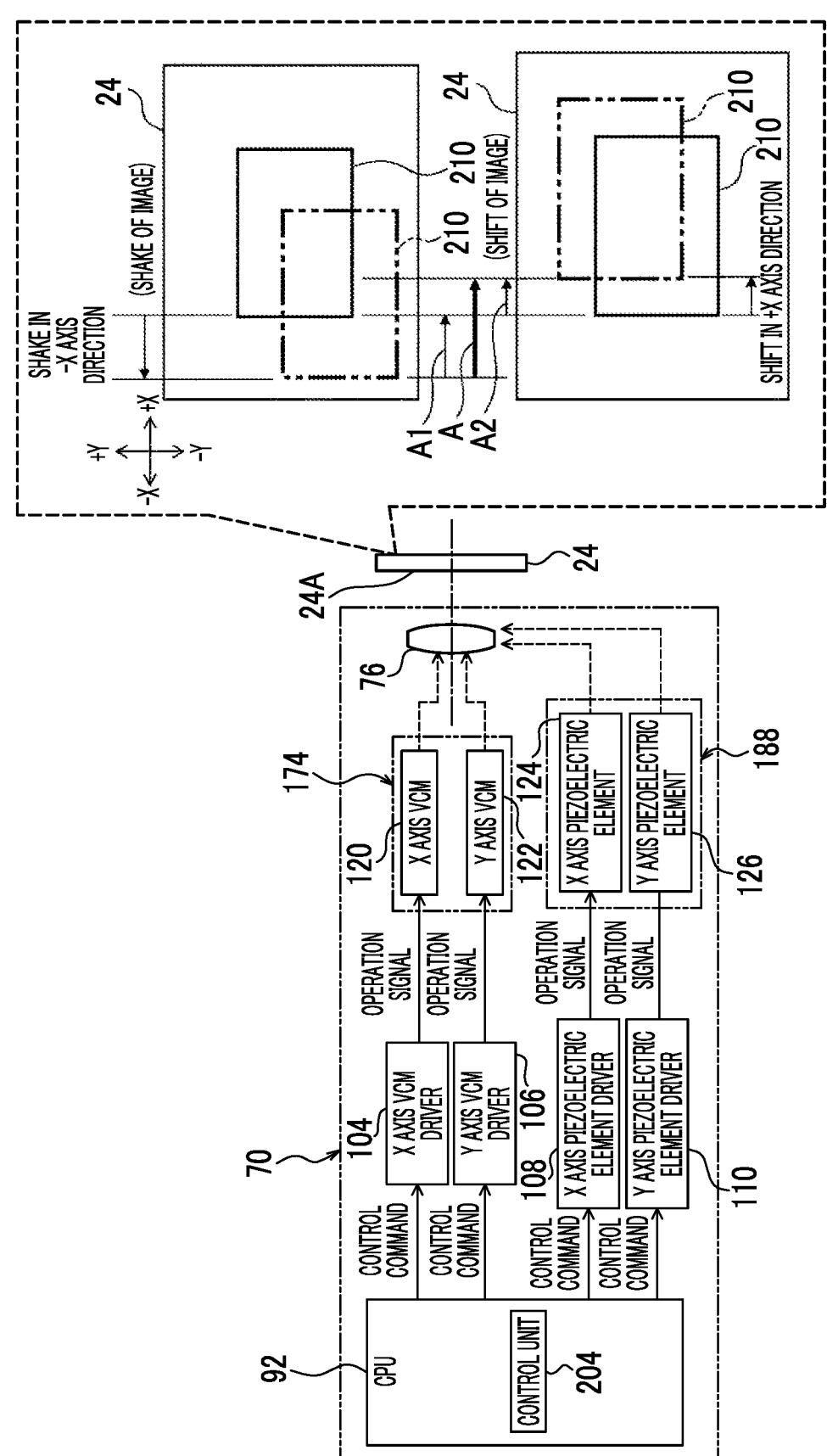
FIG. 17 is a block diagram showing a first operation example in which the correction of the shake of the image and the shift of the image are executed in the lens device according to the first embodiment.

As an example, FIG. 17 shows an example in which the image 210 is shifted in the +X axis direction in a case in which the shake of the image 210 occurs in the −X axis direction. In this example, by the shift drive mechanism 188 moving the shake correction lens 76 in a direction (+X axis direction) in which the shake correction drive mechanism 174 moves the shake correction lens 76, the shake correction lens 76 is moved by a movement amount in which the movement amount of the shake correction lens 76 in the +X axis direction by the shift drive mechanism 188 is added to the movement amount of the shake correction lens 76 in the +X axis direction by the shake correction drive mechanism 174. As a result, the image 210 is moved by a movement amount A in which a movement amount A2 for shifting the image 210 is added to a movement amount A1 for correcting the shake of the image 210, and the image 210 is shifted to a position designated by the X axis image shift command.

Figure 18:
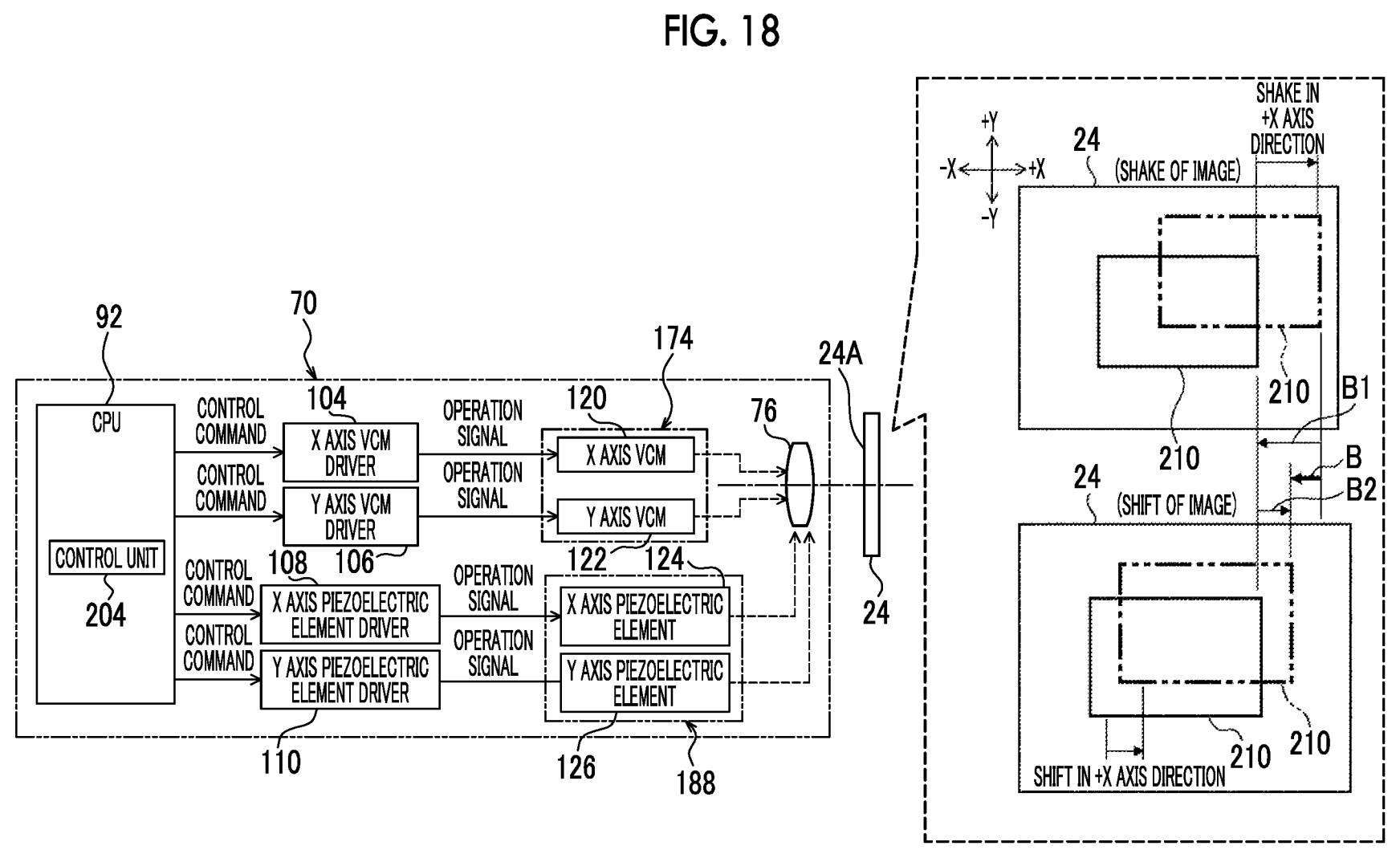

In addition, as an example, FIG. 18 shows an example in which the image 210 is shifted in the +X axis direction in a case in which the shake of the image 210 occurs in the +X axis direction. In this example, by the shift drive mechanism 188 moving the shake correction lens 76 in a direction (+X axis direction) opposite to the direction (−X axis direction) in which the shake correction drive mechanism 174 moves the shake correction lens 76, the shake correction lens 76 is moved by a movement amount in which the movement amount of the shake correction lens 76 in the +X axis direction by the shift drive mechanism 188 is subtracted from the movement amount of the shake correction lens 76 in the −X axis direction by the shake correction drive mechanism 174. As a result, the image 210 is moved by a movement amount B in which a movement amount B2 for shifting the image 210 is subtracted from a movement amount B1 for correcting the shake of the image 210, and the image 210 is shifted to the position designated by the X axis image shift command.

The specific example of a case in which the image 210 is shifted in the +X axis direction by the X axis piezoelectric element 124 moving the shake correction lens 76 in the +X axis direction is shown, but a specific example of a case in which the image 210 is shifted in the +Y axis direction by the Y axis piezoelectric element 126 moving the shake correction lens 76 in the +Y axis direction is shown below.

Figure 19:
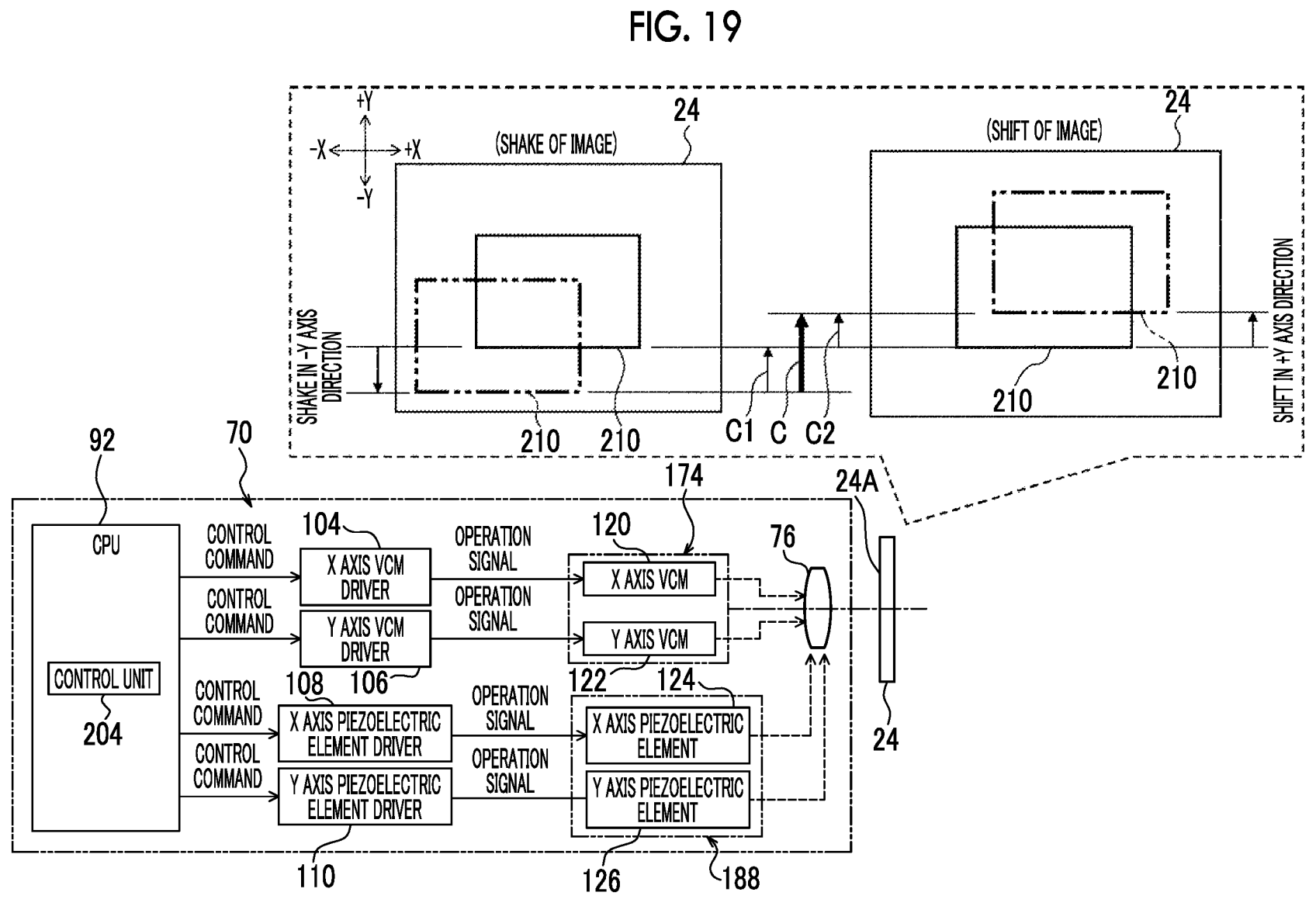

As an example, FIG. 19 shows an example in which the image 210 is shifted in the +Y axis direction in a case in which the shake of the image 210 occurs in the −Y axis direction. In this example, by the shift drive mechanism 188 moving the shake correction lens 76 in a direction (+Y axis direction) in which the shake correction drive mechanism 174 moves the shake correction lens 76, the shake correction lens 76 is moved by a movement amount in which the movement amount of the shake correction lens 76 in the +Y axis direction by the shift drive mechanism 188 is added to the movement amount of the shake correction lens 76 in the +Y axis direction by the shake correction drive mechanism 174. As a result, the image 210 is moved by a movement amount C in which a movement amount C2 for shifting the image 210 is added to a movement amount C1 for correcting the shake of the image 210, and the image 210 is shifted to the position designated by the Y axis image shift command.

Figure 20:
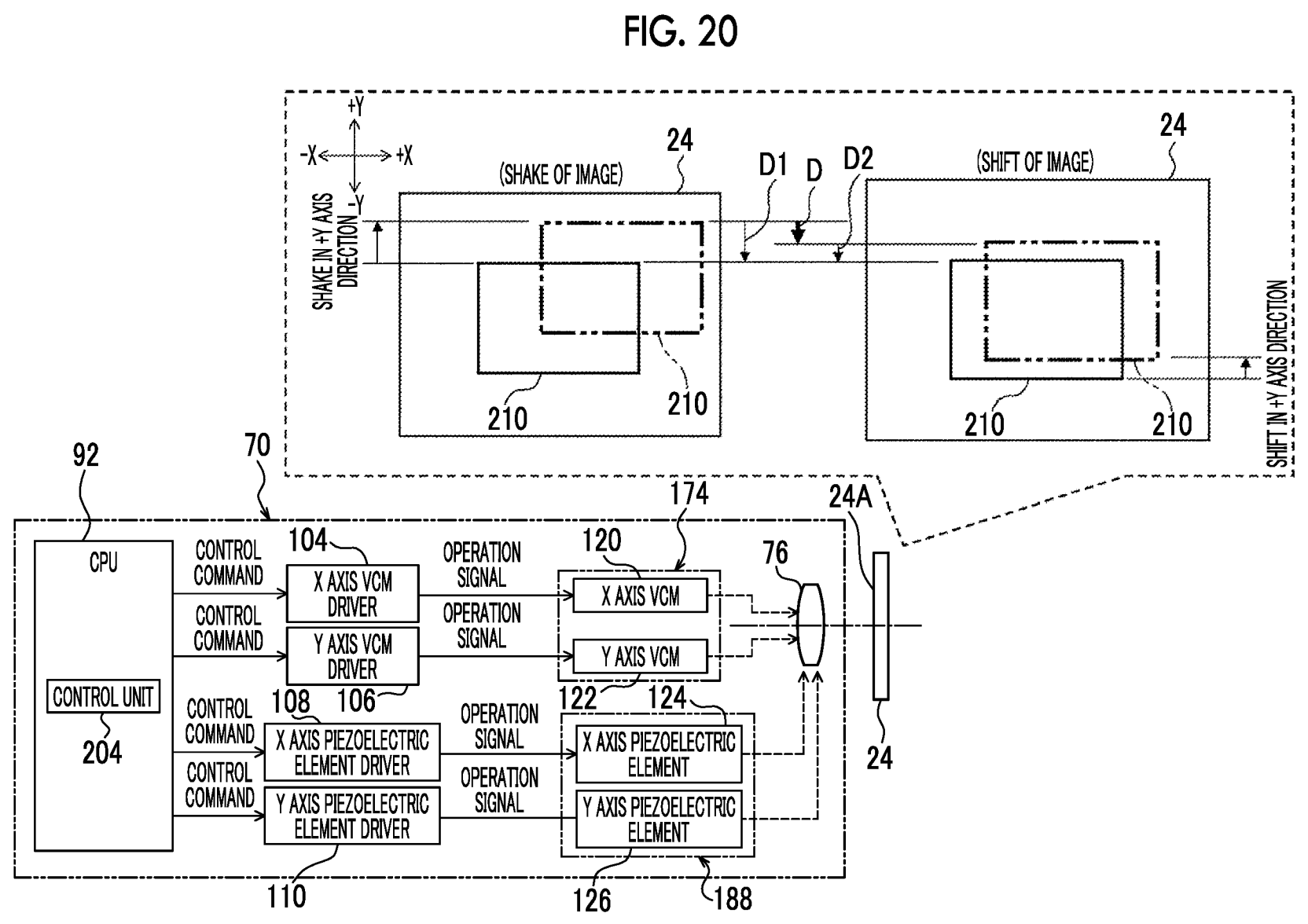

In addition, as an example, FIG. 20 shows an example in which the image 210 is shifted in the +Y axis direction in a case in which the shake of the image 210 occurs in the +Y axis direction. In this example, by the shift drive mechanism 188 moving the shake correction lens 76 in a direction (+Y axis direction) opposite to the direction (−Y axis direction) in which the shake correction drive mechanism 174 moves the shake correction lens 76, the shake correction lens 76 is moved by a movement amount in which the movement amount of the shake correction lens 76 in the +Y axis direction by the shift drive mechanism 188 is subtracted from the movement amount of the shake correction lens 76 in the −Y axis direction by the shake correction drive mechanism 174. As a result, the image 210 is moved by a movement amount D in which a movement amount D2 for shifting the image 210 is subtracted from a movement amount D1 for correcting the shake of the image 210, and the image 210 is shifted to the position designated by the Y axis image shift command.

Figure 21:
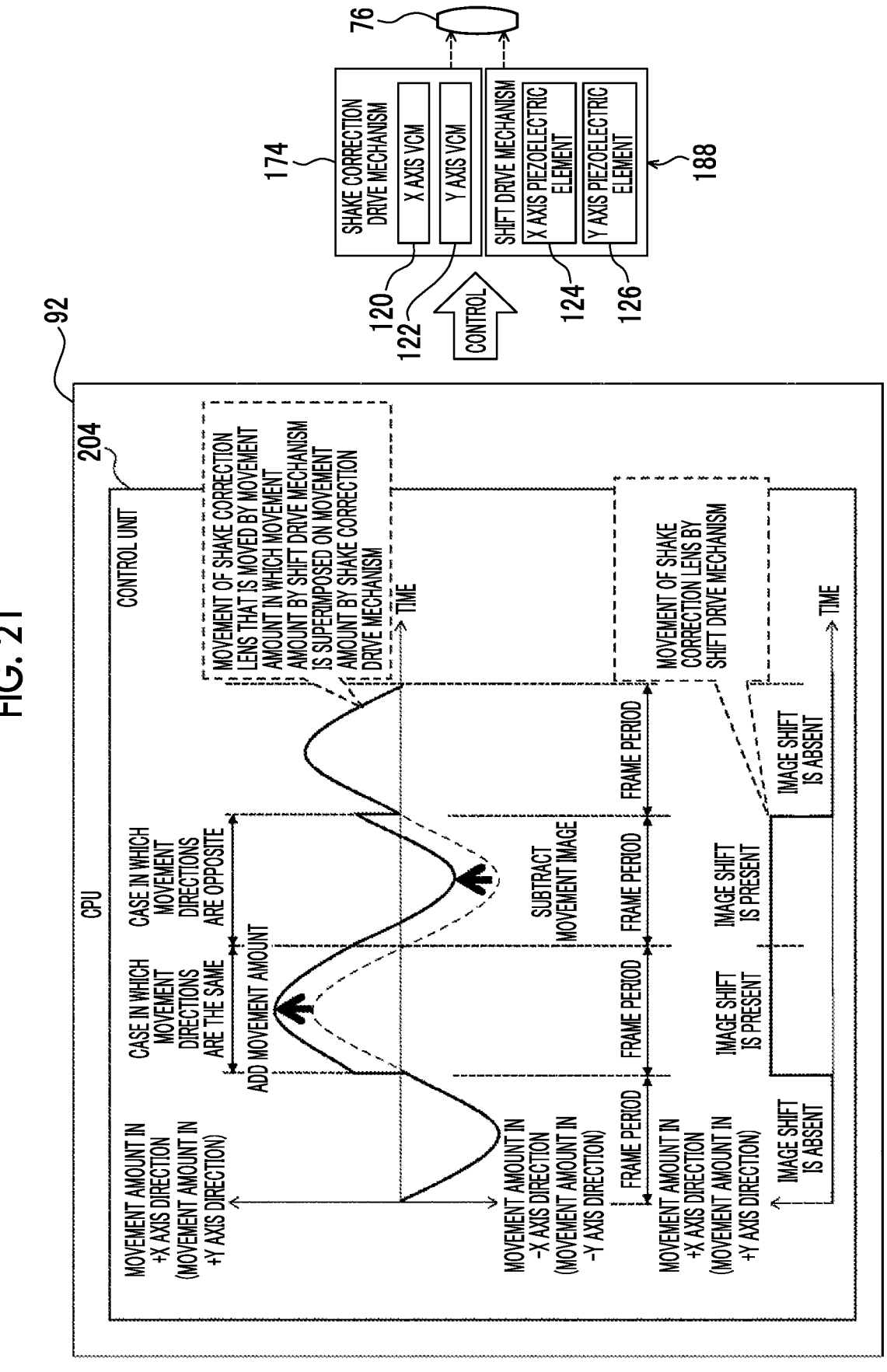
FIG. 21 is an explanatory diagram showing a first example of movement of a shake correction lens in the lens device according to the first embodiment.

FIG. 21 shows an example of the movement of the shake correction lens 76 that is moved by a movement amount in which the movement amount of the shake correction lens 76 by the shift drive mechanism 188 is superimposed on the movement amount of the shake correction lens 76 by the shake correction drive mechanism 174, as described above. A graph on an upper part of FIG. 21 shows the movement of the shake correction lens 76 that is moved by a movement amount in which the movement amount of the shake correction lens 76 by the shift drive mechanism 188 is superimposed on the movement amount of the shake correction lens 76 by the shake correction drive mechanism 174, and a graph on a lower part of FIG. 21 shows the movement amount (movement amount of the shake correction lens 76 according to the presence or absence of the shift of the image) of the shake correction lens 76 that is moved by applying the power by the shift drive mechanism 188. A vertical axis of each graph represents the movement direction and the movement amount of the shake correction lens 76, and a horizontal axis of each graph represents time.

As an example, as shown in FIG. 21, in a case in which the shift drive mechanism 188 moves the shake correction lens 76 in the direction in which the shake correction drive mechanism 174 moves the shake correction lens 76 (that is, in a case in which the shift of the image is present and the movement direction of the shake correction lens 76 by the shift drive mechanism 188 is the same direction as the movement direction of the shake correction lens 76 by the shake correction drive mechanism 174), the shake correction lens 76 is moved by the movement amount in which the movement amount of the shake correction lens 76 by the shift drive mechanism 188 is added to the movement amount of the shake correction lens 76 by the shake correction drive mechanism 174. In a case in which the shift of the image is absent, the movement amount of the shake correction lens 76 by the shift drive mechanism 188 is not added to the movement amount of the shake correction lens 76 by the shake correction drive mechanism 174, and the shake correction lens 76 is moved by the movement amount of the shake correction lens 76 by the shake correction drive mechanism 174.

On the other hand, in a case in which the shift drive mechanism 188 moves the shake correction lens 76 in the direction opposite to the direction in which the shake correction drive mechanism 174 moves the shake correction lens 76 (that is, in a case in which the shift of the image is present and the movement direction of the shake correction lens 76 by the shift drive mechanism 188 is the direction opposite to the movement direction of the shake correction lens 76 by the shake correction drive mechanism 174), the shake correction lens 76 is moved by the movement amount in which the movement amount of the shake correction lens 76 by the shift drive mechanism 188 is subtracted from the movement amount of the shake correction lens 76 by the shake correction drive mechanism 174. In a case in which the shift of the image is absent, the movement amount of the shake correction lens 76 by the shift drive mechanism 188 is not subtracted from the movement amount of the shake correction lens 76 by the shake correction drive mechanism 174, and the shake correction lens 76 is moved by the movement amount of the shake correction lens 76 by the shake correction drive mechanism 174. It should be noted that the movement amount of the shake correction lens 76 by the shake correction drive mechanism 174 is larger than the movement amount of the shake correction lens 76 by the shift drive mechanism 188.

Figure 22:
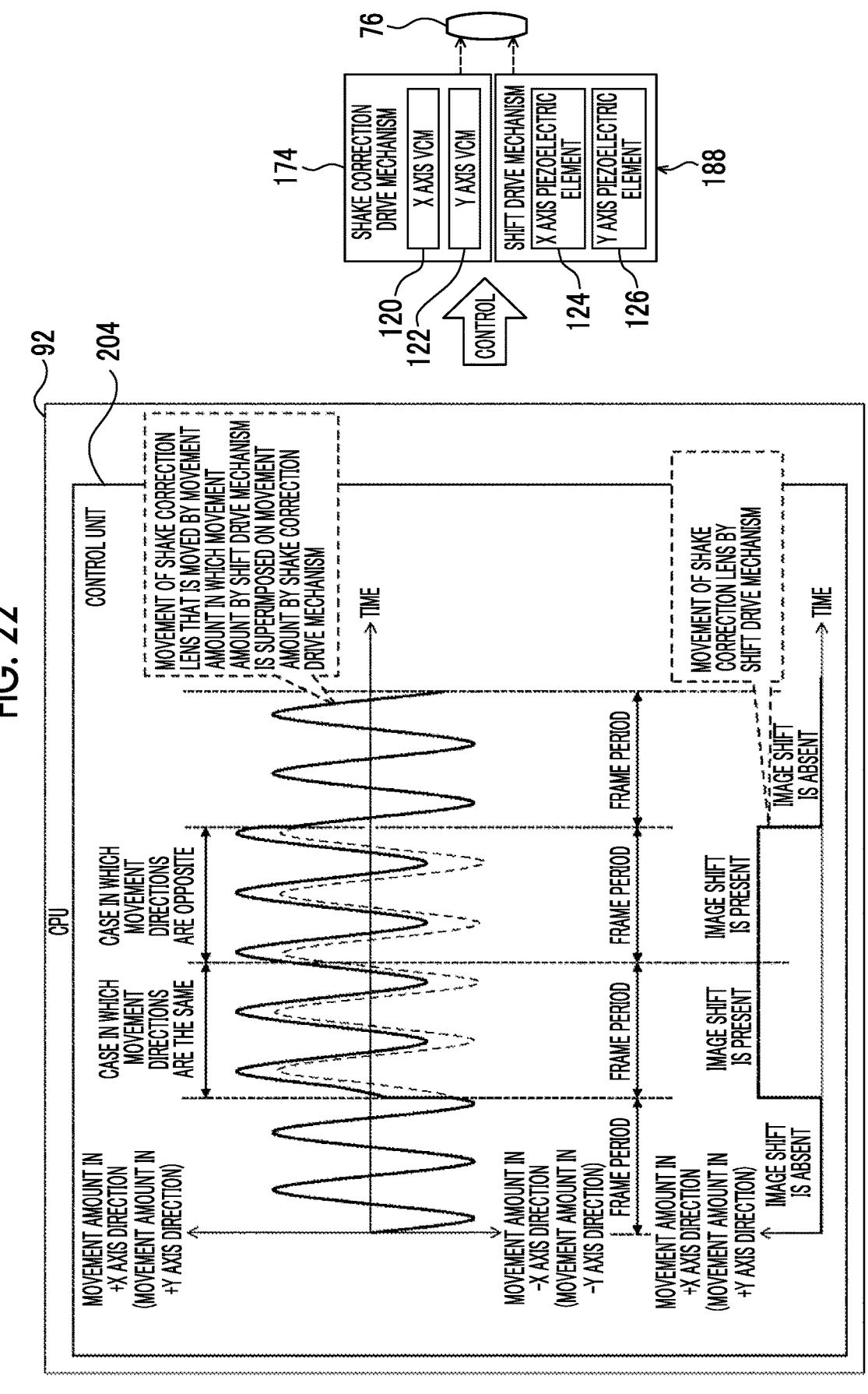
FIG. 22 is an explanatory diagram showing a second example of the movement of the shake correction lens in the lens device according to the first embodiment.

In the example shown in FIG. 21, in order to easily understand the movement direction and the movement amount of the shake correction lens 76, for convenience, the half period of the period of the movement of the shake correction lens 76 by the shake correction drive mechanism 174 matches the frame period, but the movement of the shake correction lens 76 by the shake correction drive mechanism 174 is not limited to this. That is, since the movement of the shake correction lens 76 by the shake correction drive mechanism 174 is defined according to the shake of the image, for example, as shown in FIG. 22, of course, there may be a case in which the period of the movement of the shake correction lens 76 by the shake correction drive mechanism 174 is not synchronized with the frame period.

In addition, in the examples shown in FIGS. 17 to 21, a case is shown in which the shift drive mechanism 188 moves the shake correction lens 76 in the +X axis direction and the +Y axis direction. However, in a case in which the shift drive mechanism 188 moves the shake correction lens 76 only in the +X axis direction, in the same manner as described above, the movement amount of the shake correction lens 76 by the shift drive mechanism 188 may be superimposed on the movement amount of the shake correction lens 76 by the shake correction drive mechanism 174. Similarly, in a case in which the shift drive mechanism 188 moves the shake correction lens 76 only in the +Y axis direction, the movement amount of the shake correction lens 76 by the shift drive mechanism 188 may be superimposed on the movement amount of the shake correction lens 76 by the shake correction drive mechanism 174.

Figure 23:
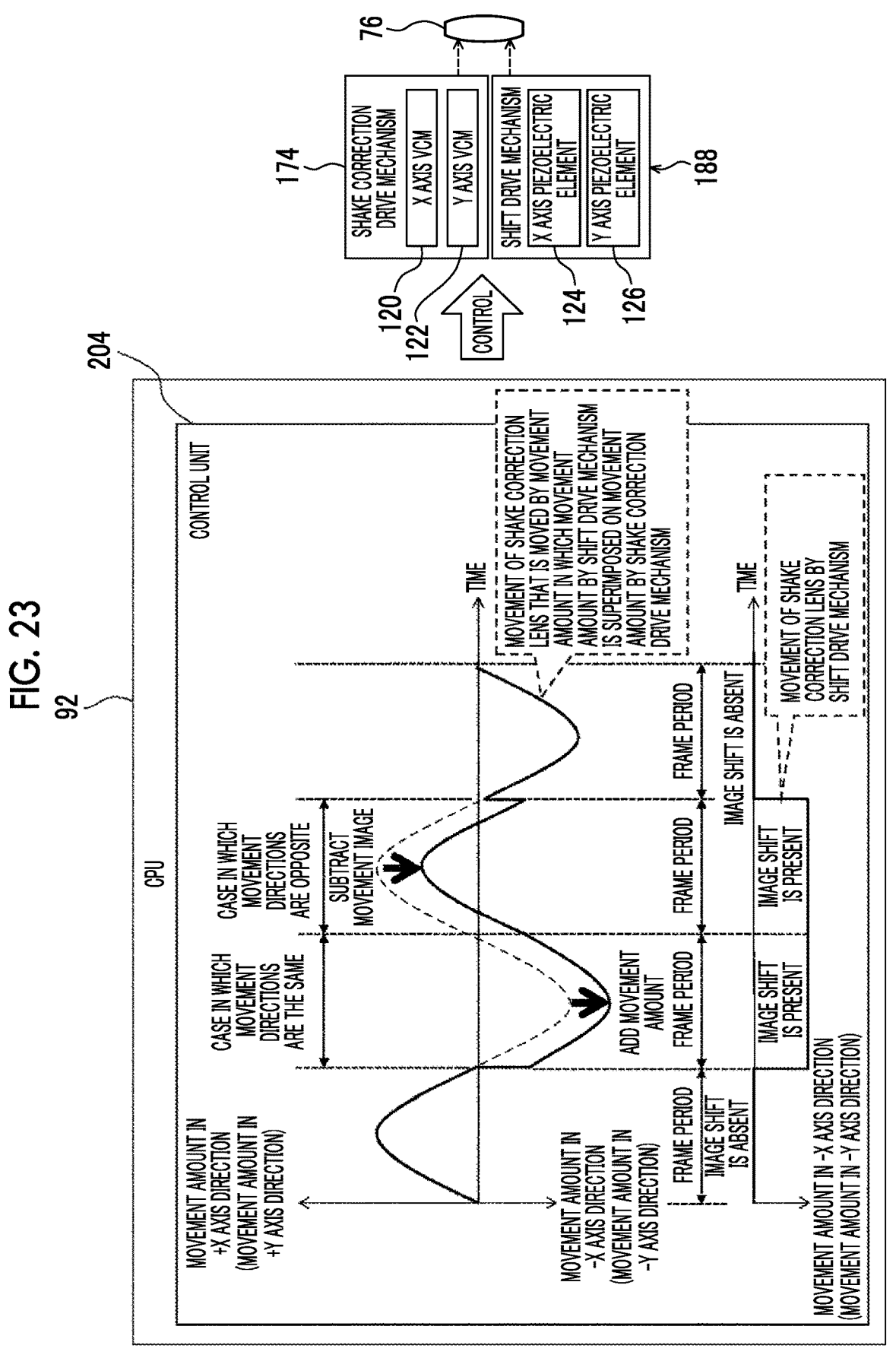
FIG. 23 is an explanatory diagram showing a third example of the movement of the shake correction lens in the lens device according to the first embodiment.

In addition, as shown in FIG. 23 as an example, in a case in which the shift drive mechanism 188 moves the shake correction lens 76 in at least one of the −X axis direction or the −Y axis direction, the movement amount of the shake correction lens 76 by the shift drive mechanism 188 may be superimposed on the movement amount of the shake correction lens 76 by the shake correction drive mechanism 174.

Hereinafter, an action of the surveillance camera 10 (operation of the surveillance camera 10) according to the first embodiment will be described with reference to FIGS. 24 and 25.

First, the shake correction processing in the shake correction/shift processing will be described. The CPU 92 of the lens device 70 determines whether or not the shake correction command transmitted from the CPU 42 of the surveillance camera body 20 is received by the transmission/reception interface (not shown) of the lens device 70, and executes the shake correction processing shown in FIG. 24 in a case in which an affirmative determination is made.

In step ST100, first, the acquisition unit 200 (see FIG. 10) acquires the shake correction command transmitted from the CPU 42 of the surveillance camera body 20. In addition, in step ST102, the acquisition unit 200 acquires the shake amount detection result transmitted from the CPU 42 of the surveillance camera body 20. Furthermore, the acquisition unit 200 acquires the position detection result by the X axis position sensor 136 and the position detection result by the Y axis position sensor 138.

In next step ST104, the calculation unit 202 calculates the operation direction and the operation amount of the X axis VCM 120 for correcting the shake of the image 210 in the X axis direction based on the shake amount detection result by the shake amount detection sensor 56. Similarly, the calculation unit 202 calculates the operation direction and the operation amount of the Y axis VCM 122 for correcting the shake of the image 210 in the Y axis direction based on the shake amount detection result by the shake amount detection sensor 56.

In next step ST106, the control unit 204 (see FIG. 11) sets the operation direction and the operation amount of the X axis VCM 120 calculated by the calculation unit 202 as target values, and controls the X axis VCM 120 based on the position detection result by the X axis position sensor 136 (see FIG. 10). For example, in a case in which the image 210 is shaken in the −X axis direction, the control unit 204 operates the X axis VCM 120 in the direction for moving the image 210 in the +X axis direction, and in a case in which the image 210 is shaken in the +X axis direction, the control unit 204 operates the X axis VCM 120 in the direction for moving the image 210 in the −X axis direction. As a result, the shake correction lens 76 is moved in the direction in which the shake of the image 210 in the X axis direction is corrected, and the shake of the image 210 in the X axis direction is corrected.

Similarly, the control unit 204 sets the operation direction and the operation amount of the Y axis VCM 122 calculated by the calculation unit 202 as the target values, and controls the Y axis VCM 122 based on the position detection result by the Y axis position sensor 138 (see FIG. 10). For example, in a case in which the image 210 is shaken in the −Y axis direction, the control unit 204 operates the Y axis VCM 122 in the direction for moving the image 210 in the +Y axis direction, and in a case in which the image 210 is shaken in the +Y axis direction, the control unit 204 operates the Y axis VCM 122 in the direction for moving the image 210 in the −Y axis direction. As a result, the shake correction lens 76 is moved in the direction in which the shake of the image 210 in the Y axis direction is corrected, and the shake of the image 210 in the Y axis direction is corrected.

Subsequently, the shift processing in the shake correction/shift processing will be described. The CPU 92 of the lens device 70 determines whether or not the image shift command transmitted from the CPU 42 of the surveillance camera body 20 is received by the transmission/reception interface (not shown) of the lens device 70, and executes the shift processing shown in FIG. 25 in a case in which an affirmative determination is made.

In step ST110, first, the acquisition unit 200 (see FIG. 12) acquires the image shift command transmitted from the CPU 42 of the surveillance camera body 20. The image shift command is classified into the X axis image shift command indicating the shift and the shift amount of the image in the X axis direction, the Y axis image shift command indicating the shift and the shift amount of the image in the Y axis direction, and the XY axis image shift command indicating the shift and the shift amount of the image in the X axis direction and the Y axis direction. In addition, in step ST112, the acquisition unit 200 acquires the frame period information transmitted from the CPU 42 of the surveillance camera body 20. Furthermore, the acquisition unit 200 acquires the position detection result by the X axis position sensor 136 and the position detection result by the Y axis position sensor 138.

In next step ST114, in a case in which the X axis image shift command is acquired by the acquisition unit 200, the calculation unit 202 calculates the operation amount of the X axis piezoelectric element 124 for each frame period based on the shift amount of the image indicated by the X axis image shift command, the frame period indicated by the frame period information, and the position detection result by the X axis position sensor 136.

Similarly, in a case in which the Y axis image shift command is acquired by the acquisition unit 200, the calculation unit 202 calculates the operation amount of the Y axis piezoelectric element 126 for each frame period based on the shift amount of the image indicated by the Y axis image shift command, the frame period indicated by the frame period information, and the position detection result by the Y axis position sensor 138.

In addition, in a case in which the XY axis image shift command is acquired by the acquisition unit 200, the calculation unit 202 calculates the operation amount of the X axis piezoelectric element 124 in the same manner as in a case in which the X axis image shift command is acquired by the acquisition unit 200, and calculates the operation amount of the Y axis piezoelectric element 126 in the same manner as in a case in which the Y axis image shift command is acquired by the acquisition unit 200.

In next step ST116, in a case in which the X axis image shift command is acquired by the acquisition unit 200, the control unit 204 (see FIG. 13) controls the X axis piezoelectric element 124 based on the operation amount of the X axis piezoelectric element 124 calculated by the calculation unit 202. As a result, the shake correction lens 76 is moved in the direction for shifting the image 210 in the +X axis direction for each frame period, and the image 210 is shifted in the +X axis direction.

Similarly, in a case in which the Y axis image shift command is acquired by the acquisition unit 200, the control unit 204 controls the Y axis piezoelectric element 126 based on the operation amount of the Y axis piezoelectric element 126 calculated by the calculation unit 202. As a result, the shake correction lens 76 is moved in the direction for shifting the image 210 in the +Y axis direction for each frame period, and the image 210 is shifted in the +Y axis direction.

In addition, in a case in which the XY axis image shift command is acquired by the acquisition unit 200, the control unit 204 controls the X axis piezoelectric element 124 based on the operation amount of the X axis piezoelectric element 124 calculated by the calculation unit 202, and controls the Y axis piezoelectric element 126 based on the operation amount of the Y axis piezoelectric element 126 calculated by the calculation unit 202. As a result, the shake correction lens 76 is moved in the direction for shifting the image 210 in the +X axis direction and the +Y axis direction for each frame period, and the image 210 is shifted in the +X axis direction and the +Y axis direction.

The shake correction processing and the shift processing described above are executed independently of each other. Therefore, in a case in which the shake of the surveillance camera 10 (see FIG. 1 and the like) occurs, the shake correction lens 76 is moved as follows in a case in which the control of shifting the image 210 is performed as shown in FIG. 13.

That is, as shown in FIG. 17, in a case in which the shake of the image 210 in the −X axis direction occurs, in a case in which the image 210 is shifted in the +X axis direction, the shake correction lens 76 is moved by the movement amount in which the movement amount of the shake correction lens 76 in the +X axis direction by the shift drive mechanism 188 is added to the movement amount of the shake correction lens 76 in the +X axis direction by the shake correction drive mechanism 174. As a result, the image 210 is moved by the movement amount A in which the movement amount A2 for shifting the image 210 is added to the movement amount A1 for correcting the shake of the image 210, and the image 210 is shifted to the position designated by the X axis image shift command.

In addition, as shown in FIG. 18, in a case in which the shake of the image 210 in the +X axis direction occurs, in a case in which the image 210 is shifted in the +X axis direction, the shake correction lens 76 is moved by the movement amount in which the movement amount of the shake correction lens 76 in the −X axis direction by the shift drive mechanism 188 is subtracted from the movement amount of the shake correction lens 76 in the +X axis direction by the shake correction drive mechanism 174. As a result, the image 210 is moved by the movement amount B in which the movement amount B2 for shifting the image 210 is subtracted from the movement amount B1 for correcting the shake of the image 210, and the image 210 is shifted to the position designated by the X axis image shift command.

In addition, as shown in FIG. 19, in a case in which the shake of the image 210 in the −Y axis direction occurs, in a case in which the image 210 is shifted in the +Y axis direction, the shake correction lens 76 is moved by the movement amount in which the movement amount of the shake correction lens 76 in the +Y axis direction by the shift drive mechanism 188 is added to the movement amount of the shake correction lens 76 in the +Y axis direction by the shake correction drive mechanism 174. As a result, the image 210 is moved by the movement amount C in which the movement amount C2 for shifting the image 210 is added to the movement amount C1 for correcting the shake of the image 210, and the image 210 is shifted to the position designated by the Y axis image shift command.

In addition, as shown in FIG. 20, in a case in which the shake of the image 210 in the +Y axis direction occurs, in a case in which the image 210 is shifted in the +Y axis direction, the shake correction lens 76 is moved by the movement amount in which the movement amount of the shake correction lens 76 in the −Y axis direction by the shift drive mechanism 188 is subtracted from the movement amount of the shake correction lens 76 in the +Y axis direction by the shake correction drive mechanism 174. As a result, the image 210 is moved by the movement amount D in which the movement amount D2 for shifting the image 210 is subtracted from the movement amount D1 for correcting the shake of the image 210, and the image 210 is shifted to the position designated by the Y axis image shift command.

Figure 24:
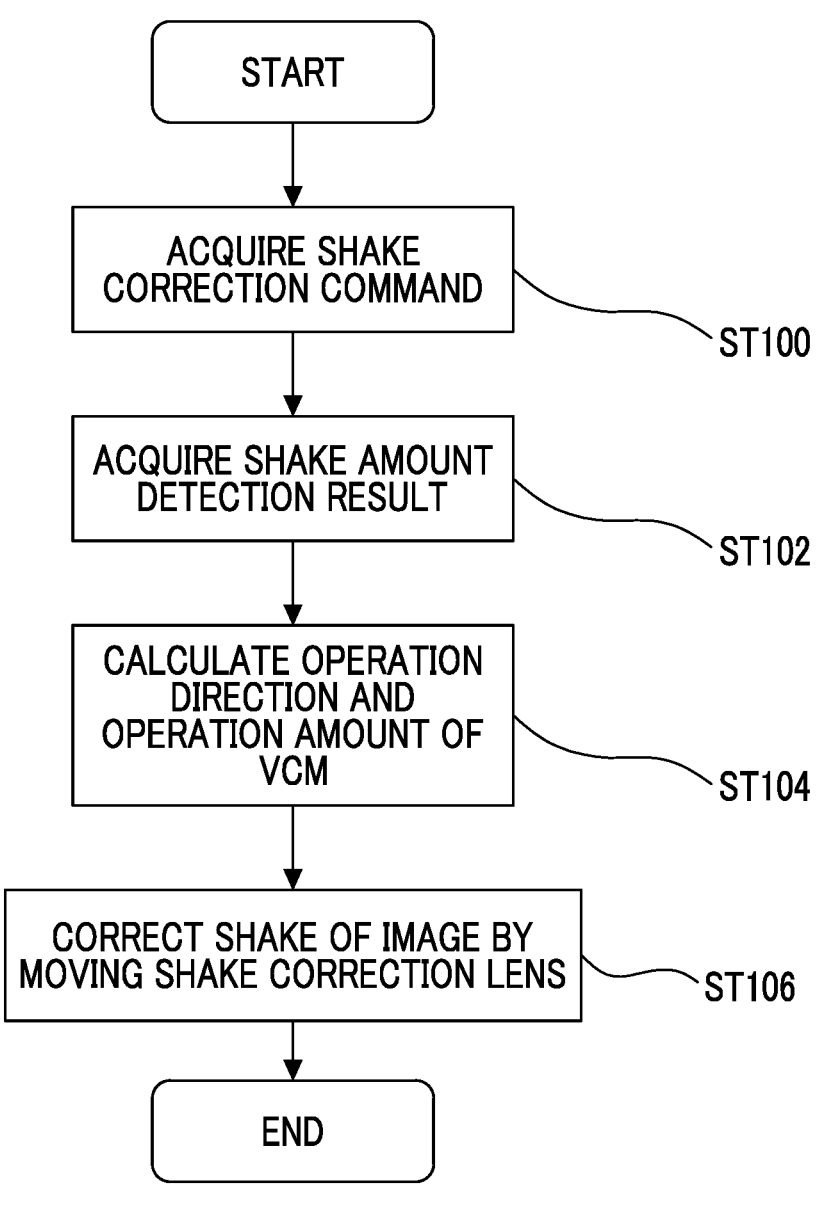
FIG. 24 is a flowchart showing an example of a flow of shake correction processing in the shake correction/shift processing according to the first embodiment.
Figure 25:
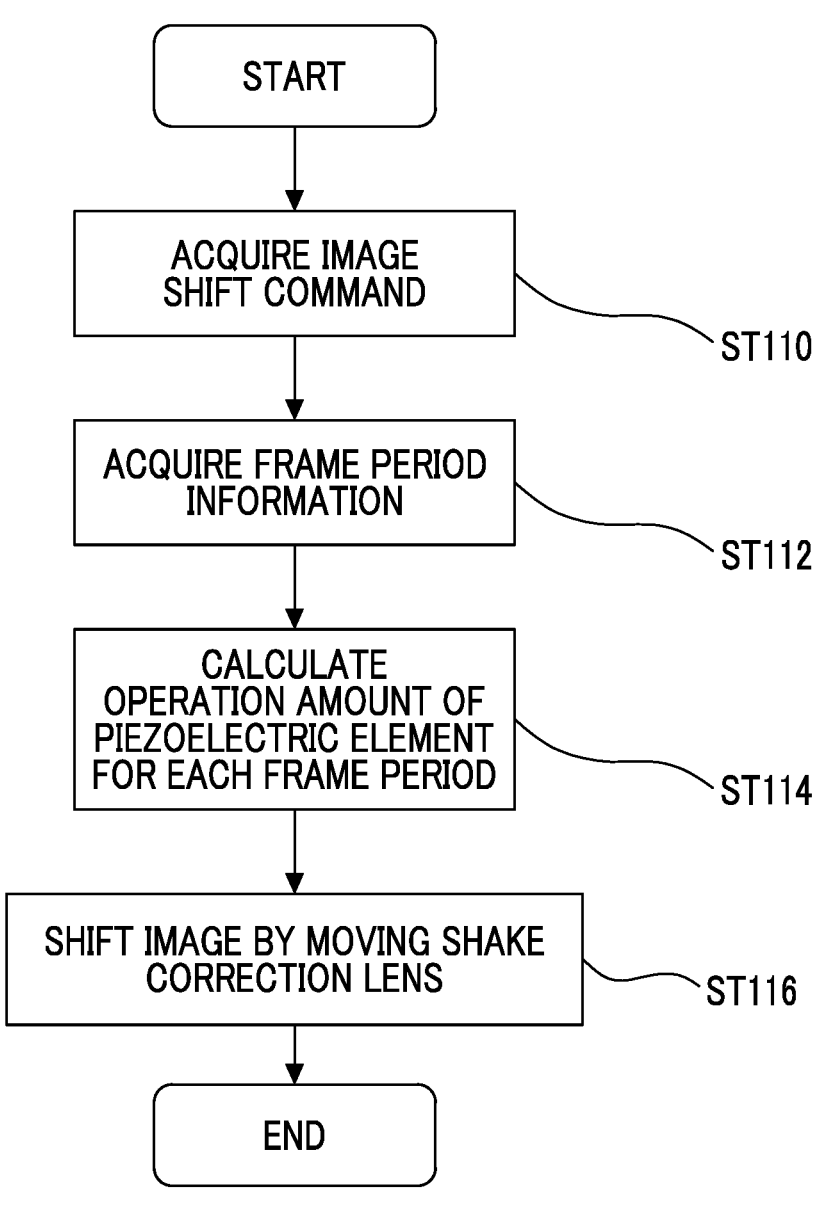
FIG. 25 is a flowchart showing an example of a flow of shift processing in the shake correction/shift processing according to the first embodiment.

It should be noted that the operation method the surveillance camera 10 described with reference to FIGS. 24 and 25 is an example of an "operation method for an imaging apparatus" according to the technology of the present disclosure. In addition, the operation method the lens device 70 included in the operation method the surveillance camera 10 described with reference to FIGS. 24 and 25 is an example of an "operation method for the lens device" according to the technology of the present disclosure.

Hereinafter, the effects of the first embodiment will be described.

As shown in FIGS. 7 and 8, the lens device 70 comprises the shake correction/shift drive mechanism 150. The shake correction/shift drive mechanism 150 comprises the shake correction drive mechanism 174 that moves the shake correction lens 76 in the direction in which the shake of the image is corrected, and the shift drive mechanism 188 that moves the shake correction lens 76 in the direction in which the image is shifted. Therefore, for example, the correction of the shake of the image and the shift of the image can be performed with higher accuracy than in a case in which the shake correction lens 76 is moved to shift the image by the shake correction drive mechanism 174 that moves the shake correction lens 76 to correct the shake of the image.

In addition, as shown in FIGS. 10 to 13, the CPU 92 of the lens device 70 performs, with respect to the shake correction drive mechanism 174, control of moving the shake correction lens 76 in the direction in which the shake of the image is corrected, and performs, with respect to the shift drive mechanism 188, control of moving the shake correction lens 76 in the direction in which the image is shifted. Therefore, the control with respect to the shake correction drive mechanism 174 and the control with respect to the shift drive mechanism 188 can be performed by the CPU 92 in the lens device 70.

In addition, as shown in FIGS. 17 to 20, in the lens device 70, in a case in which the shift drive mechanism 188 moves the shake correction lens 76 in the direction in which the shake correction drive mechanism 174 moves the shake correction lens 76, the shake correction lens 76 is moved by the movement amount in which the movement amount of the shake correction lens 76 by the shift drive mechanism 188 is added to the movement amount of the shake correction lens 76 by the shake correction drive mechanism 174. Therefore, it is possible to shift the image to the position designated by the image shift command. In addition, in the lens device 70, in a case in which the shift drive mechanism 188 moves the shake correction lens 76 in the direction opposite to the direction in which the shake correction drive mechanism 174 moves the shake correction lens 76, the shake correction lens 76 is moved by the movement amount in which the movement amount of the shake correction lens 76 by the shift drive mechanism 188 is subtracted from the movement amount of the shake correction lens 76 by the shake correction drive mechanism 174. It is possible to shift the image to the position designated by the image shift command.

In addition, as shown in FIG. 13, the CPU 92 of the lens device 70 performs, with respect to the shift drive mechanism 188, control of moving the shake correction lens 76 in the direction in which the image is shifted, according to the imaging in units of frames by the image sensor 24 (as an example, for each imaging in units of frames). Therefore, it is possible to shift the image according to the imaging in units of frames by the image sensor 24.

In addition, as shown in FIG. 13, the CPU 92 of the lens device 70 performs, with respect to the shift drive mechanism 188, control of moving the shake correction lens 76 to the position at which the image is shifted by the pitch equal to or larger than the pixel pitch of the image sensor 24 or the pitch smaller than the pixel pitch of the image sensor 24. Therefore, as shown in FIG. 12 as an example, the composite image 214 can be obtained by combining the obtained images 212 of the plurality of frames.

In addition, as shown in FIG. 13, the shift drive mechanism 188 includes the X axis piezoelectric element 124 and the Y axis piezoelectric element 126, the X axis piezoelectric element 124 moves the shake correction lens 76 by applying the power to the shake correction lens 76 along the X axis direction, and the Y axis piezoelectric element 126 moves the shake correction lens 76 by applying the power to the shake correction lens 76 along the Y axis direction. Then, the CPU 92 of the lens device 70 performs, with respect to the shift drive mechanism 188, control (see FIGS. 14 to 16) of selectively switching a combination of the presence or absence of power of the X axis piezoelectric element 124 and the presence or absence of power of the Y axis piezoelectric element 126. Therefore, it is possible to obtain images having different shift amounts in the X axis direction and the Y axis direction according to the imaging in units of frames.

In addition, as shown in FIG. 13, the X axis piezoelectric element 124 moves the shake correction lens 76 by applying the power to the shake correction lens 76 along the X axis direction, and the Y axis piezoelectric element 126 moves the shake correction lens 76 by applying the power to the shake correction lens 76 along the Y axis direction. Therefore, the shake correction lens 76 can be independently moved in the X axis direction and the Y axis direction by the X axis piezoelectric element 124 and the Y axis piezoelectric element 126.

In addition, as shown in FIGS. 7 and 8, the shake correction/shift drive mechanism 150 comprises the holding member 152 that holds the shake correction lens 76, the first support member 154 that supports the holding member 152 to be movable along the X-Y coordinate plane, and the second support member 156 that supports the first support member 154 to be movable along the X-Y coordinate plane. The shake correction drive mechanism 174 is provided between the holding member 152 and the first support member 154, and the shift drive mechanism 188 is provided between the first support member 154 and the second support member 156. Therefore, the movement of the shake correction lens 76 for correcting the shake of the image and the movement of the shake correction lens 76 for shifting the image can be performed independently.

In addition, as shown in FIGS. 7 and 8, the shake correction drive mechanism 174 includes a voice coil motor, and the shift drive mechanism 188 includes a piezoelectric element. Therefore, with a simple configuration, it is possible to move the shake correction lens 76 for correcting the shake of the image and to move the shake correction lens 76 for shifting the image.

In addition, as shown in FIGS. 7 and 8, the shift drive mechanism 188 includes the X axis leaf spring 158 disposed at the position facing the X axis piezoelectric element 124.

Therefore, in a state in which the X axis piezoelectric element 124 is stopped, the shake correction lens 76 can be restored to the original position before being moved in the X axis direction by the elastic force of the X axis leaf spring 158. Similarly, the shift drive mechanism 188 includes the Y axis leaf spring 160 disposed at the position facing the Y axis piezoelectric element 126. Therefore, in a state in which the Y axis piezoelectric element 126 is stopped, the shake correction lens 76 can be restored to the original position before being moved in the Y axis direction by the elastic force of the Y axis leaf spring 160.

In addition, as shown in FIGS. 7 and 8, the shake correction drive mechanism 174 includes the X axis VCM 120 and the Y axis VCM 122. The X axis VCM 120 is provided between the holding member 152 and the first support member 154, and generates the power in the X axis direction. The Y axis VCM 122 is provided between the holding member 152 and the first support member 154, and generates the power in the Y axis direction. Therefore, the shake correction lens 76 can be independently moved in the X axis direction and the Y axis direction by the X axis VCM 120 and the Y axis VCM 122.

In addition, as shown in FIGS. 7 and 8, the shift drive mechanism 188 includes the X axis piezoelectric element 124 and the Y axis piezoelectric element 126. The X axis piezoelectric element 124 is provided between the first support member 154 and the second support member 156, and generates the power in the X axis direction. The Y axis piezoelectric element 126 is provided between the first support member 154 and the second support member 156, and generates the power in the Y axis direction. Therefore, the shake correction lens 76 can be independently moved in the X axis direction and the Y axis direction by the X axis piezoelectric element 124 and the Y axis piezoelectric element 126.

In addition, as shown in FIG. 3, the filter unit 80 of the lens device 70 comprises the plurality of BPFs 88. The filter unit 80 is disposed on the subject side with respect to the image sensor 24, and the plurality of BPFs 88 transmit the near-infrared light included in the light. Therefore, the near-infrared light image can be obtained by imaging the near-infrared light on the image sensor 24.

In addition, as shown in FIGS. 14 to 16, the CPU 42 of the surveillance camera body 20 causes the image sensor 24 to perform the imaging according to the shift of the image (for example, each time the image is shifted), and combines the images 212 of the plurality of frames obtained by the imaging. Therefore, the composite image 214 can be obtained.

Second Embodiment

Figure 26:
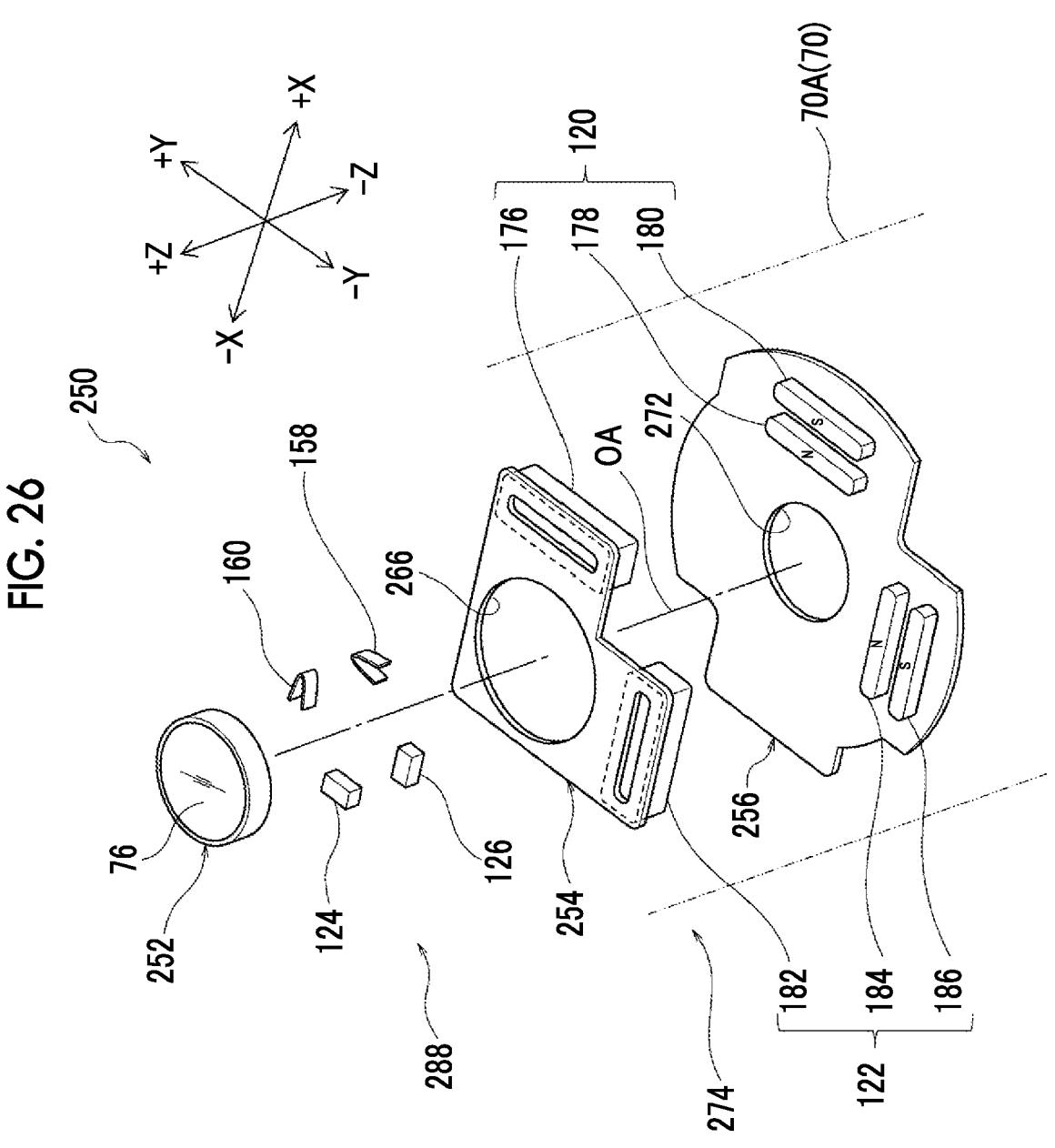
FIG. 26 is an exploded perspective view showing an example of a configuration of a shake correction/shift drive mechanism according to a second embodiment.
Figure 27:
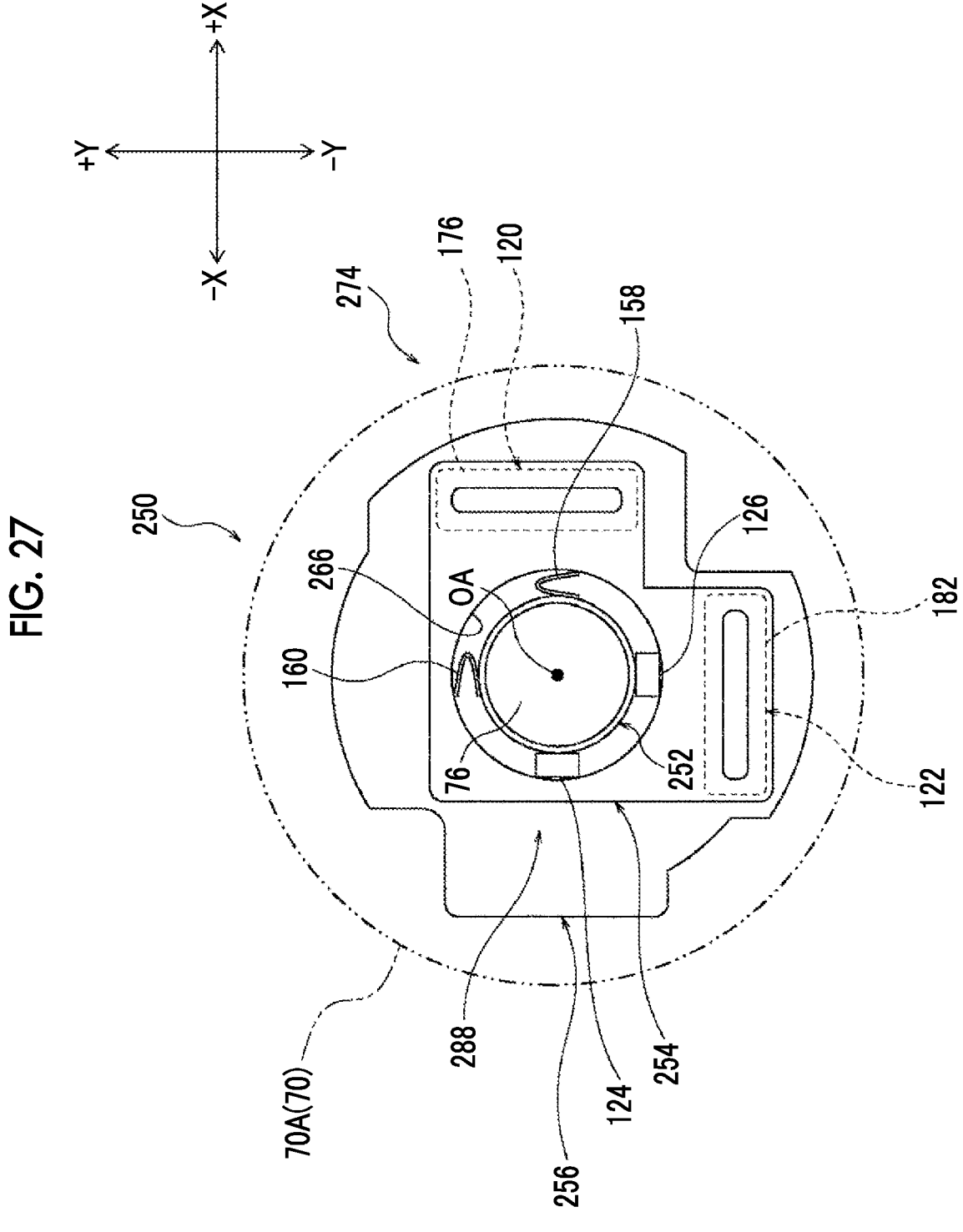
FIG. 27 is a front view showing an example of the configuration of the shake correction/shift drive mechanism according to the second embodiment.

Hereinafter, a second embodiment will be described. As shown in FIG. 26 and FIG. 27 as an example, a shake correction/shift drive mechanism 250 is used in the second embodiment. The shake correction/shift drive mechanism 250 has a configuration changed as follows from the shake correction/shift drive mechanism 150 (see FIGS. 7 and 8) according to the first embodiment. It should be noted that, in the second embodiment, the same elements and members as the elements and members in the first embodiment are designated by the same reference numerals as the reference numerals in the first embodiment, and the detailed description thereof is omitted.

The shake correction/shift drive mechanism 250 according to the second embodiment comprises a holding member 252, a first support member 254, a second support member 256, the X axis VCM 120, the Y axis VCM 122, the X axis piezoelectric element 124, the Y axis piezoelectric element 126, the X axis leaf spring 158, and the Y axis leaf spring 160. The configurations of the X axis VCM 120, the Y axis VCM 122, the X axis piezoelectric element 124, the Y axis piezoelectric element 126, the X axis leaf spring 158, and the Y axis leaf spring 160 are the same as the configurations in the first embodiment. However, the disposition of the X axis piezoelectric element 124, the Y axis piezoelectric element 126, the X axis leaf spring 158, and the Y axis leaf spring 160 is different from the disposition in the first embodiment.

The holding member 252 is formed in a circular shape. The shake correction lens 76 is provided inside the holding member 252. The outer peripheral portion of the shake correction lens 76 is fixed to an inner peripheral portion of the holding member 252. The shake correction lens 76 is held by the holding member 252 by fixing the outer peripheral portion to the inner peripheral portion of the holding member 252. In a state in which the X axis VCM 120, the Y axis VCM 122, the X axis piezoelectric element 124, and the Y axis piezoelectric element 126 are not operated and the shake of the surveillance camera 10 does not occur, the center of the shake correction lens 76 is positioned on the optical axis OA.

The first support member 254 is formed in a substantially plate shape. The first support member 254 is disposed using the Z axis direction as a plate thickness direction. A hole 266 that penetrates in the Z axis direction is formed in the first support member 254. The hole 266 has a circular cross-sectional shape as viewed from the axial direction, and is formed in a size having a diameter equal to or larger than a diameter of the holding member 252. The X axis piezoelectric element 124, the Y axis piezoelectric element 126, the X axis leaf spring 158, and the Y axis leaf spring 160 are provided between the holding member 252 and the first support member 254. The holding member 252 is supported by the first support member 254 to be movable along the X-Y coordinate plane via the X axis piezoelectric element 124, the Y axis piezoelectric element 126, the X axis leaf spring 158, and the Y axis leaf spring 160. In a state in which the X axis VCM 120, the Y axis VCM 122, the X axis piezoelectric element 124, and the Y axis piezoelectric element 126 are not operated and the shake of the surveillance camera 10 does not occur, the center of the hole 266 is positioned on the optical axis OA.

The second support member 256 is fixed to the housing 70A of the lens device 70. The housing 70A of the lens device 70 is a member that supports the objective lens 72, the zoom lens 74, the stop 78, the filter unit 80, and the master lens 82 (see FIG. 2) in addition to the shake correction lens 76 and the shake correction/shift drive mechanism 250, and the second support member 256 is fixed to the housing 70A of the lens device 70.

For example, the second support member 256 is formed in a substantially plate shape. The second support member 256 is disposed using the Z axis direction as a plate thickness direction. The second support member 256 is disposed to face the first support member 254 in the Z axis direction. A hole 272 that penetrates in the Z axis direction is formed in the second support member 256. A cross-sectional shape of the hole 272 as viewed from the axial direction is circular. The hole 272 is formed in a size having a diameter equal to or larger than the diameter of the shake correction lens 76. The center of the hole 272 is positioned on the optical axis OA. By disposing a sliding member (not shown), such as a ball, between the first support member 254 and the second support member 256, the first support member 254 is supported by the second support member 256 to be movable along the X-Y coordinate plane.

A shake correction drive mechanism 274 is formed by the X axis VCM 120 and the Y axis VCM 122. The shake correction drive mechanism 274 is an example of the "first drive mechanism" according to the technology of the present disclosure. The shake correction drive mechanism 274 is provided between the first support member 254 and the second support member 256. The shake correction drive mechanism 274 moves the shake correction lens 76 along the X-Y coordinate plane in the direction in which the shake of the image is corrected, by applying the power to the shake correction lens 76 along the X-Y coordinate plane. That is, the X axis VCM 120 moves the shake correction lens 76 along the X axis direction in the direction in which the shake of the image in the X axis direction is corrected, by applying the power to the shake correction lens 76 along the X axis direction, and the Y axis VCM 122 moves the shake correction lens 76 along the Y axis direction in the direction in which the shake of the image in the Y axis direction is corrected, by applying the power to the shake correction lens 76 along the Y axis direction.

For example, the X axis VCM 120 is disposed with respect to the shake correction lens 76 in the +X axis direction. It should be noted that the X axis VCM 120 may be disposed in the −X axis direction with respect to the shake correction lens 76. The X axis VCM 120 is provided between the first support member 254 and the second support member 256 in the Z axis direction. For example, the X axis VCM 120 is the flat coil type voice coil motor, and includes the coil 176 and the pair of magnets 178 and 180.

As an example, the coil 176 is fixed to the first support member 254, and the pair of magnets 178 and 180 is fixed to the second support member 256. It should be noted that the coil 176 may be fixed to the second support member 256, and the pair of magnets 178 and 180 may be fixed to the first support member 254. The coil 176 is disposed using the Z axis direction as the axial direction, and the pair of magnets 178 and 180 is disposed side by side in the X axis direction. The N pole of the magnet 178 faces the coil 176, and the S pole of the magnet 180 faces the coil 176.

The X axis VCM 120 generates the power in the X axis direction. The direction of the current flowing through the coil 176 is switched by the X axis VCM driver 104 (see FIG. 6). By switching the direction of the current flowing through the coil 176, the direction of the force received by the coil 176 from the pair of magnets 178 and 180 is switched. In a case in which the coil 176 receives the force from the pair of magnets 178 and 180 in the +X axis direction, the power is applied to the first support member 254, the holding member 252 and the shake correction lens 76 in the +X axis direction, and the first support member 254, the holding member 252 and the shake correction lens 76 are moved in the +X axis direction. In a case in which the coil 176 receives the force from the pair of magnets 178 and 180 in the −X axis direction, the power is applied to the first support member 254, the holding member 252 and the shake correction lens 76 in the −X axis direction, and the first support member 254, the holding member 252 and the shake correction lens 76 are moved in the −X axis direction. By applying the power by the X axis VCM 120 in this way, the shake correction lens 76 is moved in the X axis direction, the shake of the image in the X axis direction is corrected.

For example, the Y axis VCM 122 is disposed with respect to the shake correction lens 76 in the −Y axis direction. It should be noted that the Y axis VCM 122 may be disposed in the +Y axis direction with respect to the shake correction lens 76. The Y axis VCM 122 is provided between the first support member 254 and the second support member 256 in the Z axis direction. For example, the Y axis VCM 122 is the flat coil type voice coil motor, and includes the coil 182 and the pair of magnets 184 and 186.

As an example, the coil 182 is fixed to the first support member 254, and the pair of magnets 184 and 186 is fixed to the second support member 256. It should be noted that the coil 182 may be fixed to the second support member 256, and the pair of magnets 184 and 186 may be fixed to the first support member 254. The coil 182 is disposed using the Z axis direction as the axial direction, and the pair of magnets 184 and 186 is disposed side by side in the Y axis direction. The N pole of the magnet 184 faces the coil 182, and the S pole of the magnet 186 faces the coil 182.

The Y axis VCM 122 generates the power in the Y axis direction. The direction of the current flowing through the coil 182 is switched by the Y axis VCM driver 106 (see FIG. 6). By switching the direction of the current flowing through the coil 182, the direction of the force received by the coil 182 from the pair of magnets 184 and 186 is switched. In a case in which the coil 182 receives the force from the pair of magnets 184 and 186 in the +Y axis direction, the power is applied to the first support member 254, the holding member 252 and the shake correction lens 76 in the +Y axis direction, and the first support member 254, the holding member 252 and the shake correction lens 76 are moved in the +Y axis direction. In a case in which the coil 182 receives the force from the pair of magnets 184 and 186 in the −Y axis direction, the power is applied to the first support member 254, the holding member 252 and the shake correction lens 76 in the −Y axis direction, and the first support member 254, the holding member 252 and the shake correction lens 76 are moved in the −Y axis direction. By applying the power by the Y axis VCM 122 in this way, the shake correction lens 76 is moved in the Y axis direction, the shake of the image in the Y axis direction is corrected.

It should be noted that, as an example, the X axis VCM 120 is the flat coil type voice coil motor in which the coil 176 and the pair of magnets 178 and 180 face each other in the axial direction of the coil 176, but the X axis VCM 120 may be the square coil type voice coil motor in which the coil 176 is disposed between the pair of magnets 178 and 180 facing each other in the radial direction of the coil 176. Similarly, as an example, the Y axis VCM 122 is the flat coil type voice coil motor in which the coil 182 and the pair of magnets 184 and 186 face each other in the axial direction of the coil 182, but the Y axis VCM 122 may be the square coil type voice coil motor in which the coil 182 is disposed between the pair of magnets 184 and 186 facing each other in the radial direction of the coil 182.

A shift drive mechanism 288 is formed by the X axis piezoelectric element 124, the Y axis piezoelectric element 126, the X axis leaf spring 158, and the Y axis leaf spring 160. The shift drive mechanism 288 is an example of the "second drive mechanism" according to the technology of the present disclosure.

The shift drive mechanism 288 is provided between the holding member 252 and the first support member 254. The shift drive mechanism 288 moves the shake correction lens 76 along the X-Y coordinate plane in the direction in which the image is shifted, by applying the power to the shake correction lens 76 along the X-Y coordinate plane. That is, the X axis piezoelectric element 124 moves the shake correction lens 76 along the X axis direction in the direction for shifting the image along the X axis direction by applying the power to the shake correction lens 76 along the X axis direction, and the Y axis piezoelectric element 126 moves the shake correction lens 76 along the Y axis direction in the direction for shifting the image along the Y axis direction by applying the power to the shake correction lens 76 along the Y axis direction.

For example, the X axis piezoelectric element 124 is disposed with respect to the holding member 252 in the −X axis direction. The X axis piezoelectric element 124 is provided between the holding member 252 and the first support member 254 in the X axis direction. It should be noted that, instead of the X axis piezoelectric element 124, for example, the actuator, such as the direct current motor, that generates the same power as the piezoelectric element may be used.

The X axis leaf spring 158 is disposed at a position facing the X axis piezoelectric element 124. That is, the X axis leaf spring 158 is disposed with respect to the holding member 252 in the +X axis direction. The X axis leaf spring 158 is provided between the holding member 252 and the first support member 254 in the X axis direction. For example, the X axis leaf spring 158 is a U-shaped or V-shaped leaf spring. It should be noted that the X axis piezoelectric element 124 may be disposed with respect to the holding member 252 in the +X axis direction, and the X axis leaf spring 158 may be disposed with respect to the holding member 252 in the −X axis direction. In addition, the X axis leaf spring 158 may be the leaf spring having the shape other than the U-shape or the V-shape. In addition, instead of the X axis leaf spring 158, the elastic member having elasticity, such as the coil spring, the torsion spring, the rubber, or the sponge, may be used.

The X axis piezoelectric element 124 generates the power in the X axis direction. The X axis piezoelectric element 124 is disposed in the direction in which the power is generated in the +X axis direction. The presence or absence of the electric power supply to the X axis piezoelectric element 124 is switched by the X axis piezoelectric element driver 108 (see FIG. 6). In a case in which the electric power is supplied to the X axis piezoelectric element 124, the X axis piezoelectric element 124 is operated, and in a case in which the electric power supply to the X axis piezoelectric element 124 is stopped, the X axis piezoelectric element 124 is stopped. In a case in which the X axis piezoelectric element 124 is operated, the power is applied to the holding member 252 and the shake correction lens 76 by the X axis piezoelectric element 124 in the +X axis direction, and the holding member 252 and the shake correction lens 76 are moved in the +X axis direction against the elastic force of the X axis leaf spring 158. By applying the power by the X axis piezoelectric element 124 in this way, the shake correction lens 76 is moved, the image in the +X axis direction is shifted. In a case in which the X axis piezoelectric element 124 is stopped from the state in which the X axis piezoelectric element 124 is operated, the elastic force in the −X axis direction due to the X axis leaf spring 158 acts on the holding member 252 and the shake correction lens 76, and the holding member 252 and the shake correction lens 76 are moved in the −X axis direction and restored to the original positions.

For example, the Y axis piezoelectric element 126 is disposed with respect to the holding member 252 in the −Y axis direction. The Y axis piezoelectric element 126 is provided between the holding member 252 and the first support member 254 in the Y axis direction. It should be noted that, instead of the Y axis piezoelectric element 126, for example, the actuator, such as the direct current motor, that generates the same power as the piezoelectric element may be used.

The Y axis leaf spring 160 is disposed at a position facing the Y axis piezoelectric element 126. That is, the Y axis leaf spring 160 is disposed with respect to the holding member 252 in the +Y axis direction. The Y axis leaf spring 160 is provided between the holding member 252 and the first support member 254 in the Y axis direction. For example, the Y axis leaf spring 160 is a U-shaped or V-shaped leaf spring. It should be noted that the Y axis piezoelectric element 126 may be disposed with respect to the holding member 252 in the +Y axis direction, and the Y axis leaf spring 160 may be disposed with respect to the holding member 252 in the −Y axis direction. In addition, the Y axis leaf spring 160 may be the leaf spring having the shape other than the U-shape or the V-shape. In addition, instead of the Y axis leaf spring 160, the elastic member having elasticity, such as the coil spring, the torsion spring, the rubber, or the sponge, may be used.

The Y axis piezoelectric element 126 generates the power in the Y axis direction. The Y axis piezoelectric element 126 is disposed in the direction in which the power is generated in the +Y axis direction. The presence or absence of the electric power supply to the Y axis piezoelectric element 126 is switched by the Y axis piezoelectric element driver 110 (see FIG. 6). In a case in which the electric power is supplied to the Y axis piezoelectric element 126, the Y axis piezoelectric element 126 is operated, and in a case in which the electric power supply to the Y axis piezoelectric element 126 is stopped, the Y axis piezoelectric element 126 is stopped. In a case in which the Y axis piezoelectric element 126 is operated, the power is applied to the holding member 252 and the shake correction lens 76 by the Y axis piezoelectric element 126 in the +Y axis direction, and the holding member 252 and the shake correction lens 76 are moved in the +Y axis direction against the elastic force of the Y axis leaf spring 160. By applying the power by the Y axis piezoelectric element 126 in this way, the shake correction lens 76 is moved, the image in the +Y axis direction is shifted. In a case in which the Y axis piezoelectric element 126 is stopped from the state in which the Y axis piezoelectric element 126 is operated, the elastic force in the −Y axis direction due to the Y axis leaf spring 160 acts on the holding member 252 and the shake correction lens 76, and the holding member 252 and the shake correction lens 76 are moved in the −Y axis direction and restored to the original positions.

In the second embodiment, the surveillance camera 10 has the same configuration as in the first embodiment except that a shake correction/shift drive mechanism 250 is used instead of the shake correction/shift drive mechanism 150 (see FIGS. 7 and 8), and is operated in the same manner as in the first embodiment. For other operations of the surveillance camera 10, the description of the first embodiment is referred to, and the description thereof is omitted.

Hereinafter, the effects of the second embodiment will be described.

The shake correction/shift drive mechanism 250 comprises the shake correction drive mechanism 274 that moves the shake correction lens 76 in the direction in which the shake of the image is corrected, and the shift drive mechanism 288 that moves the shake correction lens 76 in the direction in which the image is shifted. Therefore, for example, the correction of the shake of the image and the shift of the image can be performed with higher accuracy than in a case in which the shake correction lens 76 is moved to shift the image by the shake correction drive mechanism 274 that moves the shake correction lens 76 to correct the shake of the image.

In addition, in a case in which the shift drive mechanism 288 moves the shake correction lens 76 in the direction in which the shake correction drive mechanism 274 moves the shake correction lens 76, the shake correction lens 76 is moved by the movement amount in which the movement amount of the shake correction lens 76 by the shift drive mechanism 288 is added to the movement amount of the shake correction lens 76 by the shake correction drive mechanism 274. Therefore, it is possible to shift the image to the position designated by the image shift command. In addition, in a case in which the shift drive mechanism 288 moves the shake correction lens 76 in the direction opposite to the direction in which the shake correction drive mechanism 274 moves the shake correction lens 76, the shake correction lens 76 is moved by the movement amount in which the movement amount of the shake correction lens 76 by the shift drive mechanism 288 is subtracted from the movement amount of the shake correction lens 76 by the shake correction drive mechanism 274. Therefore, it is possible to shift the image to the position designated by the image shift command.

In addition, the X axis piezoelectric element 124 moves the shake correction lens 76 by applying the power to the shake correction lens 76 along the X axis direction, and the Y axis piezoelectric element 126 moves the shake correction lens 76 by applying the power to the shake correction lens 76 along the Y axis direction. Therefore, the shake correction lens 76 can be independently moved in the X axis direction and the Y axis direction by the X axis piezoelectric element 124 and the Y axis piezoelectric element 126.

In addition, the shake correction/shift drive mechanism 250 comprises the holding member 252 that holds the shake correction lens 76, the first support member 254 that supports the holding member 252 to be movable along the X-Y coordinate plane, and the second support member 256 that supports the first support member 254 to be movable along the X-Y coordinate plane. The shake correction drive mechanism 274 is provided between the first support member 254 and the second support member 256, and the shift drive mechanism 288 is provided between the holding member 252 and the first support member 254. Therefore, the movement of the shake correction lens 76 for correcting the shake of the image and the movement of the shake correction lens 76 for shifting the image can be performed independently.

In addition, the shake correction drive mechanism 274 includes a voice coil motor, and the shift drive mechanism 288 includes a piezoelectric element. Therefore, with a simple configuration, it is possible to move the shake correction lens 76 for correcting the shake of the image and to move the shake correction lens 76 for shifting the image.

In addition, the shift drive mechanism 288 includes the X axis leaf spring 158 disposed at the position facing the X axis piezoelectric element 124. Therefore, in a state in which the X axis piezoelectric element 124 is stopped, the shake correction lens 76 can be restored to the original position before being moved in the X axis direction by the elastic force of the X axis leaf spring 158. Similarly, the shift drive mechanism 288 includes the Y axis leaf spring 160 disposed at the position facing the Y axis piezoelectric element 126. Therefore, in a state in which the Y axis piezoelectric element 126 is stopped, the shake correction lens 76 can be restored to the original position before being moved in the Y axis direction by the elastic force of the Y axis leaf spring 160.

In addition, the shake correction drive mechanism 274 includes the X axis VCM 120 and the Y axis VCM 122. The X axis VCM 120 is provided between the first support member 254 and the second support member 256, and generates the power in the X axis direction. The Y axis VCM 122 is provided between the first support member 254 and the second support member 256, and generates the power in the Y axis direction. Therefore, the shake correction lens 76 can be independently moved in the X axis direction and the Y axis direction by the X axis VCM 120 and the Y axis VCM 122.

In addition, the shift drive mechanism 288 includes the X axis piezoelectric element 124 and the Y axis piezoelectric element 126. The X axis piezoelectric element 124 is provided between the holding member 252 and the first support member 254, and generates the power in the X axis direction. The Y axis piezoelectric element 126 is provided between the holding member 252 and the first support member 254, and generates the power in the Y axis direction. Therefore, the shake correction lens 76 can be independently moved in the X axis direction and the Y axis direction by the X axis piezoelectric element 124 and the Y axis piezoelectric element 126.

In the second embodiment, with respect to the same configuration as in the first embodiment, the same actions and effects as in the first embodiment is obtained.

Third Embodiment

Figure 28:
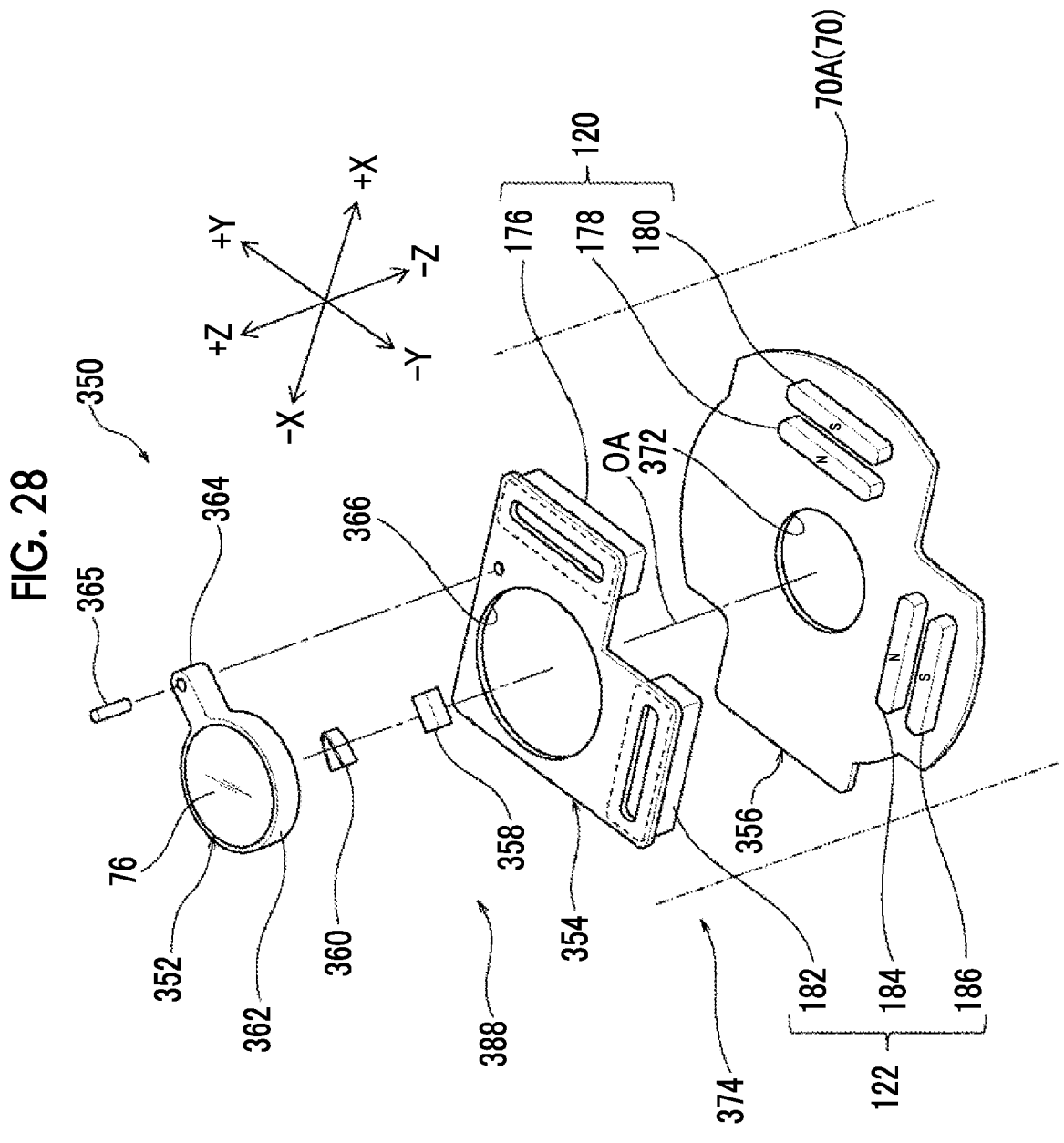
FIG. 28 is an exploded perspective view showing an example of a configuration of a shake correction/shift drive mechanism according to a third embodiment.
Figure 29:
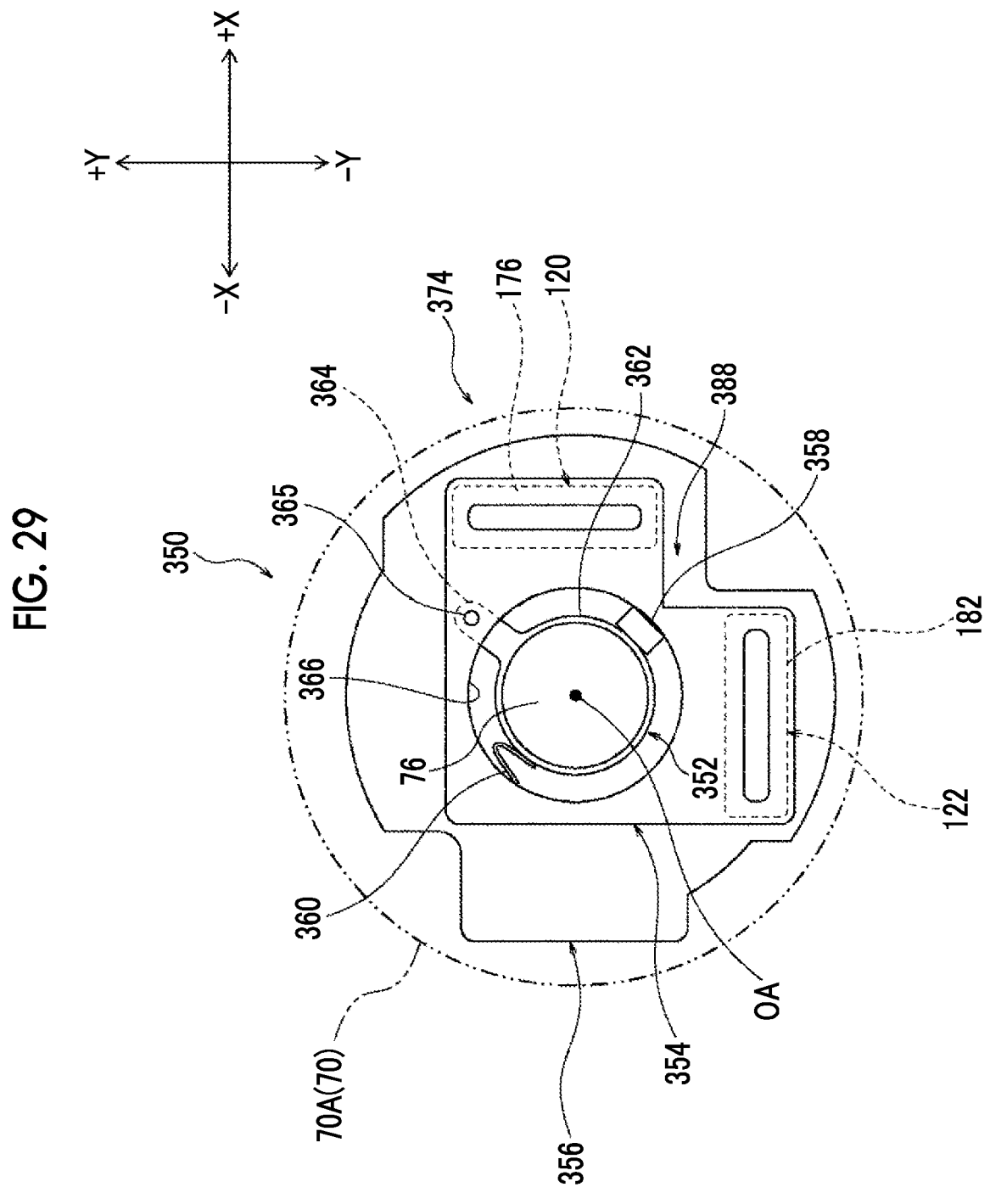
FIG. 29 is a front view showing an example of the configuration of the shake correction/shift drive mechanism according to the third embodiment.

Hereinafter, a third embodiment will be described. As shown in FIG. 28 and FIG. 29 as an example, a shake correction/shift drive mechanism 350 is used in the third embodiment. The shake correction/shift drive mechanism 350 has a configuration changed as follows from the shake correction/shift drive mechanism 150 (see FIGS. 7 and 8) according to the first embodiment. It should be noted that, in the third embodiment, the same elements and members as the elements and members in the first embodiment are designated by the same reference numerals as the reference numerals in the first embodiment, and the detailed description thereof is omitted.

The shake correction/shift drive mechanism 350 according to the third embodiment comprises a holding member 352, a first support member 354, a second support member 356, the X axis VCM 120, the Y axis VCM 122, a piezoelectric element 358, and a leaf spring 360. The configurations of the X axis VCM 120 and the Y axis VCM 122 are the same as the configurations in the first embodiment. In addition, the configuration of the piezoelectric element 358 is the same as the configurations of the X axis piezoelectric element 124 and the Y axis piezoelectric element 126 (see FIGS. 7 and 8) in the first embodiment, and the configuration of the leaf spring 360 is the same as the configurations of the X axis leaf spring 158 and the Y axis leaf spring 160 (see FIGS. 7 and 8) in the first embodiment. However, the disposition of the X axis VCM 120, the Y axis VCM 122, the piezoelectric element 358, and the leaf spring 360 is different from the disposition in the first embodiment. The piezoelectric element 358 is an example of a "third actuator" according to the technology of the present disclosure, and the leaf spring 360 is an example of an "elastic member" according to the technology of the present disclosure.

The holding member 352 has a body part 362 and a protruding portion 364. The body part 362 is formed in a circular shape, and the protruding portion 364 protrudes from the body part 362 in the radial direction of the body part 362. The shake correction lens 76 is provided inside the body part 362. The outer peripheral portion of the shake correction lens 76 is fixed to an inner peripheral portion of the body part 362. The shake correction lens 76 is held by the holding member 352 by fixing the outer peripheral portion to the inner peripheral portion of the body part 362.

The protruding portion 364 is positioned with respect to the body part 362 in the +X axis direction and the +Y axis direction. The protruding portion 364 is disposed between the first support member 354 and the second support member 356 in the Z axis direction. The protruding portion 364 is fixed to the first support member 354 to be rotatable by a shaft member 365 extending along the optical axis OA. The holding member 352 is supported with respect to the first support member 354 to be rotatable about the shaft member 365. In a state in which the X axis VCM 120, the Y axis VCM 122, and the piezoelectric element 358 are not operated and the shake of the surveillance camera 10 does not occur, the center of the shake correction lens 76 is positioned on the optical axis OA.

The first support member 354 is formed in a substantially plate shape. The first support member 354 is disposed using the Z axis direction as a plate thickness direction. A hole 366 that penetrates in the Z axis direction is formed in the first support member 354. The hole 366 has a circular cross-sectional shape as viewed from the axial direction, and is formed in a size having a diameter equal to or larger than a diameter of the body part 362. The piezoelectric element 358 and the leaf spring 360 are provided between the holding member 352 and the first support member 354. The holding member 352 is supported by the first support member 354 to be movable along the X-Y coordinate plane via the piezoelectric element 358 and the leaf spring 360. In a state in which the X axis VCM 120, the Y axis VCM 122, and the piezoelectric element 358 are not operated and the shake of the surveillance camera 10 does not occur, the center of the hole 366 is positioned on the optical axis OA.

The second support member 356 is fixed to the housing 70A of the lens device 70. The housing 70A of the lens device 70 is a member that supports the objective lens 72, the zoom lens 74, the stop 78, the filter unit 80, and the master lens 82 (see FIG. 2) in addition to the shake correction lens 76 and the shake correction/shift drive mechanism 350, and the second support member 356 is fixed to the housing 70A of the lens device 70.

For example, the second support member 356 is formed in a substantially plate shape. The second support member 356 is disposed using the Z axis direction as a plate thickness direction. The second support member 356 is disposed to face the first support member 354 in the Z axis direction. A hole 372 that penetrates in the Z axis direction is formed in the second support member 356. A cross-sectional shape of the hole 372 as viewed from the axial direction is circular. The hole 372 is formed in a size having a diameter equal to or larger than the diameter of the shake correction lens 76. The center of the hole 372 is positioned on the optical axis OA. By disposing a sliding member (not shown), such as a ball, between the first support member 354 and the second support member 356, the first support member 354 is supported by the second support member 356 to be movable along the X-Y coordinate plane.

A shake correction drive mechanism 374 is formed by the X axis VCM 120 and the Y axis VCM 122. The shake correction drive mechanism 374 is an example of the "first drive mechanism" according to the technology of the present disclosure. The shake correction drive mechanism 374 is provided between the first support member 354 and the second support member 356. The shake correction drive mechanism 374 moves the shake correction lens 76 along the X-Y coordinate plane in the direction in which the shake of the image is corrected, by applying the power to the shake correction lens 76 along the X-Y coordinate plane. That is, the X axis VCM 120 moves the shake correction lens 76 along the X axis direction in the direction in which the shake of the image in the X axis direction is corrected, by applying the power to the shake correction lens 76 along the X axis direction, and the Y axis VCM 122 moves the shake correction lens 76 along the Y axis direction in the direction in which the shake of the image in the Y axis direction is corrected, by applying the power to the shake correction lens 76 along the Y axis direction.

For example, the X axis VCM 120 is disposed with respect to the shake correction lens 76 in the +X axis direction. It should be noted that the X axis VCM 120 may be disposed in the −X axis direction with respect to the shake correction lens 76. The X axis VCM 120 is provided between the first support member 354 and the second support member 356 in the Z axis direction. For example, the X axis VCM 120 is the flat coil type voice coil motor, and includes the coil 176 and the pair of magnets 178 and 180.

As an example, the coil 176 is fixed to the first support member 354, and the pair of magnets 178 and 180 is fixed to the second support member 356. It should be noted that the coil 176 may be fixed to the second support member 356, and the pair of magnets 178 and 180 may be fixed to the first support member 354. The coil 176 is disposed using the Z axis direction as the axial direction, and the pair of magnets 178 and 180 is disposed side by side in the X axis direction. The N pole of the magnet 178 faces the coil 176, and the S pole of the magnet 180 faces the coil 176.

The X axis VCM 120 generates the power in the X axis direction. The direction of the current flowing through the coil 176 is switched by the X axis VCM driver 104 (see FIG. 6). By switching the direction of the current flowing through the coil 176, the direction of the force received by the coil 176 from the pair of magnets 178 and 180 is switched. In a case in which the coil 176 receives the force from the pair of magnets 178 and 180 in the +X axis direction, the power is applied to the first support member 354, the holding member 352 and the shake correction lens 76 in the +X axis direction, and the first support member 354, the holding member 352 and the shake correction lens 76 are moved in the +X axis direction. In a case in which the coil 176 receives the force from the pair of magnets 178 and 180 in the −X axis direction, the power is applied to the first support member 354, the holding member 352 and the shake correction lens 76 in the −X axis direction, and the first support member 354, the holding member 352 and the shake correction lens 76 are moved in the −X axis direction. By applying the power by the X axis VCM 120 in this way, the shake correction lens 76 is moved in the X axis direction, the shake of the image in the X axis direction is corrected.

For example, the Y axis VCM 122 is disposed with respect to the shake correction lens 76 in the −Y axis direction. It should be noted that the Y axis VCM 122 may be disposed in the +Y axis direction with respect to the shake correction lens 76. The Y axis VCM 122 is provided between the first support member 354 and the second support member 356 in the Z axis direction. For example, the Y axis VCM 122 is the flat coil type voice coil motor, and includes the coil 182 and the pair of magnets 184 and 186.

As an example, the coil 182 is fixed to the first support member 354, and the pair of magnets 184 and 186 is fixed to the second support member 356. It should be noted that the coil 182 may be fixed to the second support member 356, and the pair of magnets 184 and 186 may be fixed to the first support member 354. The coil 182 is disposed using the Z axis direction as the axial direction, and the pair of magnets 184 and 186 is disposed side by side in the Y axis direction. The N pole of the magnet 184 faces the coil 182, and the S pole of the magnet 186 faces the coil 182.

The Y axis VCM 122 generates the power in the Y axis direction. The direction of the current flowing through the coil 182 is switched by the Y axis VCM driver 106 (see FIG. 6). By switching the direction of the current flowing through the coil 182, the direction of the force received by the coil 182 from the pair of magnets 184 and 186 is switched. In a case in which the coil 182 receives the force from the pair of magnets 184 and 186 in the +Y axis direction, the power is applied to the first support member 354, the holding member 352 and the shake correction lens 76 in the +Y axis direction, and the first support member 354, the holding member 352 and the shake correction lens 76 are moved in the +Y axis direction. In a case in which the coil 182 receives the force from the pair of magnets 184 and 186 in the −Y axis direction, the power is applied to the first support member 354, the holding member 352 and the shake correction lens 76 in the −Y axis direction, and the first support member 354, the holding member 352 and the shake correction lens 76 are moved in the −Y axis direction. By applying the power by the Y axis VCM 122 in this way, the shake correction lens 76 is moved in the Y axis direction, the shake of the image in the Y axis direction is corrected.

It should be noted that, as an example, the X axis VCM 120 is the flat coil type voice coil motor in which the coil 176 and the pair of magnets 178 and 180 face each other in the axial direction of the coil 176, but the X axis VCM 120 may be the square coil type voice coil motor in which the coil 176 is disposed between the pair of magnets 178 and 180 facing each other in the radial direction of the coil 176. Similarly, as an example, the Y axis VCM 122 is the flat coil type voice coil motor in which the coil 182 and the pair of magnets 184 and 186 face each other in the axial direction of the coil 182, but the Y axis VCM 122 may be the square coil type voice coil motor in which the coil 182 is disposed between the pair of magnets 184 and 186 facing each other in the radial direction of the coil 182.

A shift drive mechanism 388 is formed by the piezoelectric element 358 and the leaf spring 360. The shift drive mechanism 388 is an example of the "second drive mechanism" according to the technology of the present disclosure. The shift drive mechanism 388 is provided between the holding member 352 and the first support member 354. The shift drive mechanism 388 moves the shake correction lens 76 along the X-Y coordinate plane in the direction in which the image is shifted, by applying the power to the shake correction lens 76 along the X-Y coordinate plane.

For example, the piezoelectric element 358 is disposed with respect to the body part 362 in the +X axis direction and the −Y axis direction. The piezoelectric element 358 is provided between the holding member 352 and the first support member 354. Instead of the piezoelectric element 358, for example, the actuator, such as the direct current motor, that generates the same power as the piezoelectric element may be used.

The leaf spring 360 is disposed at a position facing the piezoelectric element 358. That is, the leaf spring 360 is disposed with respect to the body part 362 in the −X axis direction and the +Y axis direction. The leaf spring 360 is provided between the holding member 352 and the first support member 354. For example, the leaf spring 360 is a U-shaped or V-shaped leaf spring. It should be noted that the protruding portion 364 may be positioned in the +X axis direction and the −Y axis direction of the body part 362, the piezoelectric element 358 may be disposed in the −X axis direction and the −Y axis direction of the body part 362, and the leaf spring 360 may be disposed in the +X axis direction and the +Y axis direction of the body part 362. In addition, the protruding portion 364 may be positioned in the −X axis direction and the −Y axis direction of the body part 362, the piezoelectric element 358 may be disposed in the −X axis direction and the +Y axis direction of the body part 362, and the leaf spring 360 may be disposed in the +X axis direction and the +Y axis direction of the body part 362. In addition, the protruding portion 364 may be positioned in the −X axis direction and the +Y axis direction of the body part 362, the piezoelectric element 358 may be disposed in the +X axis direction and the +Y axis direction of the body part 362, and the leaf spring 360 may be disposed in the +X axis direction and the −Y axis direction of the body part 362. In addition, the leaf spring 360 may be the leaf spring having the shape other than the U-shape or the V-shape. In addition, instead of the leaf spring 360, an elastic member having elasticity, such as a coil spring, a torsion spring, rubber, or a sponge, may be used.

The piezoelectric element 358 generates the power in a combination direction of the X axis direction and the Y axis direction. The piezoelectric element 358 is disposed in a direction in which the power is generated in a combination direction of the −X axis direction and the +Y axis direction. The presence or absence of the electric power supply to the piezoelectric element 358 is switched by a piezoelectric element driver (not shown). In a case in which the electric power is supplied to the piezoelectric element 358, the piezoelectric element 358 is operated, and in a case in which the electric power supply to the piezoelectric element 358 is stopped, the piezoelectric element 358 is stopped. In a case in which the piezoelectric element 358 is operated, the power is applied by the piezoelectric element 358 to the holding member 352 and the shake correction lens 76 in the combination direction of the −X axis direction and the +Y axis direction, and the holding member 352 and the shake correction lens 76 are rotationally moved about the shaft member 365 in the combination direction of the −X axis direction and the +Y axis direction. In this case, the holding member 352 and the shake correction lens 76 are rotationally moved against the elastic force of the leaf spring 360. By applying the power by the piezoelectric element 358 in this way, the shake correction lens 76 is moved, the image in −X axis direction the +Y axis direction is shifted. In a case in which the piezoelectric element 358 is stopped from the state in which the piezoelectric element 358 is operated, the elastic force in the combination direction of the +X axis direction and the −Y axis direction due to the leaf spring 360 acts on the holding member 352 and the shake correction lens 76, and the holding member 352 and the shake correction lens 76 are rotationally moved about the shaft member 365 in the combination direction of in the +X axis direction and the −Y axis direction and then restored to the original positions.

In the third embodiment, the surveillance camera 10 has the same configuration as in the first embodiment except that a shake correction/shift drive mechanism 350 is used instead of the shake correction/shift drive mechanism 150 (see FIGS. 7 and 8), and is operated in the same manner as in the first embodiment. However, in the third embodiment, the control of switching the presence or absence of the shift of the image is repeatedly executed by setting the frame periods for two periods as one set. For other operations of the surveillance camera 10, the description of the first embodiment is referred to, and the description thereof is omitted.

Hereinafter, the effects of the third embodiment will be described.

The shake correction/shift drive mechanism 350 comprises the shake correction drive mechanism 374 that moves the shake correction lens 76 in the direction in which the shake of the image is corrected, and the shift drive mechanism 388 that moves the shake correction lens 76 in the direction in which the image is shifted. Therefore, for example, the correction of the shake of the image and the shift of the image can be performed with higher accuracy than in a case in which the shake correction lens 76 is moved to shift the image by the shake correction drive mechanism 374 that moves the shake correction lens 76 to correct the shake of the image.

In addition, in a case in which the shift drive mechanism 388 moves the shake correction lens 76 in the direction in which the shake correction drive mechanism 374 moves shake correction lens 76, the shake correction lens 76 is moved by the movement amount in which the movement amount of the shake correction lens 76 by the shift drive mechanism 388 is added to the movement amount of the shake correction lens 76 by the shake correction drive mechanism 374. Therefore, it is possible to shift the image to the position designated by the image shift command. In addition, in a case in which the shift drive mechanism 388 moves the shake correction lens 76 in the direction opposite to the direction in which the shake correction drive mechanism 374 moves the shake correction lens 76, the shake correction lens 76 is moved by the movement amount in which the movement amount of the shake correction lens 76 by the shift drive mechanism 388 is subtracted from the movement amount of the shake correction lens 76 by the shake correction drive mechanism 374. Therefore, it is possible to shift the image to the position designated by the image shift command.

In addition, the shake correction/shift drive mechanism 350 comprises the holding member 352 that holds the shake correction lens 76, the first support member 354 that supports the holding member 352 to be movable along the X-Y coordinate plane, and the second support member 356 that supports the first support member 354 to be movable along the X-Y coordinate plane. The shake correction drive mechanism 374 is provided between the first support member 354 and the second support member 356, and the shift drive mechanism 388 is provided between the holding member 352 and the first support member 354. Therefore, the movement of the shake correction lens 76 for correcting the shake of the image and the movement of the shake correction lens 76 for shifting the image can be performed independently.

In addition, the holding member 352 is supported with respect to the first support member 354 to be rotatable about the shaft member 365 extending along the optical axis OA. As a result, with a simple configuration, it is possible to shift the image along the X-Y coordinate plane orthogonal to the optical axis OA.

In addition, the shake correction drive mechanism 374 includes a voice coil motor, and the shift drive mechanism 388 includes a piezoelectric element. Therefore, with a simple configuration, it is possible to move the shake correction lens 76 for correcting the shake of the image and to move the shake correction lens 76 for shifting the image.

In addition, the shift drive mechanism 388 includes the leaf spring 360 disposed at a position facing the piezoelectric element 358. Therefore, in a state in which the piezoelectric element 358 is stopped, the shake correction lens 76 can be restored to the original position before being moved in the X axis direction by the elastic force of the leaf spring 360.

In addition, the shake correction drive mechanism 374 includes the X axis VCM 120 and the Y axis VCM 122. The X axis VCM 120 is provided between the first support member 354 and the second support member 356, and generates the power in the X axis direction. The Y axis VCM 122 is provided between the first support member 354 and the second support member 356, and generates the power in the Y axis direction. Therefore, the shake correction lens 76 can be independently moved in the X axis direction and the Y axis direction by the X axis VCM 120 and the Y axis VCM 122.

In addition, the shift drive mechanism 388 includes the piezoelectric element 358. The piezoelectric element 358 is provided between the holding member 352 and the first support member 354, and generates the power in the combination direction of the X axis direction and the Y axis direction. Therefore, the piezoelectric element 358 can move the shake correction lens 76 in the combination direction of the X axis direction and the Y axis direction.

In the third embodiment, with respect to the same configuration as in the first embodiment, the same actions and effects as in the first embodiment is obtained.

Hereinafter, a modification example common to the embodiments described above (that is, the first embodiment, the second embodiment, and the third embodiment) will be described.

Figure 30:
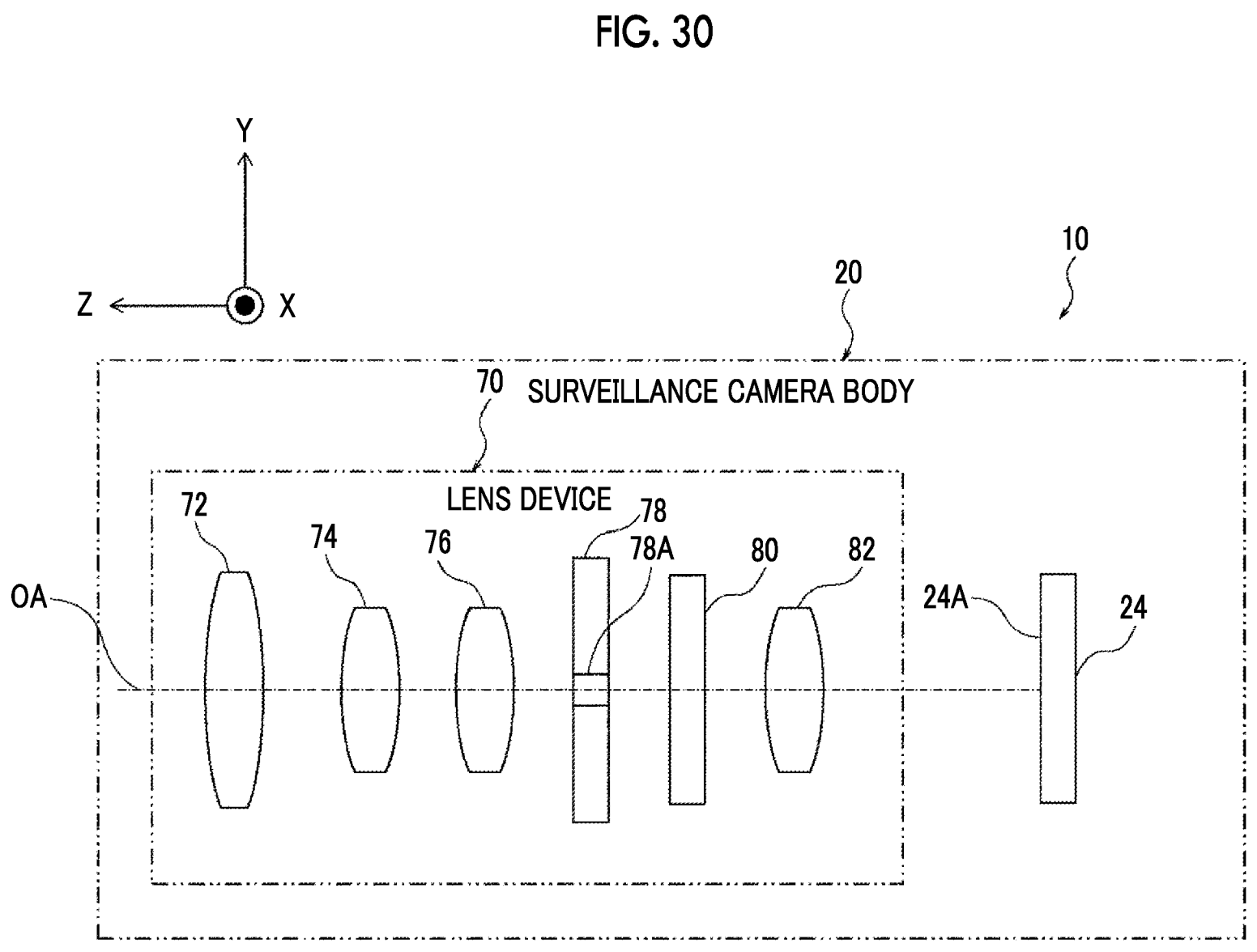

In the embodiments described above, the lens device 70 is provided on the surveillance camera body 20 by mounting the lens device 70 on the surveillance camera body 20 including the image sensor 24, but as shown in FIG. 30 as an example, the lens device 70 may be provided on the surveillance camera body 20 by mounting the lens device 70 on the surveillance camera body 20 including the image sensor 24.

In addition, in the embodiments described above, the lens device 70 comprises the controller 90 different from the controller 40 of the surveillance camera body 20, but the lens device 70 does not have to comprise the controller 90. Moreover, the functions of the controller 90 of the lens device 70 may be integrated into the controller 40 of the surveillance camera body 20, and the control of the lens device 70 may be performed by the controller 40 of the surveillance camera body 20. In this case, the controller 90 is an example of a "computer applied to an imaging apparatus".

In addition, in the embodiments described above, the form example is described in which the imaging processing is executed by the controller 40 of the surveillance camera 10, but the technology of the present disclosure is not limited to this. For example, the imaging processing may be executed by a computer of an external device that is connected to the surveillance camera 10 via a network, such as a LAN or a WAN, in a communicable manner. In addition, the external device described above and the surveillance camera 10 may execute the imaging processing in a distributed manner, or a plurality of devices including the external device described above and the surveillance camera 10 may execute the imaging processing in a distributed manner.

In addition, in the embodiments described above, the surveillance camera 10 is described as an example of the imaging apparatus, but the technology of the present disclosure is not limited to this, and the technology shown in the embodiments described above can be applied to various imaging apparatuses. Examples of the imaging apparatus described herein include a digital camera that is a lens interchangeable type and does not use a reflex mirror, a digital camera that is a lens stationary type, a digital camera that uses a reflex mirror, and a digital camera built in various electronic apparatuses, such as a smart device, a wearable terminal, and a cell observation device, an ophthalmology observation device, and a surgical microscope. In addition, the technology shown in the embodiments described above may be applied to an imaging apparatus comprising an image sensor having sensitivity to light having a wavelength range other than a wavelength range of the near-infrared light.

In addition, in the embodiments described above, the form example is described in which the shake correction/shift processing program 100 is stored in the NVM 94, but the shake correction/shift processing program 100 may be stored in a portable storage medium, such as an SSD or a USB memory, and the shake correction/shift processing program 100 need only be stored in a non-transitory storage medium. The shake correction/shift processing program 100 stored in the non-transitory storage medium is installed and used in the lens device 70, for example.

In addition, in the embodiments described above, the aspect example is shown in which the controller 40 is built in the surveillance camera 10, but the technology of the present disclosure is not limited to this, and for example, the controller 40 may be provided in the outside of the surveillance camera 10.

In addition, in the embodiments described above, the CPU 42 of the surveillance camera body 20 is a single CPU, but may be a plurality of CPUs. In addition, a GPU may be applied instead of the CPU 42. Similarly, the CPU 92 of the lens device 70 is a single CPU, but may be a plurality of CPUs. In addition, a GPU may be applied instead of the CPU 92.

In addition, in the embodiments described above, the surveillance camera body 20 comprises the controller 40, but the technology of the present disclosure is not limited to this, and a device including an ASIC, an FPGA, and/or a PLD may be applied instead of the controller 40. In addition, a hardware configuration and a software configuration may be used in combination, instead of the controller 40.

In addition, in the embodiments described above, the lens device 70 comprises the controller 90, but the technology of the present disclosure is not limited to this, and a device including an ASIC, an FPGA, and/or a PLD may be applied instead of the controller 90. In addition, a hardware configuration and a software configuration may be used in combination, instead of the controller 90.

The following various processors can be used as a hardware resource for executing the shake correction/shift processing in the embodiments described above. Examples of the processor include a CPU which is a general-purpose processor functioning as the hardware resource for executing the shake correction/shift processing by executing software, that is, a program. Examples of the processor also include a dedicated electric circuit which is a processor having a circuit configuration specially designed for executing specific processing, such as an FPGA, a PLD, or an ASIC. A memory is also built in or connected to any processor, and any processor executes the shake correction/shift processing using the memory.

The hardware resource for executing the shake correction/shift processing may be configured by one of these various processors, or may be configured by a combination of two or more processors of the same type or different types (for example, a combination of a plurality of FPGAs or a combination of a CPU and an FPGA). Moreover, the hardware resource for executing the shake correction/shift processing may be one processor.

As an example of the configuration using one processor, first, there is a form in which one processor is configured by a combination of one or more CPUs and software, and the processor functions as the hardware resource for executing the shake correction/shift processing. Secondly, as represented by the SoC, there is a form in which a processor that realizes the functions of the entire system including a plurality of hardware resources for executing the shake correction/shift processing with one IC chip is used. In this way, the shake correction/shift processing is realized by using one or more of the various processors described above as the hardware resource.

Further, more specifically, an electric circuit in which circuit elements, such as semiconductor elements, are combined can be used as the hardware structure of these various processors. In addition, the shake correction/shift processing described above is merely an example. Accordingly, it is obvious that unnecessary steps may be deleted, new steps may be added, or the processing sequence may be changed within a range that does not deviate from the gist.

The contents described and shown so far are the detailed description of the parts according to the technology of the present disclosure, and are merely examples of the technology of the present disclosure. For example, the descriptions of the configurations, the functions, the actions, and the effects are the descriptions of examples of the configurations, the functions, the actions, and the effects of the parts according to the technology of the present disclosure. It is needless to say that unnecessary parts may be deleted, new elements may be added, or replacements may be made with respect to the contents described and shown so far within a range that does not deviate from the gist of the technology of the present disclosure. In addition, in order to avoid complications and facilitate understanding of the parts according to the technology of the present disclosure, in the contents described and shown so far, the descriptions of common technical knowledge and the like that do not particularly require the description for enabling carrying out of the technology of the present disclosure are omitted.

In the present specification, "A and/or B" is synonymous with "at least one of A or B". In other words, "A and/or B" means that it may be only A, only B, or a combination of A and B. In addition, in the present specification, in a case in which three or more matters are associated and expressed by "and/or", the same concept as "A and/or B" is applied.

All of the documents, the patent applications, and the technical standards described in the present specification are incorporated into the present specification by reference to the same extent as in a case in which the individual documents, patent applications, and technical standards are specifically and individually stated to be described by reference.

What is claimed is:

1. A lens device provided in an imaging apparatus body including an image sensor, the lens device comprising:
   a lens that includes a shake correction lens correcting a shake of an image obtained by imaging light on the image sensor, and images the light, which is incident, on the image sensor;
   a first drive mechanism that moves the shake correction lens in a direction in which the shake of the image is corrected, by applying power to the shake correction lens along a coordinate plane intersecting an optical axis of the lens;
   a second drive mechanism that moves the shake correction lens in a direction in which the image is shifted, by applying power to the shake correction lens along the coordinate plane, wherein the second drive mechanism is a different type of drive mechanism than the first drive mechanism, wherein a movement amount of the shake correction lens by the second drive mechanism is smaller than a movement amount of the shake correction lens by the first drive mechanism;
   a processor; and
   a memory coupled to or integrated with the processor, wherein the processor is configured to:
      perform, with respect to the first drive mechanism, control of moving the shake correction lens in the direction in which the shake of the image is corrected, and
      perform, with respect to the second drive mechanism, control of moving the shake correction lens in the direction in which the image is shifted,
   wherein the second drive mechanism moves the shake correction lens along a direction in which the first drive mechanism moves the shake correction lens, the shake correction lens is moved by a movement amount in which a movement amount of the shake correction lens by the second drive mechanism is added to a movement amount of the shake correction lens by the first drive mechanism in a case in which the second drive mechanism moves the shake correction lens in the direction in which the first drive mechanism moves the shake correction lens, and the shake correction lens is moved by a movement amount in which the movement amount of the shake correction lens by the second drive mechanism is subtracted from the movement amount of the shake correction lens by the first drive mechanism in a case in which the second drive mechanism moves the shake correction lens in a direction opposite to the direction in which the first drive mechanism moves the shake correction lens.

2. The lens device according to claim 1,
   wherein the control with respect to the first drive mechanism is feedback control based on a shake amount of an imaging apparatus including the lens device and the imaging apparatus body, and
   the control with respect to the second drive mechanism is sequence control based on predetermined shift sequence.

3. The lens device according to claim 1,
   wherein the processor is configured to perform, with respect to the second drive mechanism, control of moving the shake correction lens in the direction in which the image is shifted, according to imaging in units of frames by the image sensor.

4. The lens device according to claim 1,
   wherein the processor is configured to perform, with respect to the second drive mechanism, control of moving the shake correction lens to a position at which the image is shifted at a pitch equal to or larger than a pixel pitch of the image sensor or a pitch smaller than the pixel pitch of the image sensor.

5. The lens device according to claim 1, wherein the coordinate plane is defined by a first direction and a second direction intersecting the first direction, the second drive mechanism includes a third actuator and a fourth actuator, the third actuator moves the shake correction lens by applying power to the shake correction lens along the first direction, the fourth actuator moves the shake correction lens by applying power to the shake correction lens along the second direction, and the processor is configured to perform, with respect to the second drive mechanism, control of selectively switching a combination of presence or absence of the power of the third actuator and presence or absence of the power of the fourth actuator.

6. The lens device according to claim 1, wherein the coordinate plane is defined by a first direction and a second direction intersecting the first direction, the second drive mechanism includes a third actuator and a fourth actuator, the third actuator moves the shake correction lens by applying power to the shake correction lens along the first direction, and the fourth actuator moves the shake correction lens by applying power to the shake correction lens along the second direction.

7. The lens device according to claim 1, further comprising:

a holding member that holds the shake correction lens;

a first support member that supports the holding member to be movable along the coordinate plane; and a second support member that supports the first support member to be movable along the coordinate plane, wherein the first drive mechanism is provided between the holding member and the first support member, and the second drive mechanism is provided between the first support member and the second support member.

8. The lens device according to claim 7, wherein the coordinate plane is defined by a first direction and a second direction intersecting the first direction, the first drive mechanism includes:

a first actuator that is provided between the holding member and the first support member and generates power in the first direction, and a second actuator that is provided between the holding member and the first support member and generates power in the second direction, and the second drive mechanism includes:

a third actuator that is provided between the first support member and the second support member and generates power in the first direction, and a fourth actuator that is provided between the first support member and the second support member and generates power in the second direction.

9. The lens device according to claim 1, further comprising:

a holding member that holds the shake correction lens;

a first support member that supports the holding member to be movable along the coordinate plane; and a second support member that supports the first support member to be movable along the coordinate plane, wherein the first drive mechanism is provided between the first support member and the second support member, and the second drive mechanism is provided between the holding member and the first support member.

10. The lens device according to claim 9, wherein the holding member is supported by the first support member to be rotatable about a shaft member that extends along the optical axis.

11. The lens device according to claim 9, wherein the coordinate plane is defined by a first direction and a second direction intersecting the first direction, the first drive mechanism includes:

a first actuator that is provided between the first support member and the second support member and generates power in the first direction, and a second actuator that is provided between the first support member and the second support member and generates power in the second direction, and the second drive mechanism includes:

a third actuator that is provided between the holding member and the first support member and generates power in the first direction, and a fourth actuator that is provided between the holding member and the first support member and generates power in the second direction.

12. The lens device according to claim 9, wherein the coordinate plane is defined by a first direction and a second direction intersecting the first direction, the first drive mechanism includes:

a first actuator that is provided between the first support member and the second support member and generates power in the first direction, and a second actuator that is provided between the first support member and the second support member and generates power in the second direction, and the second drive mechanism includes a third actuator that is provided between the holding member and the first support member and generates power in a combination direction of the first direction and the second direction.

13. The lens device according to claim 1, wherein the first drive mechanism includes a voice coil motor, and the second drive mechanism includes a piezoelectric element.

14. The lens device according to claim 13, wherein the second drive mechanism includes an elastic member disposed at a position facing the piezoelectric element.

15. The lens device according to claim 1, further comprising:

an optical filter that is disposed on a subject side with respect to the image sensor and transmits near-infrared light included in the light.

16. An imaging apparatus comprising:

a processor;

a memory coupled to or integrated with the processor;

an image sensor;

a lens that includes a shake correction lens correcting a shake of an image obtained by imaging light on the image sensor, and images the light, which is incident, on the image sensor;

a first drive mechanism that moves the shake correction lens in a direction in which the shake of the image is corrected, by applying power to the shake correction lens along a coordinate plane intersecting an optical axis of the lens; and a second drive mechanism that moves the shake correction lens in a direction in which the image is shifted, by applying power to the shake correction lens along the coordinate plane, wherein the second drive mechanism is a different type of drive mechanism than the first drive mechanism, wherein a movement amount of the shake correction lens by the second drive mechanism is smaller than a movement amount of the shake correction lens by the first drive mechanism, wherein the processor is configured to:

perform, with respect to the first drive mechanism, control of moving the shake correction lens in the direction in which the shake of the image is corrected, and perform, with respect to the second drive mechanism, control of moving the shake correction lens in the direction in which the image is shifted, wherein the second drive mechanism moves the shake correction lens along a direction in which the first drive mechanism moves the shake correction lens, the shake correction lens is moved by a movement amount in which a movement amount of the shake correction lens by the second drive mechanism is added to a movement amount of the shake correction lens by the first drive mechanism in a case in which the second drive mechanism moves the shake correction lens in the direction in which the first drive mechanism moves the shake correction lens, and the shake correction lens is moved by a movement amount in which the movement amount of the shake correction lens by the second drive mechanism is subtracted from the movement amount of the shake correction lens by the first drive mechanism in a case in which the second drive mechanism moves the shake correction lens in a direction opposite to the direction in which the first drive mechanism moves the shake correction lens.

17. The imaging apparatus according to claim 16, wherein the processor is configured to:

perform, with respect to the second drive mechanism, control of moving the shake correction lens to a position at which the image is shifted at a pitch equal to or larger than a pixel pitch of the image sensor or a pitch smaller than the pixel pitch of the image sensor, cause the image sensor to perform imaging according to the shift of the image, and combine images of a plurality of frames obtained by the imaging.

18. An operation method for a lens device, wherein the lens device comprises a lens that includes a shake correction lens correcting a shake of an image obtained by imaging light on an image sensor, and images the light, which is incident, on the image sensor, a first drive mechanism that moves the shake correction lens in a direction in which the shake of the image is corrected, by applying power to the shake correction lens along a coordinate plane intersecting an optical axis of the lens, and a second drive mechanism that moves the shake correction lens in a direction in which the image is shifted, by applying power to the shake correction lens along the coordinate plane, wherein the second drive mechanism is a different type of drive mechanism than the first drive mechanism, wherein a movement amount of the shake correction lens by the second drive mechanism is smaller than a movement amount of the shake correction lens by the first drive mechanism, the operation method comprising:

performing, with respect to the first drive mechanism, control of moving the shake correction lens in the direction in which the shake of the image is corrected; and performing, with respect to the second drive mechanism, control of moving the shake correction lens in the direction in which the image is shifted, wherein the second drive mechanism moves the shake correction lens along a direction in which the first drive mechanism moves the shake correction lens, the shake correction lens is moved by a movement amount in which a movement amount of the shake correction lens by the second drive mechanism is added to a movement amount of the shake correction lens by the first drive mechanism in a case in which the second drive mechanism moves the shake correction lens in the direction in which the first drive mechanism moves the shake correction lens, and the shake correction lens is moved by a movement amount in which the movement amount of the shake correction lens by the second drive mechanism is subtracted from the movement amount of the shake correction lens by the first drive mechanism in a case in which the second drive mechanism moves the shake correction lens in a direction opposite to the direction in which the first drive mechanism moves the shake correction lens.

19. An operation method for an imaging apparatus, wherein the imaging apparatus comprising an image sensor, a lens that includes a shake correction lens correcting a shake of an image obtained by imaging light on the image sensor, and images the light, which is incident, on the image sensor, a first drive mechanism that moves the shake correction lens in a direction in which the shake of the image is corrected, by applying power to the shake correction lens along a coordinate plane intersecting an optical axis of the lens, and a second drive mechanism that moves the shake correction lens in a direction in which the image is shifted, by applying power to the shake correction lens along the coordinate plane, wherein the second drive mechanism is a different type of drive mechanism than the first drive mechanism, wherein a movement amount of the shake correction lens by the second drive mechanism is smaller than a movement amount of the shake correction lens by the first drive mechanism, the operation method comprising:

performing, with respect to the first drive mechanism, control of moving the shake correction lens in the direction in which the shake of the image is corrected; and performing, with respect to the second drive mechanism, control of moving the shake correction lens in the direction in which the image is shifted, wherein the second drive mechanism moves the shake correction lens along a direction in which the first drive mechanism moves the shake correction lens, the shake correction lens is moved by a movement amount in which a movement amount of the shake correction lens by the second drive mechanism is added to a movement amount of the shake correction lens by the first drive mechanism in a case in which the second drive mechanism moves the shake correction lens in the direction in which the first drive mechanism moves the shake correction lens, and the shake correction lens is moved by a movement amount in which the movement amount of the shake correction lens by the second drive mechanism is subtracted from the movement amount of the shake correction lens by the first drive mechanism in a case in which the second drive mechanism moves the shake correction lens in a direction opposite to the direction in which the first drive mechanism moves the shake correction lens.

20. A non-transitory computer-readable storage medium storing a program executable by a computer applied to a lens device to perform a process, wherein the lens device comprises a lens that includes a shake correction lens correcting a shake of an image obtained by imaging light on an image sensor, and images the light, which is incident, on the image sensor, a first drive mechanism that moves the shake correction lens in a direction in which the shake of the image is corrected, by applying power to the shake correction lens along a coordinate plane intersecting an optical axis of the lens, and a second drive mechanism that moves the shake correction lens in a direction in which the image is shifted, by applying power to the shake correction lens along the coordinate plane, wherein the second drive mechanism is a different type of drive mechanism than the first drive mechanism, wherein a movement amount of the shake correction lens by the second drive mechanism is smaller than a movement amount of the shake correction lens by the first drive mechanism, the process comprising:

performing, with respect to the first drive mechanism, control of moving the shake correction lens in the direction in which the shake of the image is corrected; and performing, with respect to the second drive mechanism, control of moving the shake correction lens in the direction in which the image is shifted, wherein the second drive mechanism moves the shake correction lens along a direction in which the first drive mechanism moves the shake correction lens, the shake correction lens is moved by a movement amount in which a movement amount of the shake correction lens by the second drive mechanism is added to a movement amount of the shake correction lens by the first drive mechanism in a case in which the second drive mechanism moves the shake correction lens in the direction in which the first drive mechanism moves the shake correction lens, and the shake correction lens is moved by a movement amount in which the movement amount of the shake correction lens by the second drive mechanism is subtracted from the movement amount of the shake correction lens by the first drive mechanism in a case in which the second drive mechanism moves the shake correction lens in a direction opposite to the direction in which the first drive mechanism moves the shake correction lens.

21. A non-transitory computer-readable storage medium storing a program executable by a computer applied to an imaging apparatus to perform a process, wherein the imaging apparatus comprises an image sensor, a lens that includes a shake correction lens correcting a shake of an image obtained by imaging light on the image sensor, and images the light, which is incident, on the image sensor, a first drive mechanism that moves the shake correction lens in a direction in which the shake of the image is corrected, by applying power to the shake correction lens along a coordinate plane intersecting an optical axis of the lens, and a second drive mechanism that moves the shake correction lens in a direction in which the image is shifted, by applying power to the shake correction lens along the coordinate plane, wherein the second drive mechanism is a different type of drive mechanism than the first drive mechanism, wherein a movement amount of the shake correction lens by the second drive mechanism is smaller than a movement amount of the shake correction lens by the first drive mechanism, the process comprising:

performing, with respect to the first drive mechanism, control of moving the shake correction lens in the direction in which the shake of the image is corrected; and performing, with respect to the second drive mechanism, control of moving the shake correction lens in the direction in which the image is shifted, wherein the second drive mechanism moves the shake correction lens along a direction in which the first drive mechanism moves the shake correction lens, the shake correction lens is moved by a movement amount in which a movement amount of the shake correction lens by the second drive mechanism is added to a movement amount of the shake correction lens by the first drive mechanism in a case in which the second drive mechanism moves the shake correction lens in the direction in which the first drive mechanism moves the shake correction lens, and the shake correction lens is moved by a movement amount in which the movement amount of the shake correction lens by the second drive mechanism is subtracted from the movement amount of the shake correction lens by the first drive mechanism in a case in which the second drive mechanism moves the shake correction lens in a direction opposite to the direction in which the first drive mechanism moves the shake correction lens.

* * * * *